United States Patent
Nakahata et al.

(10) Patent No.: US 10,116,197 B2
(45) Date of Patent: Oct. 30, 2018

(54) TRANSFORMER WITHOUT MAGNETIC COUPLING, ELECTROMAGNETIC INDUCTION OR MUTUAL INDUCTANCE

(71) Applicants: Sumitomo Electric Industries, Ltd., Osaka-shi (JP); NATIONAL UNIVERSITY CORPORATION TOYOHASHI UNIVERSITY OF TECHNOLOGY, Toyohashi-shi (JP)

(72) Inventors: Hideaki Nakahata, Osaka (JP); Satoshi Hatsukawa, Osaka (JP); Kenichi Hirotsu, Osaka (JP); Takashi Ohira, Toyohashi (JP); Kyohei Yamada, Toyohashi (JP); Daiya Egashira, Toyohashi (JP)

(73) Assignees: Sumitomo Electric Industries, Ltd., Osaka-shi (JP); National University Corporation Toyohashi University of Technology, Toyohashi-shi (JP)

( * ) Notice: Subject to any disclaimer, the term of this patent is extended or adjusted under 35 U.S.C. 154(b) by 0 days.

(21) Appl. No.: 15/509,313

(22) PCT Filed: Oct. 9, 2015

(86) PCT No.: PCT/JP2015/078731
§ 371 (c)(1),
(2) Date: Mar. 7, 2017

(87) PCT Pub. No.: WO2016/072212
PCT Pub. Date: May 12, 2016

(65) Prior Publication Data
US 2017/0294829 A1    Oct. 12, 2017

(30) Foreign Application Priority Data

Nov. 5, 2014 (JP) ................... 2014-225469

(51) Int. Cl.
*H02M 3/06* (2006.01)
*H02M 1/08* (2006.01)

(52) U.S. Cl.
CPC .................... *H02M 1/08* (2013.01)

(58) Field of Classification Search
CPC .. H02M 3/07; H02M 3/073; H02M 2003/075; H02M 2003/076;
(Continued)

(56) References Cited

U.S. PATENT DOCUMENTS 4,203,151 A * 5/1980 Baker ................... H02M 7/487
363/132
5,652,546 A 7/1997 Dent
(Continued)

FOREIGN PATENT DOCUMENTS

| CN | 1063892 C | 3/2001 |
|---|---|---|
| CN | 2798411 Y | 7/2006 |

(Continued)

OTHER PUBLICATIONS

Homepage of Chuba Electric Power Co., Inc., [Pole Transformer], [online], Internet <URL:http://www.chuden.co.jp/kids/kids_denki/home/hom_kaku/index.html> [searched on Sep. 12, 2014] [Cited in Specification].

(Continued)

*Primary Examiner* — Alex Torres-Rivera
(74) *Attorney, Agent, or Firm* — Venable LLP; Michael A. Sartori; Laura G. Remus

(57) ABSTRACT

A front stage circuit of a transformer includes a switch series unit, capacitors, and a ground electrical path. The switch series unit, connected in parallel to a power supply, includes odd-numbered/even-numbered switches configured to be alternately turned ON. Assuming that mutual connection points of the switches and points at both ends of the switch (Continued)

series unit are m nodes in total, and one of the points at the both ends is a ground node, the capacitors are provided on at least one of a first electrical path that combines odd nodes and leads them to a first output port, and a second electrical path that combines even nodes and leads them to a second output port, and the capacitors are present to correspond to (m−1) nodes excluding the ground node. The ground electrical path connects the ground node directly to the first output port without an interposed capacitor.

4 Claims, 54 Drawing Sheets

(58) Field of Classification Search
CPC ..... H02M 2003/077; H02M 2003/078; H02M 2001/0067; H02M 2001/007; H02M 3/156
USPC ...... 323/225, 266, 268, 282; 363/59, 60, 65, 363/62
See application file for complete search history.

(56) References Cited

U.S. PATENT DOCUMENTS

| | | | |
|---|---|---|---|
| 5,850,337 A | 12/1998 | Lee | |
| 6,462,962 B1 | 10/2002 | Cuk | |
| 8,391,038 B2* | 3/2013 | Zacharias | H02J 3/38 363/132 |
| 8,693,224 B1* | 4/2014 | Giuliano | H02M 3/07 363/60 |
| 8,829,866 B2* | 9/2014 | Lethellier | H02M 1/44 323/222 |
| 9,667,139 B2* | 5/2017 | Giuliano | H02M 3/155 |
| 2004/0057258 A1 | 3/2004 | Dobrowolski | |
| 2005/0030767 A1 | 2/2005 | Phadke et al. | |
| 2008/0013351 A1 | 1/2008 | Alexander | |
| 2009/0278520 A1* | 11/2009 | Perreault | H02M 3/07 323/282 |
| 2010/0202176 A1* | 8/2010 | Hallak | H02M 7/48 363/131 |
| 2011/0049991 A1 | 3/2011 | Sato et al. | |
| 2013/0134777 A1 | 5/2013 | de Sousa et al. | |
| 2014/0063884 A1 | 3/2014 | Itoh et al. | |
| 2014/0063885 A1 | 3/2014 | Itoh et al. | |
| 2014/0239736 A1 | 8/2014 | Kai et al. | |
| 2016/0129796 A1 | 5/2016 | Tomura et al. | |
| 2016/0181937 A1 | 6/2016 | Nakahata et al. | |
| 2016/0234901 A1* | 8/2016 | Delos Ayllon | H05B 33/0815 |

FOREIGN PATENT DOCUMENTS

| | | |
|---|---|---|
| CN | 104426381 A | 3/2015 |
| CN | 104426382 A | 3/2015 |
| DE | 202011102068 U1 | 9/2012 |
| EP | 3041124 A1 | 7/2016 |
| GB | 0755219 A | 8/1956 |
| JP | 2002-095241 A | 3/2002 |
| JP | 2010-074931 A | 4/2010 |
| JP | 2013-146181 A | 7/2013 |
| WO | 2015/037455 A1 | 3/2015 |

OTHER PUBLICATIONS

Falcones et al., "Topology Comparison for Solid Transformer Implementation," Power Energy Society General Meeting, 2010 IEEE, pp. 1-8, Minneapolis, Jul. 2010.
International Search Report in International Application No. PCT/JP2014/072706 dated Nov. 25, 2014.
International Search Report in International Application No. PCT/JP2015/078736 dated Dec. 8, 2015.
International Search Report in counterpart International Application No. PCT/JP2015/078731 dated Dec. 8, 2015.
U.S. Appl. No. 14/911,245, filed Feb. 9, 2016 [Related application, provided in IFW].
U.S. Appl. No. 15/509,296, filed Mar. 7, 2017 [Related application, provided in IFW].
Yamada, et al., "Load-Invariant Constant-Voltage-Ratio Transformer without Employing Mutual Inductance" 2013 Proceedings of the Society Conference of IEICE B-9-3, XP008182819, Sep. 17, 2013, p. 202 [Cited in EESR].
Extended Search Report issued in related European Patent Application No. 14843360.0, dated Apr. 13, 2017.
First Office Action issued in related Chinese Patent Application No. 201410460772.3, dated Aug. 25, 2017.
Office Action issued in U.S. Appl. No. 15/509,296, dated Nov. 17, 2017 [Related Application, Provided in IFW].
Sun, et al., "Unified Analysis of Half-Bridge Converters with Current-Doubler Rectifier" IEEE, 2001, pp. 514-520.
Office Action issued in co-pending U.S. Appl. No. 14/911,245, dated Sep. 22, 2017 [Provided in IFW, Related Application].
Office Action issued in co-pending U.S. Appl. No. 14/911,245, dated Mar. 28, 2018 [Related Application, Provided in IFW].
Office Action issued in U.S. Appl. No. 14/911,245, dated Jul. 31, 2018 [Related Application, Provided in IFW].
Notice of Allowance issued in U.S. Appl. No. 15/509,296, dated Jul. 9, 2018 [Related Application, Provided in IFW].

\* cited by examiner

FIG. 4
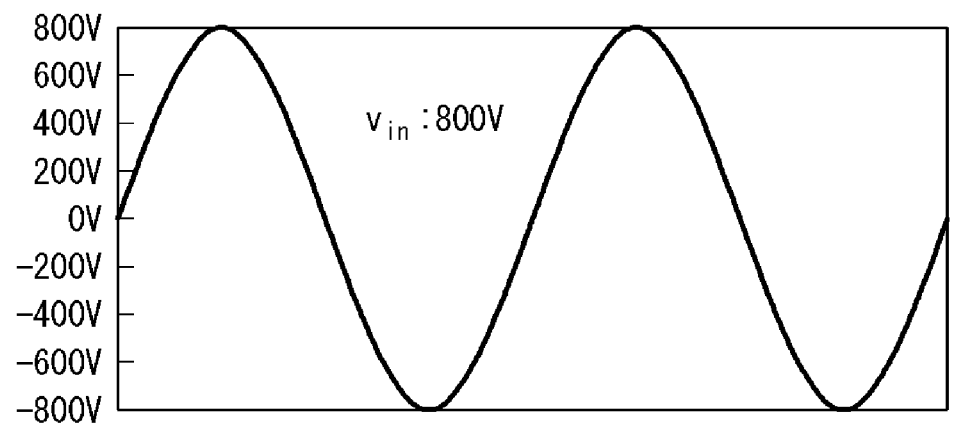
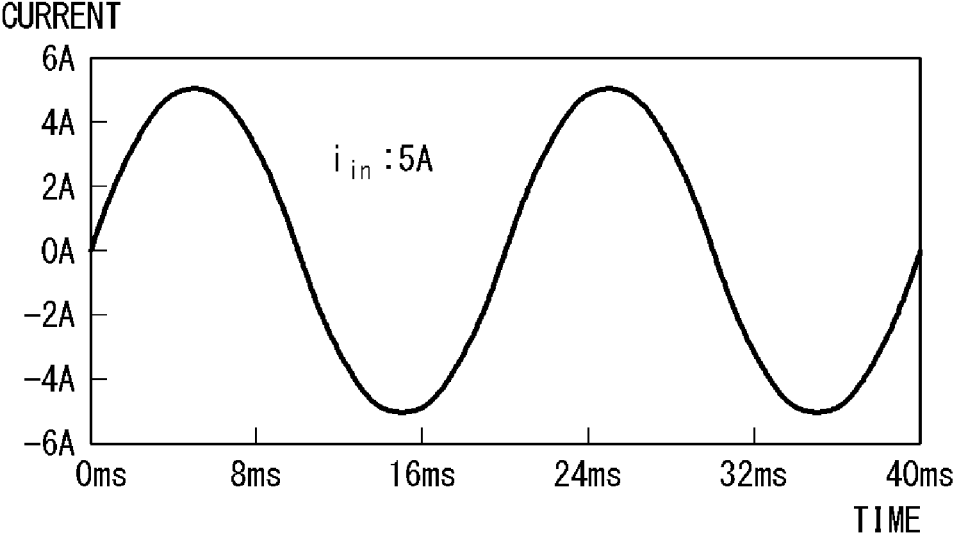

TRANSFORMER WITHOUT MAGNETIC COUPLING, ELECTROMAGNETIC INDUCTION OR MUTUAL INDUCTANCE

TECHNICAL FIELD

The present invention relates to a transformer.

BACKGROUND ART

In a commercial AC transmission and distribution system, a transformer is used. Just near a consumer's house, a pole transformer is used which transforms, for example, 6600 V (50 Hz or 60 Hz) to 200 V (see NON PATENT LITERATURE 1). Such a pole transformer has a thick coil as a conductive wire wound around an iron core, and therefore has a considerable weight. For example, a pole transformer with a diameter of 40 cm and a height of 80 cm has a weight of about 200 kg, including an insulating oil and a case.

On the other hand, for realizing a smart grid which is a next-generation power system, studies of an SST (Solid-State Transformer) are being conducted. For the SST, a high-frequency transformer is used (for example, see NON PATENT LITERATURE 2).

In recent years, there is a demand that, for example, output voltage (DC) of photovoltaic generation is stepped down to be used for a low-voltage power supply for measurement. There are cases where the output voltage of photovoltaic generation is as high as 1000 V. In order to step down such high voltage to about 100 to 200 V, an intervening device such as a step-down transformer is needed as in an AC circuit.

CITATION LIST

Non Patent Literature

NON PATENT LITERATURE 1: Homepage of Chubu Electric Power Co., Inc., [Pole Transformer], [online], [searched on Sep. 12, 2014], Internet <URL: http://www.chuden.co.jp/kids/kids_denki/home/hom_kaku/index.html>

NON PATENT LITERATURE 2: Falcones, S.: et al., Power and Energy Society General Meeting, 2010 IEEE, pp. 1-8, Minneapolis, July 2010

SUMMARY OF INVENTION

Technical Problem

The conventional pole transformer is heavy, and therefore is not easy to handle. In addition, an attachment space that is large enough to contain the outer dimension of the transformer is needed on the pole.

On the other hand, the high-frequency transformer cannot avoid an influence of a parasitic capacitance, and has a difficulty in designing.

Considering such conventional problems, an object of the present invention is to provide an innovative next-generation transformer with a small size and a light weight, which does not need a coil, an iron core, and the like for magnetic coupling, electromagnetic induction, or mutual inductance as used in the conventional transformer. Either an AC power supply or a DC power supply may be used.

Solution to Problem

A transformer according to the present invention is provided between a power supply and a load, and composed of a front stage circuit and a rear stage circuit.

The front stage circuit includes: (a) a switch series unit composed of a plurality of switches, as many as a multiple of 2, connected in series with each other, the plurality of switches including odd-numbered switches and even-numbered switches as seen from one of both ends of the switch series unit, the odd-numbered switches and the even-numbered switches being configured to be alternately turned ON, the switch series unit as a whole being connected in parallel to the power supply; (b) assuming that mutual connection points of the respective switches and points at the both ends of the switch series unit are regarded as m nodes in total, one of the points at the both ends is regarded as a ground node, and the nodes are seen in order of 1 to m from one of the both ends of the switch series unit, capacitors provided on at least one electrical path of a first electrical path and a second electrical path, the first electrical path being configured to combine odd nodes and lead the odd nodes to a first output port, the second electrical path being configured to combine even nodes and lead the even nodes to a second output port, the capacitors being present so as to correspond to at least (m−1) nodes excluding the ground node; and (c) a ground electrical path being configured to connect the ground node directly to the first output port without an interposed capacitor.

The rear stage circuit includes: (d) an element series unit composed of a pair of semiconductor elements that are connected in series to each other and perform conducting operations of mutually opposite polarities, one of both ends of the element series unit being connected to the first output port and to a grounded end of the load while the other end of the element series unit being connected to the second output port; and (e) inductors provided on a third electrical path and a fourth electrical path, respectively, the third electrical path being configured to lead a non-grounded end of the element series unit to the grounded end of the load, the fourth electrical path being configured to lead a mutual connection point of the pair of semiconductor elements to a non-grounded end of the load.

The transformer further includes a control section configured to control ON/OFF operations of the switches.

Advantageous Effects of Invention

According to the transformer of the present invention, it is possible to provide an innovative next-generation transformer with a small size and a light weight, which does not need a coil, an iron core, and the like for magnetic coupling, electromagnetic induction, or mutual inductance as used in the conventional transformer. In addition, this transformer is capable of input/output common grounding.

BRIEF DESCRIPTION OF DRAWINGS

FIG. 4 is a waveform diagram in which an upper graph shows input voltage to the transformer and a lower graph shows input current to the transformer.

DESCRIPTION OF EMBODIMENTS

[Summary of the Embodiment]

Figure 1:
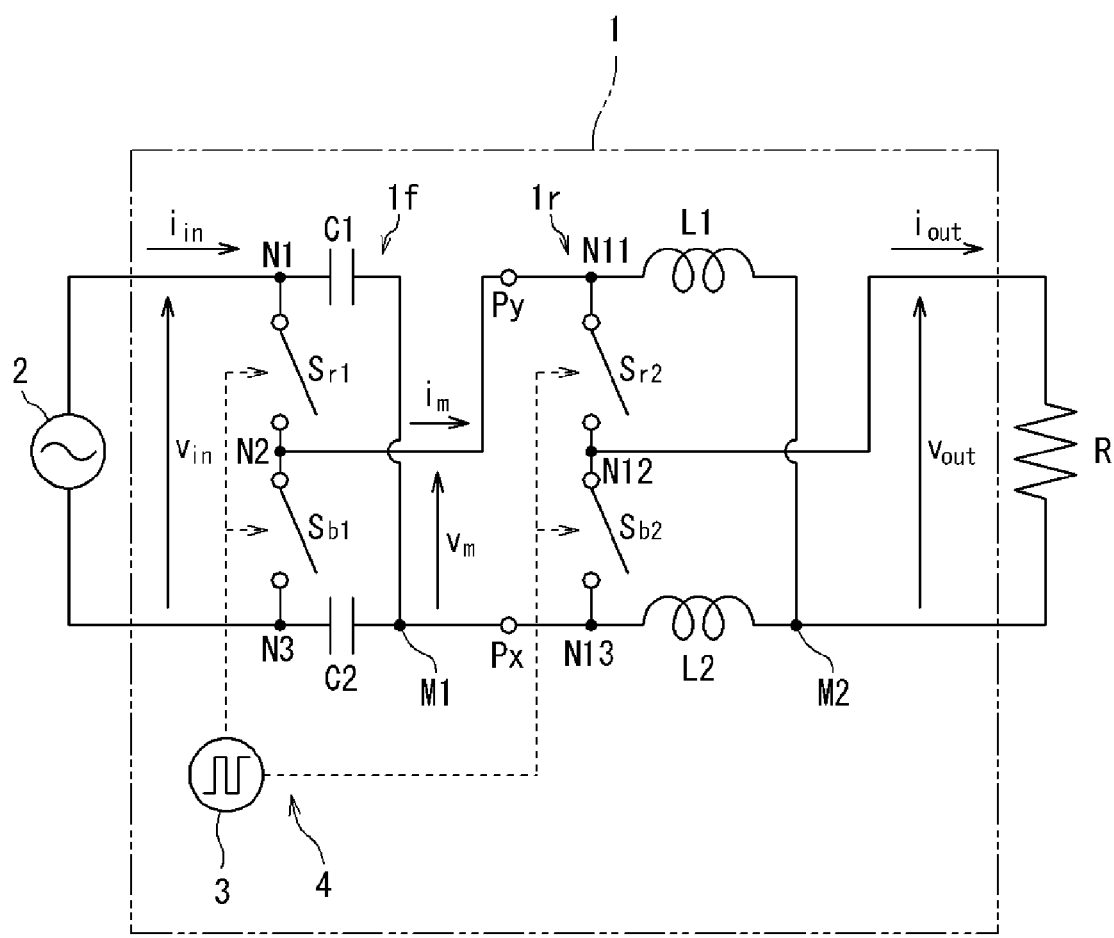
FIG. 1 is a circuit diagram showing a transformer as an original form of a transformer according to an embodiment.

The summary of the embodiment of the present invention includes at least the following.

(1) A transformer provided between a power supply and a load is composed of a front stage circuit and a rear stage circuit.

The front stage circuit includes: (a) a switch series unit composed of a plurality of switches, as many as a multiple of 2, connected in series with each other, the plurality of switches including odd-numbered switches and even-numbered switches as seen from one of both ends of the switch series unit, the odd-numbered switches and the even-numbered switches being configured to be alternately turned ON, the switch series unit as a whole being connected in parallel to the power supply; (b) assuming that mutual connection points of the respective switches and points at the both ends of the switch series unit are regarded as m nodes in total, one of the points at the both ends is regarded as a ground node, and the nodes are seen in order of 1 to m from one of the both ends of the switch series unit, capacitors provided on at least one electrical path of a first electrical path and a second electrical path, the first electrical path being configured to combine odd nodes and lead the odd nodes to a first output port, the second electrical path being configured to combine even nodes and lead the even nodes to a second output port, the capacitors being present so as to correspond to at least (m−1) nodes excluding the ground node; and (c) a ground electrical path being configured to connect the ground node directly to the first output port without an interposed capacitor.

The rear stage circuit includes: (d) an element series unit composed of a pair of semiconductor elements that are connected in series to each other and perform conducting operations of mutually opposite polarities, one of both ends of the element series unit being connected to the first output port and to a grounded end of the load while the other end of the element series unit being connected to the second output port; and (e) inductors provided on a third electrical path and a fourth electrical path, respectively, the third electrical path being configured to lead a non-grounded end of the element series unit to the grounded end of the load, the fourth electrical path being configured to lead a mutual connection point of the pair of semiconductor elements to a non-grounded end of the load.

The transformer further includes a control section configured to control ON/OFF operations of the switches.

The transformer configured as described in above (1) can perform transformation by the circuit configuration including the front stage circuit and the rear stage circuit and by switching. Using this transformer as a power transformer makes it unnecessary to use a conventional transformer including a coil, an iron core, and the like. Therefore, it is possible to realize drastic size reduction and weight reduction of a transformer, and thereby realize cost reduction accordingly. In addition, problems of parasitic capacitance and occurrence of magnetic field leakage, which arise in a high-frequency transformer, are also solved, and thus a transformer with low loss can be realized. As for the power supply, either an AC power supply or a DC power supply is applicable.

This transformer is capable of input/output common grounding from the power supply to the load. This is advantageous in that a ground wire can be shared.

(2) Further, in the transformer described in above (1), it is assumed that a time period from a dead-time start time to a dead-time end time is a dead time τ, the dead-time start time being a time at which control for the odd-numbered switches and control for the even-numbered switches are both turned OFF, the dead-time end time being a time at which control for either the odd-numbered switches or the even-numbered switches is turned ON. In this case, the control section, after the dead-time start time, may calculate a first half time $\tau_1$ and a second half time $\tau_2$, the first half time $\tau_1$ being calculated on the basis of electric charges that move from the inductor of the third electrical path to floating capacitances of the switches while one of the semiconductor elements is in a conductive state, the second half time $\tau_2$ being calculated on the basis of electric charges that move from the inductor of the third electrical path to the floating capacitances of the switches while the other semiconductor element is in a conductive state. The control section may determine the dead time τ on the basis of the first half time $\tau_1$ and the second half time $\tau_2$.

In this case, an appropriate dead time τ can be determined on the basis of the times $\tau_1$ and $\tau_2$ calculated focusing on movement of electric charges during the dead time, thereby realizing zero volt transition (ZVT).

(3) Further, in the transformer described in above (2), the control section preferably terminate the dead time τ before the electric charges that have moved to the floating capacitances return to the inductor of the third electrical path.

When the electric charges that have moved to the floating capacitances return, switching voltage increases again. However, by terminating the dead time τ before the returning of the electric charges, the switching voltage can be prevented from increasing again.

(4) In the transformer described in above (3), assuming that a switching cycle of the switches is T, an inductance of the inductor of the third electrical path is $L_1$, and a resistance value of the load is $R_3$, the dead time τ satisfies the following relationship:

$$\tau_1+\tau_2 \leq \tau \leq \tau_0+\tau_1$$

where $$\tau_0 = \frac{T}{4} - \frac{L_1}{4R_3}$$

$$\tau_1 = \frac{T}{4} + \frac{L_1}{4R_3} - \frac{1}{4}\sqrt{\left(T+\frac{L_1}{R_3}\right)^2 - 32L_1 \sum_{n=1}^{n} C_{nDS}}$$

$$\tau_2 = \frac{T}{4} - \frac{L_1}{4R_3} - \frac{1}{4}\sqrt{\left(T-\frac{L_1}{R_3}\right)^2 - 32L_1 \sum_{n=1}^{n} C_{nDS}}$$

where n denotes the number of floating capacitances $C_{DS}$, $C_{nDs}$ denotes an n-th floating capacitance, a sign of a value in each radical sign is plus, and $\tau_1 < \tau_2$ is satisfied.

In this case, an optimum range of the dead time τ can be precisely determined, thereby reliably realizing zero voltage transition. Further, since the inductance as a factor to determine the range of τ is only the inductance of an inductor L1, the transformer of the present invention is advantageous in that a low-loss inductor having a precise inductance may be only the inductor L1.

[Details of Embodiments]

Hereinafter, an embodiment will be described in detail with reference to the drawings.

<<Example of Original Circuit>>

FIG. 1 is a circuit diagram showing a transformer 1 as an original form of a transformer according to the present embodiment. In FIG. 1, the transformer 1 is provided between an AC power supply 2 and a load R (R also denotes a resistance value). The transformer 1 includes a pair of capacitors C1 and C2, a pair of inductors L1 and L2, four switches $S_{r1}$, $S_{r2}$, $S_{b1}$, and $S_{b2}$, and a control section 3 which performs ON/OFF control of the switches $S_{r1}$, $S_{r2}$, $S_{b1}$, and $S_{b2}$. A switching frequency of the control section 3 is, for example, about 1 MHz.

The pair of capacitors C1 and C2 may have the same capacitance value, or may have different capacitance values. The same applies to the inductance values of the pair of inductors L1 and L2.

The switches $S_{r1}$, $S_{r2}$, $S_{b1}$, and $S_{b2}$ and the control section 3 form a switch device 4 which switches the state of circuit connection of the transformer 1. The switches $S_{r1}$ and $S_{r2}$ operate in synchronization with each other, and the switches $S_{b1}$ and $S_{b2}$ operate in synchronization with each other. The pair of switches $S_{r1}$ and $S_{r2}$ and the pair of switches $S_{b1}$ and $S_{b2}$ operate so as to be alternately turned ON exclusively from each other. The switches $S_{r1}$, $S_{r2}$, $S_{b1}$, and $S_{b2}$ are semiconductor switching elements formed by an SiC element or a GaN element, for example. The SiC element or the GaN element allows faster switching than an $S_{r1}$ element, for example. In addition, sufficient withstand voltage (which can be even 6 kV per element, for example) can be obtained without connecting multiple stages of such elements.

In FIG. 1, the pair of capacitors C1 and C2 are connected in series to each other via a connection point M1. The AC power supply 2 is connected between the both ends of this series unit. Input voltage $v_{in}$ is applied to the series unit of the pair of capacitors C1 and C2, so that input current $i_{in}$ flows.

The pair of inductors L1 and L2 are connected in series to each other via a connection point M2. Between the both ends of this series unit, input voltage $v_m$ is applied via the capacitors C1 and C2, so that current $i_m$ flows. When one of the switches $S_{r2}$ and $S_{b2}$ is ON, current flows in the load R. Here, voltage applied to the load R is $v_{out}$, and output current flowing from the transformer 1 to the load R is $i_{out}$.

Figure 2:
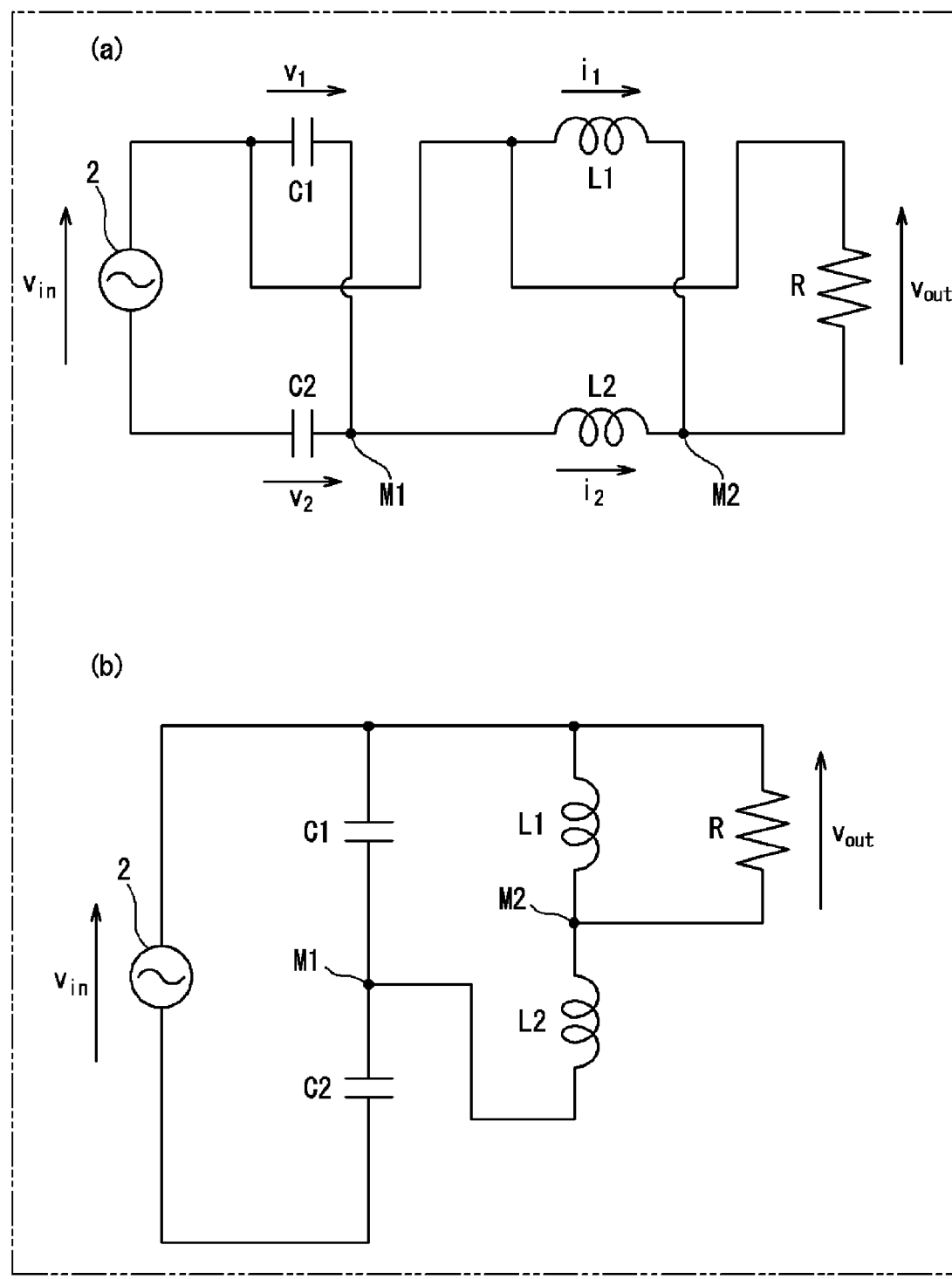
FIG. 2 is a circuit diagram in which (a) shows a substantial connection state when, of four switches shown in FIG. 1, two switches on the upper side are ON and two switches on the lower side are OFF, and (b) shows, in a step-like shape, the same circuit diagram as in (a).

In FIG. 2, (a) is a circuit diagram showing a substantial connection state when, among the four switches $S_{r1}$, $S_{r2}$, $S_{b1}$, and $S_{b2}$ in FIG. 1, the two switches $S_{r1}$ and $S_{r2}$ on the upper side are ON, and the two switches $S_{b1}$ and $S_{b2}$ on the lower side are OFF. In the drawing, the switch device 4 in FIG. 1 is not shown. In FIG. 2, (b) is a circuit diagram showing, in a step-like shape, the same circuit diagram as in (a).

Figure 3:
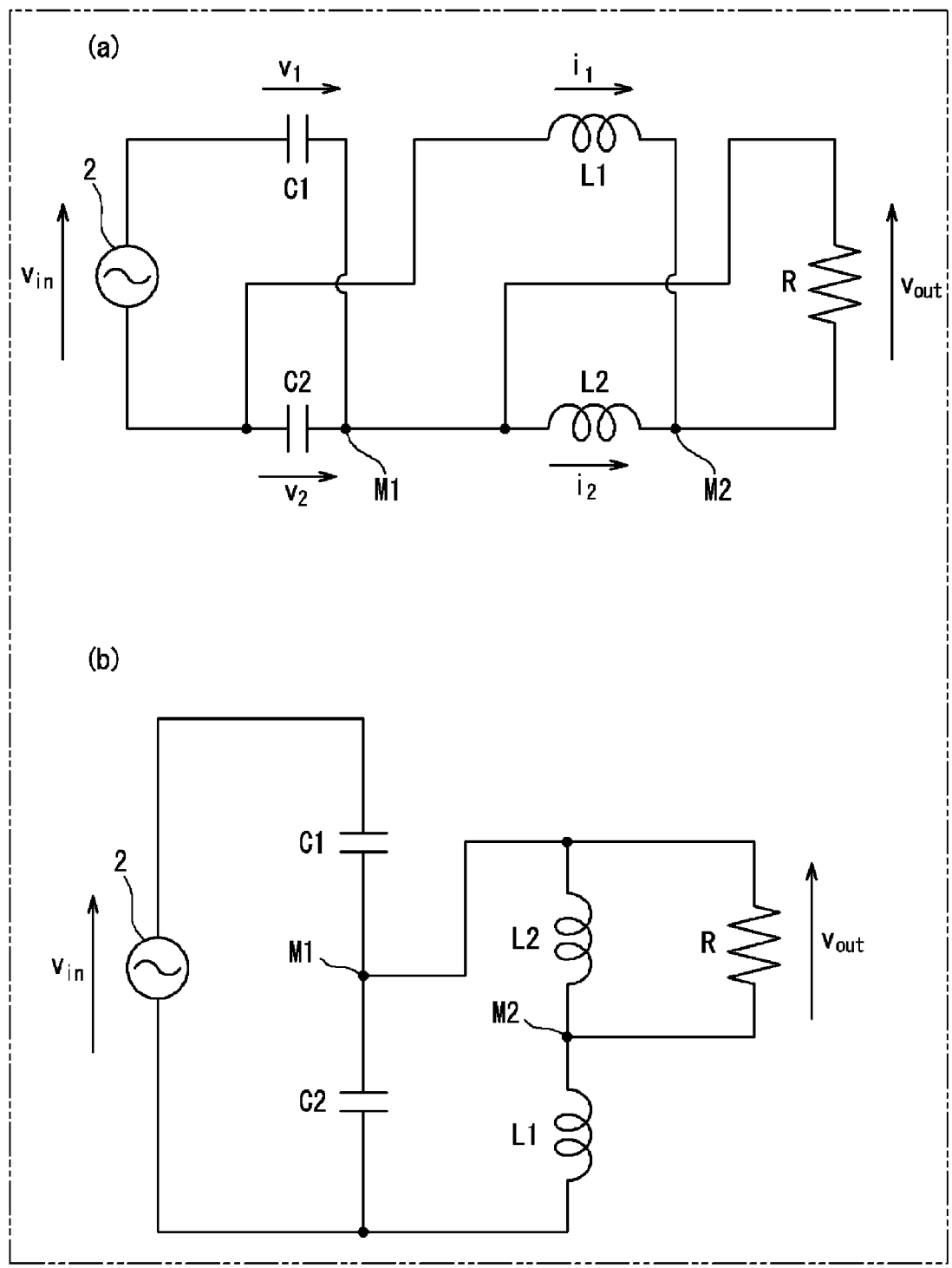
FIG. 3 is a circuit diagram in which (a) shows a substantial connection state when, of four switches shown in FIG. 1, two switches on the lower side are ON and two switches on the upper side are OFF, and (b) shows, in a step-like shape, the same circuit diagram as in (a).

On the other hand, in FIG. 3, (a) is a circuit diagram showing a substantial connection state when, among the four switches $S_{r1}$, $S_{r2}$, $S_{b1}$, and $S_{b2}$, the two switches $S_{b1}$ and $S_{b2}$ on the lower side are ON, and the two switches $S_{r1}$ and $S_{r2}$ on the upper side are OFF. In FIG. 3, (b) is a circuit diagram showing, in a step-like shape, the same circuit diagram as in (a).

While the states shown in FIG. 2 and FIG. 3 are alternately repeated, voltage obtained via the connection point M1 of the series unit of the capacitors C1 and C2 becomes voltage obtained via the connection point M2 of the series unit of the inductors L1 and L2. That is, the circuit configuration is composed of a front stage circuit including the pair of capacitors C1 and C2, and a rear stage circuit including the pair of inductors L1 and L2, and at each stage, the polarity of output relative to input is inverted through switching. Regarding the capacitors C1 and C2, the directions of currents thereof are alternately inverted through switching. Regarding the inductors L1 and L2, the directions of voltages thereof are alternately inverted through switching.

Here, it can be estimated that the input voltage becomes ¼ when outputted. This will be logically proved below.

In FIG. 2, $v_{in}$ is input voltage from the AC power supply 2, $v_{out}$ is voltage applied to the load R, $v_1$ is voltage applied to the capacitor C1, $v_2$ is voltage applied to the capacitor C2, $i_1$ is current flowing through the inductor L1, and $i_2$ is current flowing through the inductor L2. In this case, the following expressions are satisfied.

For simplifying calculation, it is assumed that the capacitors C1 and C2 have the same capacitance value C, and the inductors L1 and L2 have the same inductance value L.

$$-v_{in} = v_1 - v_2$$

$$-\frac{v_{out}}{R} = i_1 + i_2$$

$$C\frac{d}{dt}(v_1 + v_2) = -i_2$$

$$L\frac{d}{dt}(i_1 - i_2) = -v_1$$

$$v_{out} = L\frac{d}{dt}i_1$$

The above expressions are converted into expressions of $v_1$, $i_1$, and $i_2$, as follows.

$$L\frac{d}{dt}i_1 = -R(i_1 + i_2)$$

$$L\frac{d}{dt}i_2 = v_1 - R(i_1 + i_2)$$

$$2C\frac{d}{dt}v_1 = -i_2 - C\frac{d}{dt}v_{in}$$

Here, if $Ri_1 = v_3$ and $Ri_2 = v_4$ are set, the following equation 1 is obtained.

$$\frac{d}{dt}v_3 = -\frac{R}{L}(v_3 + v_4) \qquad \text{(Equation 1)}$$

$$\frac{d}{dt}v_4 = \frac{R}{L}(v_1 - v_3 - v_4)$$

$$\frac{d}{dt}v_1 = -\frac{1}{2CR}v_4 - \frac{1}{2}\frac{d}{dt}v_{in}$$

In FIG. 3, as in FIG. 2, $v_{in}$ is input voltage from the AC power supply 2, $v_{out}$ is voltage applied to the load R, $v_1$ is voltage applied to the capacitor C1, $v_2$ is voltage applied to the capacitor C2, $i_1$ is current flowing through the inductor L1, and $i_2$ is current flowing through the inductor L2. In this case, the following expressions are satisfied.

$$-v_{in} = v_1 - v_2$$

$$-\frac{v_{out}}{R} = i_1 + i_2$$

-continued $$C\frac{d}{dt}(v_1 + v_2) = i_1$$

$$L\frac{d}{dt}(i_1 - i_2) = -v_2$$

$$v_{out} = L\frac{d}{dt}i_2$$

The above expressions are converted into expressions of $v_1$, $i_1$, and $i_2$, as follows.

$$L\frac{d}{dt}i_2 = -R(i_1 + i_2)$$

$$L\frac{d}{dt}i_1 = -v_1 - v_{in} - R(i_1 + i_2)$$

$$2C\frac{d}{dt}v_1 = i_1 - C\frac{d}{dt}v_{in}$$

Here, if $Ri_1 = v_3$ and $Ri_2 = v_4$ are set, the following equation 2 is obtained.

$$\frac{d}{dt}v_4 = -\frac{R}{L}(v_3 + v_4) \qquad \text{(Equation 2)}$$

$$\frac{d}{dt}v_3 = -\frac{R}{L}(v_1 + v_3 + v_4 + v_{in})$$

$$\frac{d}{dt}v_1 = \frac{1}{2CR}v_3 - \frac{1}{2}\frac{d}{dt}v_{in}$$

Here, it is difficult to derive an exact solution from the above two states. Therefore, the following conditions are set within a range that is considered to cause no practical problem.

(1) At a frequency $f_o$ of input voltage, the impedance (reactance) of L is sufficiently smaller than the resistance value. That is, $2\pi f_o L \ll R$ is satisfied. Preferably, a difference represented by the inequality sign is, for example, one-digit difference or greater, or more preferably, two-digit difference or greater. Thus, more stable transformation operation with less distortion can be obtained.

(2) At the switching frequency fs, the impedance (reactance) of C is sufficiently smaller than the resistance value R, but at the frequency $f_o$ of input voltage, the impedance (reactance) of C is sufficiently greater than the resistance value. That is, $1/(2\pi fsC) \ll R \ll 1/(2\pi f_o C)$ is satisfied. Preferably, a difference represented by the inequality sign is, for example, one-digit difference or greater, or more preferably, two-digit difference or greater. Thus, more stable transformation operation with less distortion can be obtained.

(3) In one cycle of switching, input voltage hardly varies. Therefore, $v_{in}(t+\Delta t) = v_{in}(t)$ ($0 \le \Delta t \le 1/fs$)

(4) The system is steady, and returns to the same state with a period (1/fs).

Therefore, $v_x(t+(1/fs)) \approx v_x(t)$ (x=1, 2, 3, 4)

If the switches $S_{r1}$ and $S_{r2}$ become ON during a period of $0 \le t \le (\frac{1}{2}fs)$ and the switches $S_{b1}$ and $S_{b2}$ become ON during a period of $(\frac{1}{2}fs) \le t \le (1/fs)$, the following equation 3 is obtained by primary approximation of equation 1 about t=0. In addition, the following equation 4 is obtained by primary approximation of equation 2 about t=($\frac{1}{2}$fs).

$$v_3\left(\frac{1}{2f_s}\right) \approx v_3(0) - \frac{R}{2f_s L}\{v_3(0) + v_4(0)\} \qquad \text{(Equation 3)}$$

$$v_4\left(\frac{1}{2f_s}\right) \approx v_4(0) + \frac{R}{2f_s L}\{v_1(0) - v_3(0) - v_4(0)\}$$

$$v_1\left(\frac{1}{2f_s}\right) \approx v_1(0) - \frac{1}{4f_s CR}v_4(0) - \frac{1}{2}\left\{v_{in}\left(\frac{1}{2f_s}\right) - v_{in}(0)\right\}$$

In the above equation 3, the third term on the right-hand side of the expression at the third stage, i.e., $-(\frac{1}{2})\{v_{in}(\frac{1}{2}fs)-v_{in}(0)\}$ is sufficiently close to zero.

$$v_4\left(\frac{1}{f_s}\right) \approx v_4\left(\frac{1}{2f_s}\right) - \frac{R}{2f_s L}\left\{v_3\left(\frac{1}{2f_s}\right) + v_4\left(\frac{1}{2f_s}\right)\right\} \qquad \text{(Equation 4)}$$

$$v_3\left(\frac{1}{f_s}\right) \approx v_3\left(\frac{1}{2f_s}\right) -$$

$$\frac{R}{2f_s L}\left\{v_1\left(\frac{1}{2f_s}\right) + v_3\left(\frac{1}{2f_s}\right) + v_4\left(\frac{1}{2f_s}\right) + v_{in}\left(\frac{1}{2f_s}\right)\right\}$$

$$v_1\left(\frac{1}{f_s}\right) \approx v_1\left(\frac{1}{2f_s}\right) + \frac{1}{4f_s CR}v_3\left(\frac{1}{2f_s}\right) - \frac{1}{2}\left\{v_{in}\left(\frac{1}{f_s}\right) - v_{in}\left(\frac{1}{2f_s}\right)\right\}$$

In the above equation 4, the third term on the right-hand side of the expression at the third stage, i.e., $-(\frac{1}{2})\{v_{in}(1/fs)-v_{in}(\frac{1}{2}fs)\}$ is sufficiently close to zero.

Here, if $v_1$, $v_3$, and $v_4$ in equations 3 and 4 are each linked, that is, $v_1(0)=v_1(1/fs)$, $v_3(0)=v_3(1/fs)$, and $v_4(0)=v_4(1/fs)$ are used, and in addition, if $\Delta T=1/(2fs)$ is set, the following expressions are satisfied.

$$-v_3(0)-v_4(0) \approx v_1(\Delta T)+v_3(\Delta T)+v_4(\Delta T)+v_{in}(\Delta T)$$

$$v_1(0)-v_3(0)-v_4(0) \approx v_3(\Delta T)+v_4(\Delta T)$$

$$v_4(0) \approx v_3(\Delta T)$$

If a sum of the expressions at the first and second stages shown above (just above) is taken, the following expression is obtained.

$$v_{in} = -2\{v_3(0)+v_4(0)+v_3(\Delta T)+v_4(\Delta T)\}+v_1(0)-v_1(\Delta T)$$

Here, from the expression at the third stage in equation 3, $v_1(0)-v_1(\Delta T)=(1/(4fsCR))v_4(0)$ is obtained.

In addition, $-v_{out}=R(i_1+i_2)=v_3+v_4$ is obtained, and this expression is always satisfied. Therefore, the following conclusive expression is obtained.

$$v_{in}(\Delta T) \approx 4v_{out}(\Delta T) + \frac{1}{4f_s CR}v_4(0)$$

Here, for simplification, it has been assumed that the values C are the same value and the values L are the same value. However, even if these values are different values, the same result can be derived through similar expression development.

In the conclusive expression, the second term on the right-hand side of the expression at the lowermost stage is sufficiently smaller than the first term, and thus can be neglected. Therefore, $v_{in} \approx 4v_{out}$ is satisfied regardless of load variation (variation in the value of R), and output voltage becomes about $\frac{1}{4}$ of input voltage. Since no loss occurs except for the load R, output current is about four times as great as input current, and input impedance is sixteen times as great as the resistance value R.

As a circuit parameter condition, regarding inductance, $2\pi f_o L \ll R$ is satisfied. In addition, regarding capacitance, $1/(2\pi f sC) \ll R \ll 1/(2\pi f_o C)$ is satisfied. If this circuit parameter condition is satisfied, it is reliably realized that the voltage transformation ratio is constant regardless of load variation, and more stable transformation operation with less distortion is obtained. Preferably, a difference represented by the inequality sign is, for example, one-digit difference or greater, or more preferably, two-digit difference or greater.

FIG. 4 is a waveform diagram in which an upper graph shows input voltage to the transformer 1 and a lower graph shows input current to the transformer 1.

Figure 5:
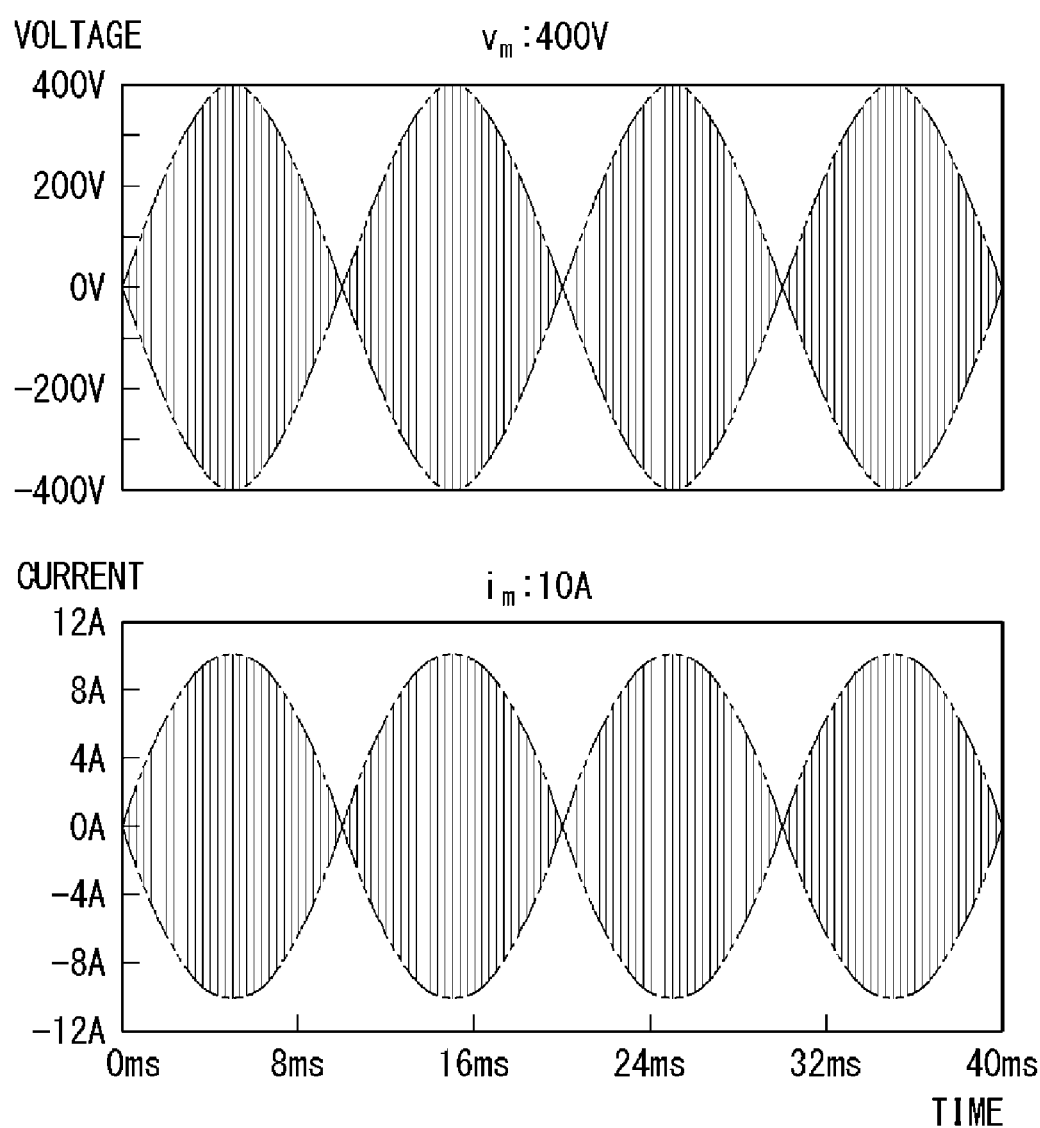
FIG. 5 is a waveform diagram showing voltage $v_m$ and current $i_m$ at an intermediate stage of transformation.

FIG. 5 is a waveform diagram showing voltage $v_m$ and current $i_m$ at an intermediate stage of transformation. Actually, these are composed of pulse trains based on switching, and as a whole, have such waveforms as shown in FIG. 5.

Figure 6:
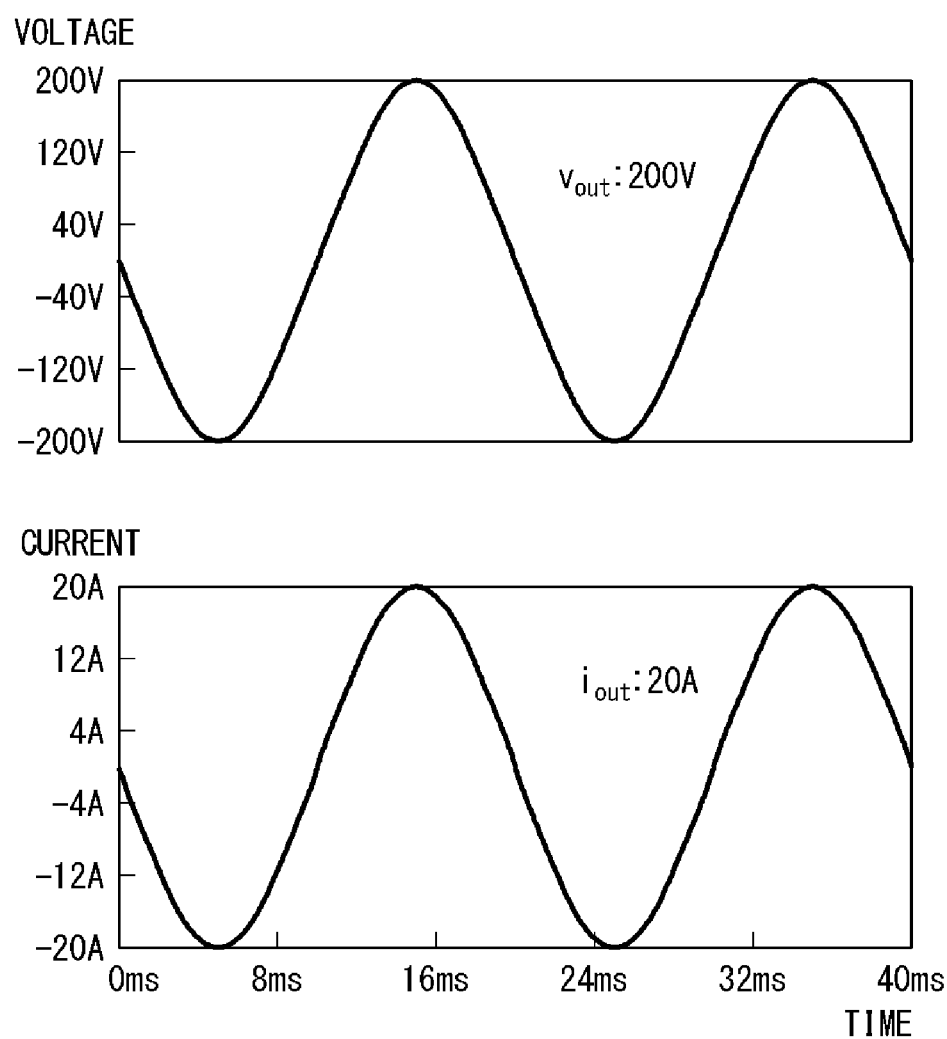
FIG. 6 is a waveform diagram in which an upper graph shows output voltage from the transformer and a lower graph shows output current from the transformer.

FIG. 6 is a waveform diagram in which an upper graph shows output voltage from the transformer 1 and a lower graph shows output current from the transformer 1. As is obvious from comparison between FIG. 4 and FIG. 6, voltage is transformed to be ¼, and along with this, current is quadrupled.

The transformer 1 shown in FIG. 1 is composed of a front stage circuit 1f including the switches $S_{r1}$ and $S_{b1}$ and the capacitors C1 and C2, and a rear stage circuit 1r including the switches $S_{r2}$ and $S_{b2}$ and the inductors L1 and L2. The circuit configurations of the front stage circuit 1f and the rear stage circuit 1r can be topologically expressed as follows.

That is, the front stage circuit 1f includes a "switch series unit" and "capacitors" described below.

The "switch series unit" is composed of two switches (Sr1 and Sb1) connected in series to each other. The odd-numbered switch ($S_{r1}$) and the even-numbered switch ($S_{b1}$), as seen from one end (e.g., an upper end) of both ends of the series unit, are configured to be alternately turned ON, and the switch series unit as a whole is connected in parallel to the power supply 2.

When a mutual connection point (N2) of the respective switches and points (N1 and N3) at the both ends of the switch series unit are regarded as three nodes in total and these three nodes are seen in order of 1 to 3 from one of the both ends of the switch series unit, the "capacitors (C1 and C2)" are disposed on at least one electrical path of a first electrical path and a second electrical path. The first electrical path combines the odd nodes (N1 and N3) and leads the odd nodes to a first output port Px, while the second electrical path leads the even node (N2) to a second output port Py. The "capacitors (C1 and C2)" are present so as to correspond to two nodes.

The rear stage circuit 1r includes an "element series unit" and "inductors" described below.

The "element series unit" is composed of a pair of switches ($S_{r2}$ and $S_{b2}$) that are connected in series to each other and perform conducting operations of mutually opposite polarities, and one of both ends of the series unit is connected to the first output port Px while the other end thereof is connected to the second output port Py.

The "inductors (L1 and L2)" are disposed on at least one electrical path of a third electrical path and a fourth electrical path. The third electrical path combines two nodes (N11 and N13) that are points at the both ends of the element series unit, and leads the nodes to one of both ends of the load R. The fourth electrical path leads one node (N12) that is a mutual connection point of the pair of switches to the other end of the load R. The "inductors (L1 and L2)" are present so as to correspond to two nodes (N11 and N13) among the three nodes in total.

<<Example of Original Circuit 2>>

Next, an example of a transformer obtained by practically developing the above-described original circuit will be described on the basis of the basic circuit.

Figure 7:
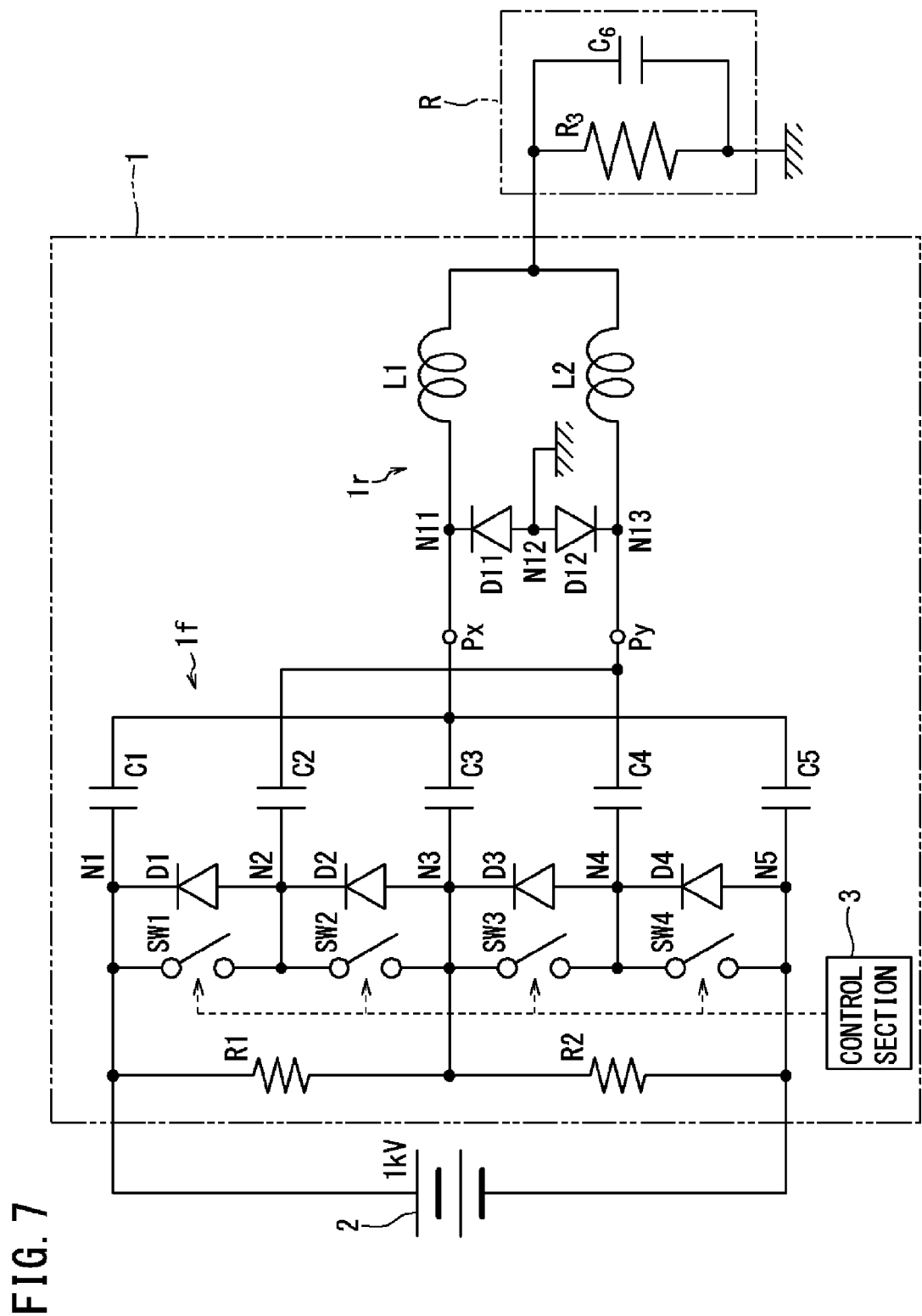
FIG. 7 is a circuit diagram showing an example of a transformer that is developed to be more practical.

FIG. 7 is a circuit diagram of such a transformer 1. This transformer 1 is provided between a power supply 2 and a load R, and is composed of a front stage circuit 1f, a rear stage circuit 1r, and a control section 3. For example, the power supply 2 is a DC power supply, and voltage is 1 kV. The load R includes a resistance $R_3$ and a capacitance $C_6$ as equivalent circuit elements.

The front stage circuit 1f includes bleeder resistors R1 and R2, switches SW1 to SW4, diodes D1 to D4 intrinsic to the switches SW1 to SW4, and capacitors C1 to C5, and these elements are connected as shown in FIG. 7.

The rear stage circuit 1r includes diodes D11 and D12 and inductors L1 and L2, and these elements are connected as shown in FIG. 7.

In addition, a control section 3 which performs ON/OFF control of the switches SW1 to SW4 is provided.

While five capacitors C1 to C5 are shown in FIG. 7, one of these capacitors can be omitted as described later. Therefore, using "4" equal to the number of the switches, the circuit shown in FIG. 7 is referred to as a "4C2L" circuit having 4C at the front stage and 2L at the rear stage. In contrast, the circuit shown in FIG. 1 is "2C2L".

The diodes D1 to D4 may be body diodes intrinsic to the switches SW1 to SW4, or may be external diodes provided separately from the switches SW1 to SW4 depending on the type of the switches SW1 to SW4. These diodes D1 to D4 function as freewheel diodes, and may reduce switching loss, and further, may eventually reduce inductances of the inductors L1 and L2 and thus contribute to downsizing.

When the circuit configuration of the transformer 1 shown in FIG. 7 is topologically expressed similarly to FIG. 1, the transformer 1 includes, as the front stage circuit 1f, a "switch series unit" and "capacitors (C1 to C5)".

The "switch series unit" is composed of the switches (SW1 to SW4) connected in series to each other. The odd-numbered switches (SW1 and SW3) and the even-numbered switches (SW2 and SW4), as seen from one end (e.g., an upper end) of both ends of the series unit, are alternately turned ON, and the switch series unit as a whole is connected in parallel to the power supply 2.

When mutual connection points (N2, N3, and N4) of the respective switches and points (N1 and N5) at the both ends of the switch series unit are regarded as five nodes in total and these five nodes are seen in order of 1 to 5 from one of the both ends of the switch series unit, the "capacitors (C1 to C5)" are disposed on at least one electrical path of a first electrical path and a second electrical path. The first electrical path combines the odd nodes (N1, N3, and N5) and leads the odd nodes to a first output port Px, and the second electrical path combines the even nodes (N2 and N4) and leads the even nodes to a second output port Py. The "capacitors (C1 to C5)" are present so as to correspond to five nodes.

In addition, the transformer 1 includes, as the rear stage circuit 1r, an "element series unit" and "inductors (L1 and L2)".

The "element series unit" is composed of a pair of semiconductor elements (D11 and D12) that are connected in series to each other, and perform conducting operations of mutually opposite polarities, and one of both ends of the series unit is connected to the first output port Px while the other end thereof is connected to the second output port Py.

The "inductors (L1 and L2)" are disposed on at least one electrical path of a third electrical path and a fourth electrical path. The third electrical path combines two nodes (N11 and N13) that are points at the both ends of the element series unit, and leads the two nodes to one of both ends of the load R. The fourth electrical path leads one node (N12) that is a mutual connection point of the pair of semiconductor elements to the other end of the load R. The "inductors (L1 and L2)" are present so as to correspond to two nodes (N11 and N13) among the three nodes in total.

It was confirmed that the transformer shown in FIG. 7 performs switching so that the switches SW1 and SW3 and the switches SW2 and SW4 are alternately turned ON under the same conditions as those for the transformer 1 shown in FIG. 1, and thus the transformer operates as a step-down circuit having a voltage transformation ratio of ⅛. That is, input voltage of 1 kV can be stepped down to DC voltage of 125 V.

<<Topological Variations>>

Next, topological variations of the circuit configuration of the transformer 1 (FIG. 1, FIG. 7, etc.) will be described.

(Topology of 2C Front Stage Circuit)

Figure 8:
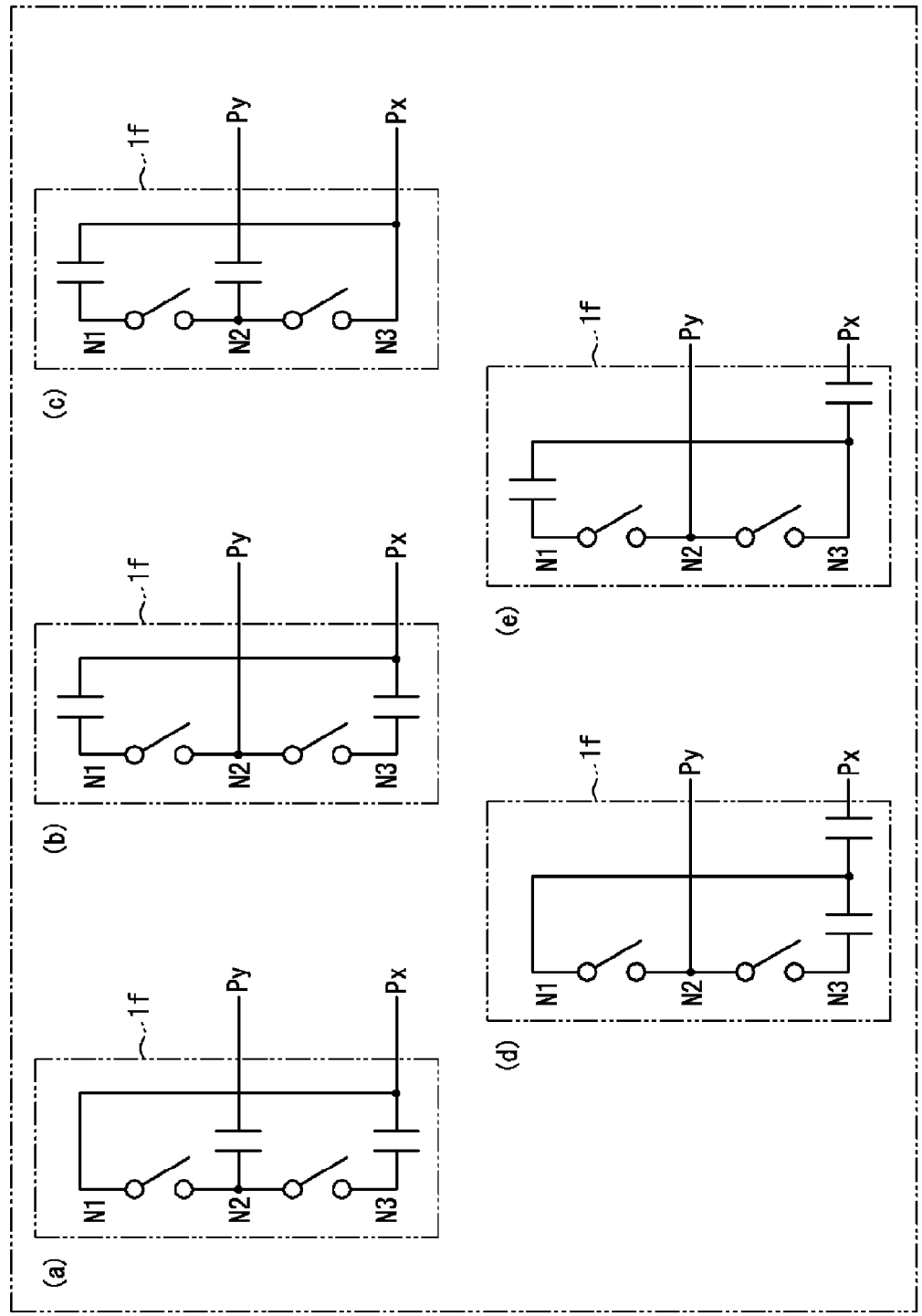
FIG. 8 is a circuit diagram showing topological variations of a main part of a front stage circuit in a "2C2L" transformer.
Figure 9:
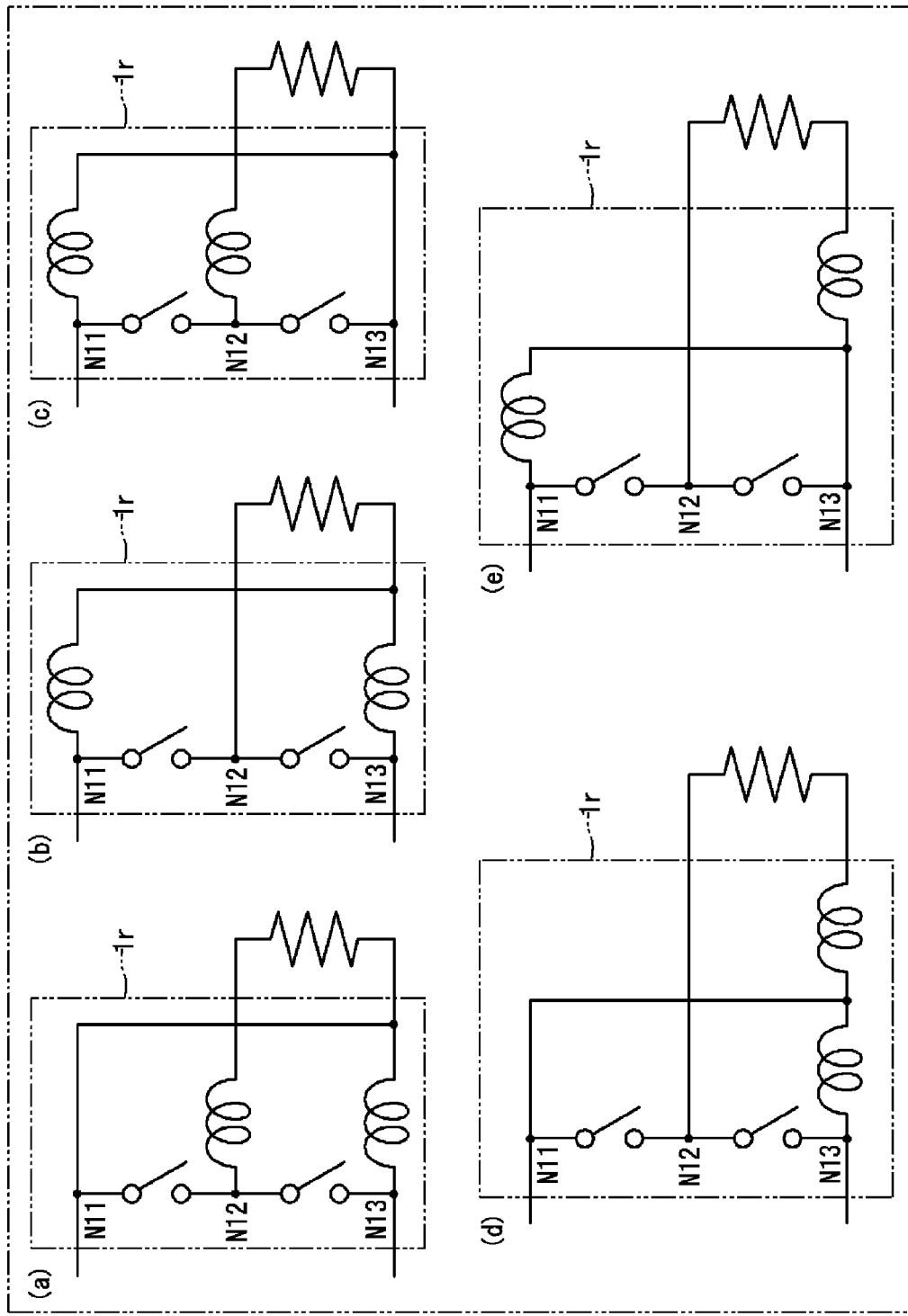
FIG. 9 is a circuit diagram showing topological variations of a main part of a rear stage circuit.

FIG. 8 is a circuit diagram showing topological variations of a main part of the front stage circuit 1f in the "2C2L" transformer 1. Circuits shown in (a) to (e) of FIG. 9 are each composed of a pair of switches and a pair of capacitors (reference numerals thereof are omitted).

In (a) of FIG. 8, capacitors are present so as to correspond to the node N3 of the switch series unit and the node N2 at the mutual connection point of the pair of switches. In (b) of FIG. 8, the topology of FIG. 1 is shown. In (c) of FIG. 8, capacitors are present so as to correspond to the node N1 of the switch series unit and the node N2 at the mutual connection point of the pair of switches. In (d) of FIG. 8, two capacitors are present so as to correspond to the node N3 of the switch series unit, and one capacitor is present in the output direction so as to correspond to the node N1. In (e) of FIG. 8, two capacitors are present so as to correspond to the node N1 of the switch series unit, and one capacitor is present in the output direction so as to correspond to the node N3.

Although two capacitors are present in any of the above circuits, capacitors may be present so as to correspond to all the nodes N1 to N3.

(Topology of 2L Rear Stage Circuit)

FIG. 9 is a circuit diagram showing topological variations of a main part of the rear stage circuit 1r. In each of circuits shown in (a) to (e) of FIG. 9, the rear stage circuit 1r connected to the load is composed of a pair of switches and a pair of inductors (reference numerals thereof are omitted). Instead of the switches, diodes may be used as shown in FIG. 7.

In (a) of FIG. 9, inductors are present so as to correspond to the node N13 of the switch series unit and the node N12 at the mutual connection point of the pair of switches. In (b) of FIG. 9, the topology of FIG. 1 is shown. In (c) of FIG. 9, inductors are present so as to correspond to the node N11 of the switch series unit and the node N12 at the mutual connection point of the pair of switches. In (d) of FIG. 9, two inductors are present so as to correspond to the node N13 of the switch series unit, and one inductor is present in the output direction so as to correspond to the node N11. In (e) of FIG. 9, two inductors are present so as to correspond to the node N11 of the switch series unit, and one inductor is present in the output direction so as to correspond to the node N13.

Although two inductors are present in any of the above circuits, inductors may be present so as to correspond to all the nodes N11 to N13.

(Topology of 4C Front Stage Circuit)

Figure 10:
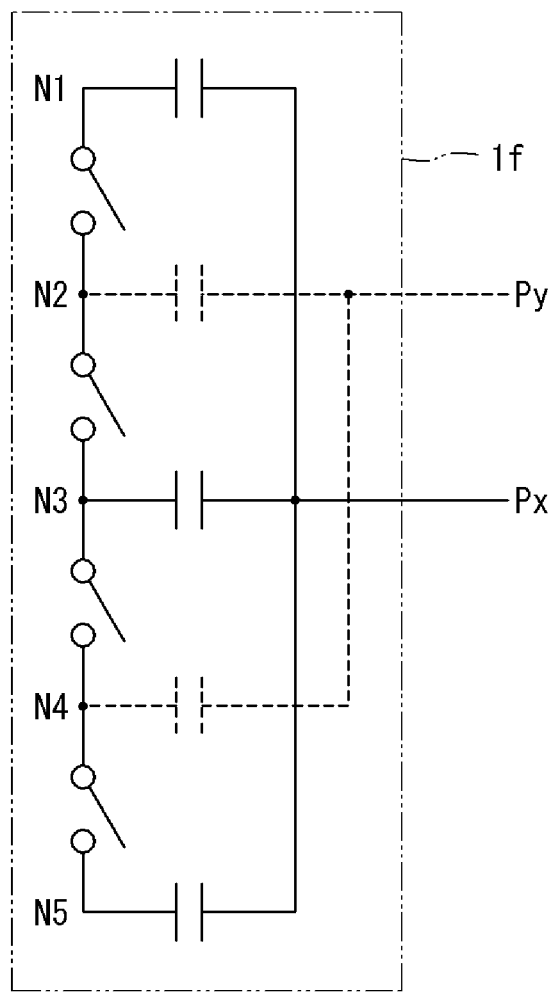
FIG. 10 is a diagram showing a main part of a front stage circuit in a "4C2L" transformer.

FIG. 10 shows the main part of the front stage circuit 1f in the "4C2L" transformer 1. In FIG. 10, a first electrical path that combines the odd nodes N1, N3, and N5 as seen from one of both ends of the switch series unit and leads the odd nodes to the first output port Px is represented by a solid line, and a second electrical path that combines the even nodes N2 and N4 and leads the even nodes to the second output port Py is represented by a dashed line. Expressing the second electrical path by the dashed line is simply for convenience of illustration, and the second electrical path coexists with the first electrical path.

This topology is identical to the front stage circuit 1f shown in FIG. 7.

In FIG. 10, one of the five capacitors may be omitted to provide "4C". Assuming that the number of nodes is m (=5), the number of corresponding capacitors needs to be at least four.

At least one capacitor needs to be interposed between nodes that are mutually combined and connected by the first electrical path (solid line) or the second electrical path (dashed line) among the five nodes N1 to N5, in order to realize DC insulation therebetween.

Figure 11:
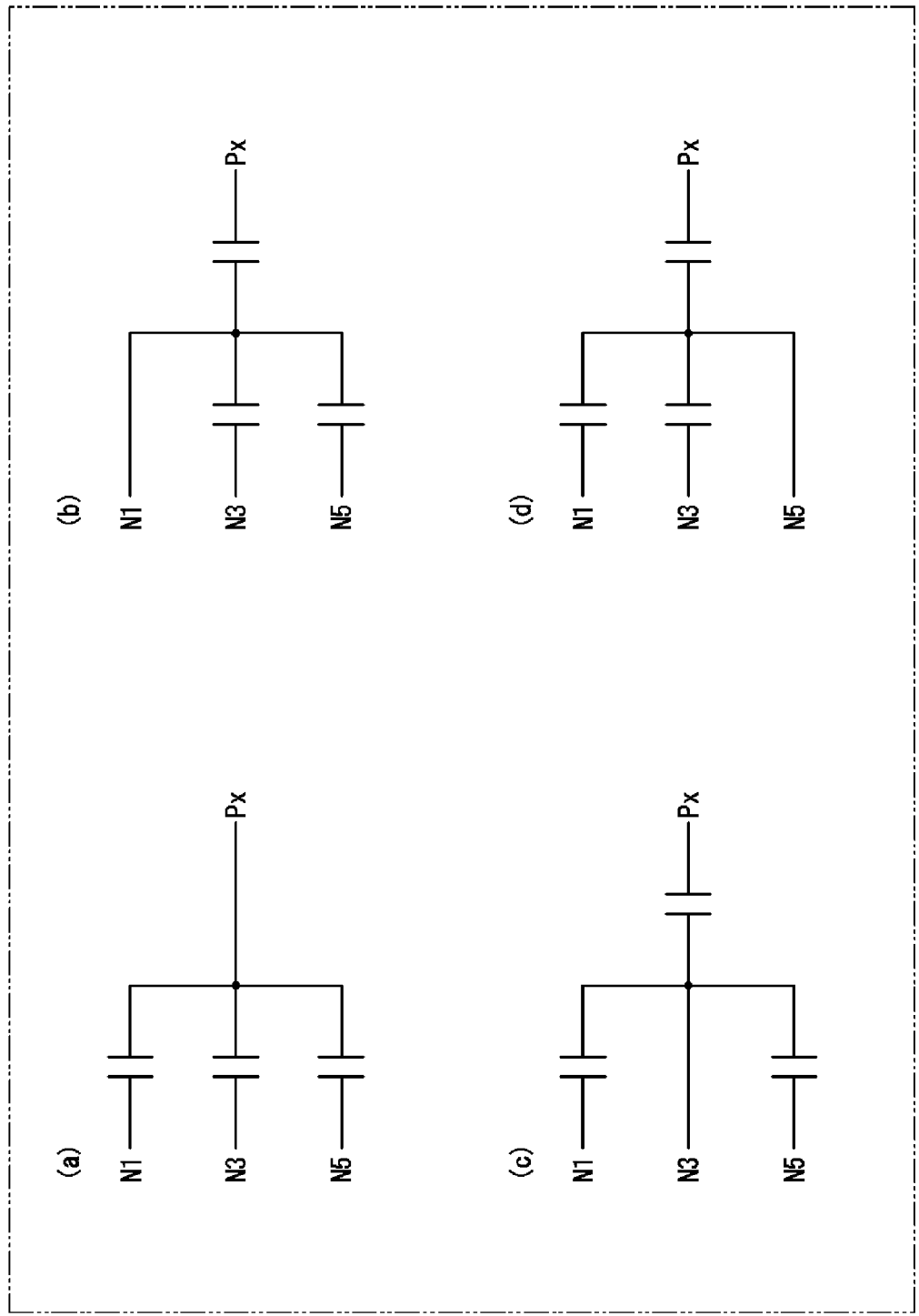
FIG. 11 is a diagram showing circuit variations of a first electrical path in a case where the total number of capacitors is not reduced in the first electrical path (solid line).
Figure 12:
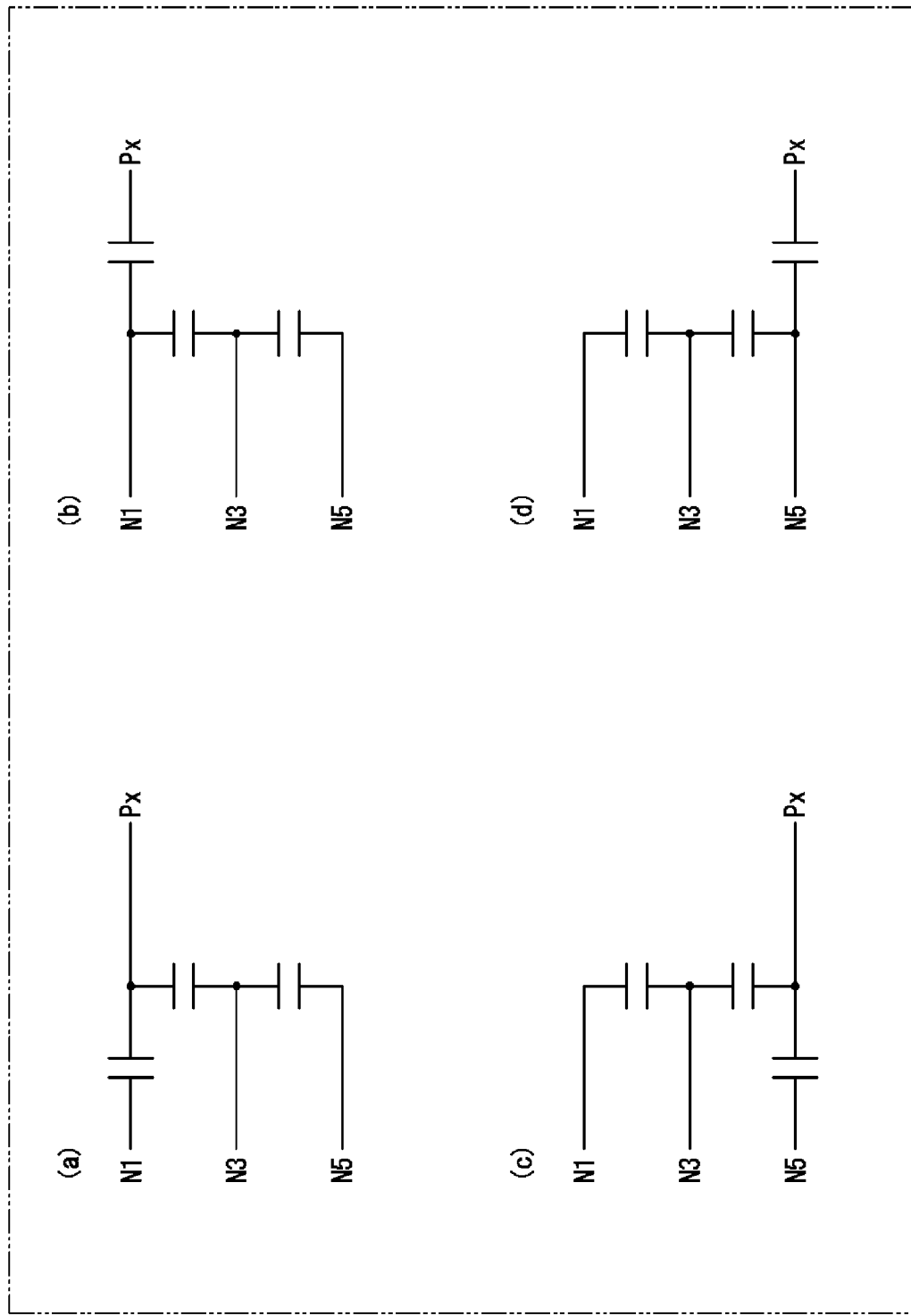
FIG. 12 is a diagram showing other circuit variations of the first electrical path in a case where the total number of capacitors is not reduced in the first electrical path (solid line).

FIG. 11 and FIG. 12 each show circuit variations of the first electrical path in the case where the total number of capacitors is not reduced in the first electrical path (solid line) shown in FIG. 10.

In the circuit shown in (a) of FIG. 11, three electrical paths before being combined into a single path are each provided with a capacitor (similar to FIG. 10). In the circuits shown in (b), (c), and (d) of FIG. 11, two of three electrical paths before being combined into a single path are each provided with a capacitor, and a single electrical path obtained by combining the three electrical paths is also provided with a capacitor.

In the circuits shown in (a), (b), (c), and (d) of FIG. 12, the electrical paths are combined in two stages, and capacitor(s) is/are provided before and/or after the electrical paths are combined.

Figure 13:
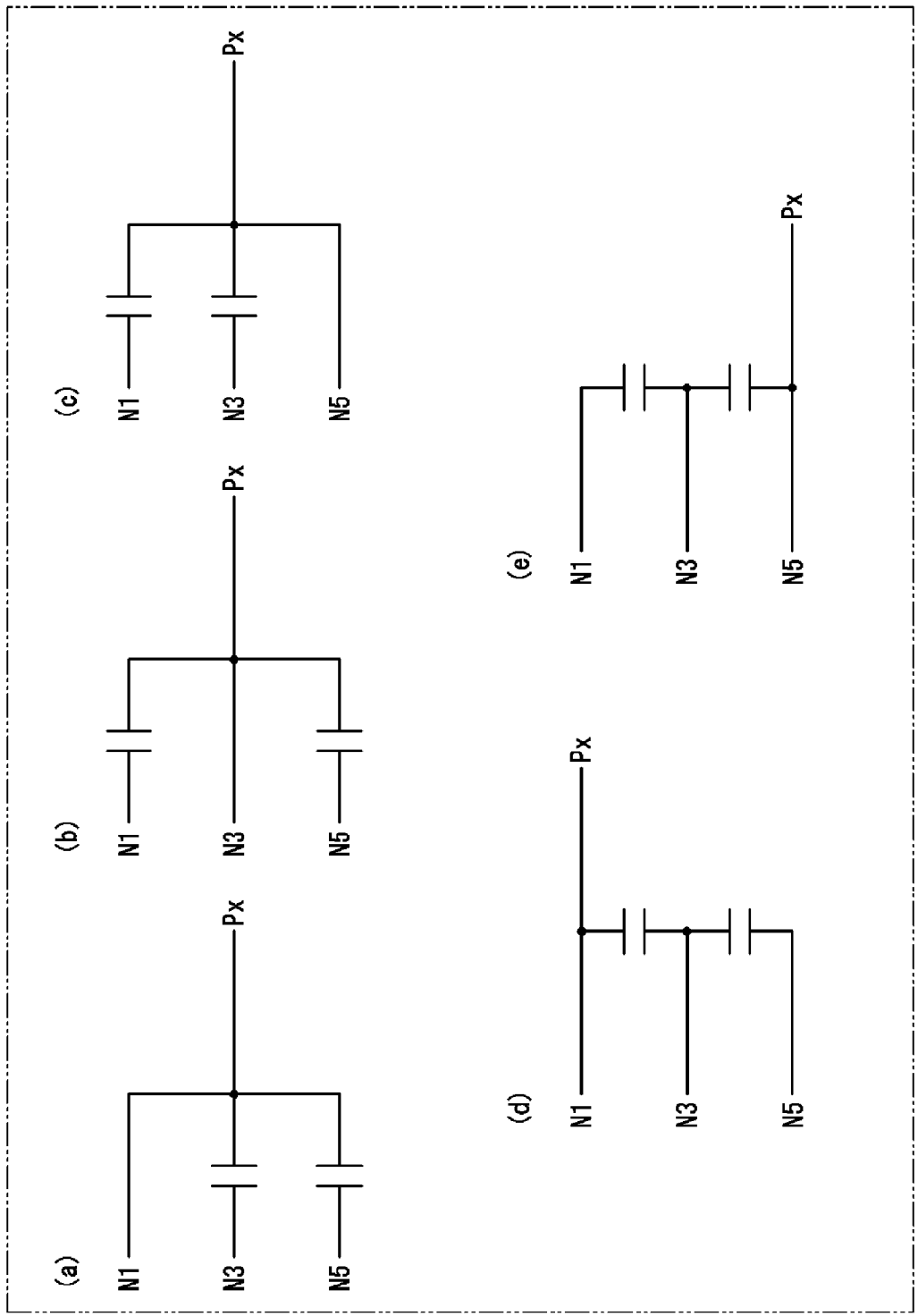
FIG. 13 is a diagram showing circuit variations of the first electrical path in a case where the total number of capacitors is reduced by one in the first electrical path (solid line) shown in FIG. 10.

FIG. 13 is a diagram showing circuit variations of the first electrical path in the case where the total number of capacitors is reduced by one in the first electrical path (solid line) shown in FIG. 10.

In the circuits shown in (a) to (e) of FIG. 13, one node among the nodes N1, N3, and N5 is directly connected to the first output port Px. The other nodes are each connected to the first output port Px via one capacitor or two capacitors.

Figure 14:
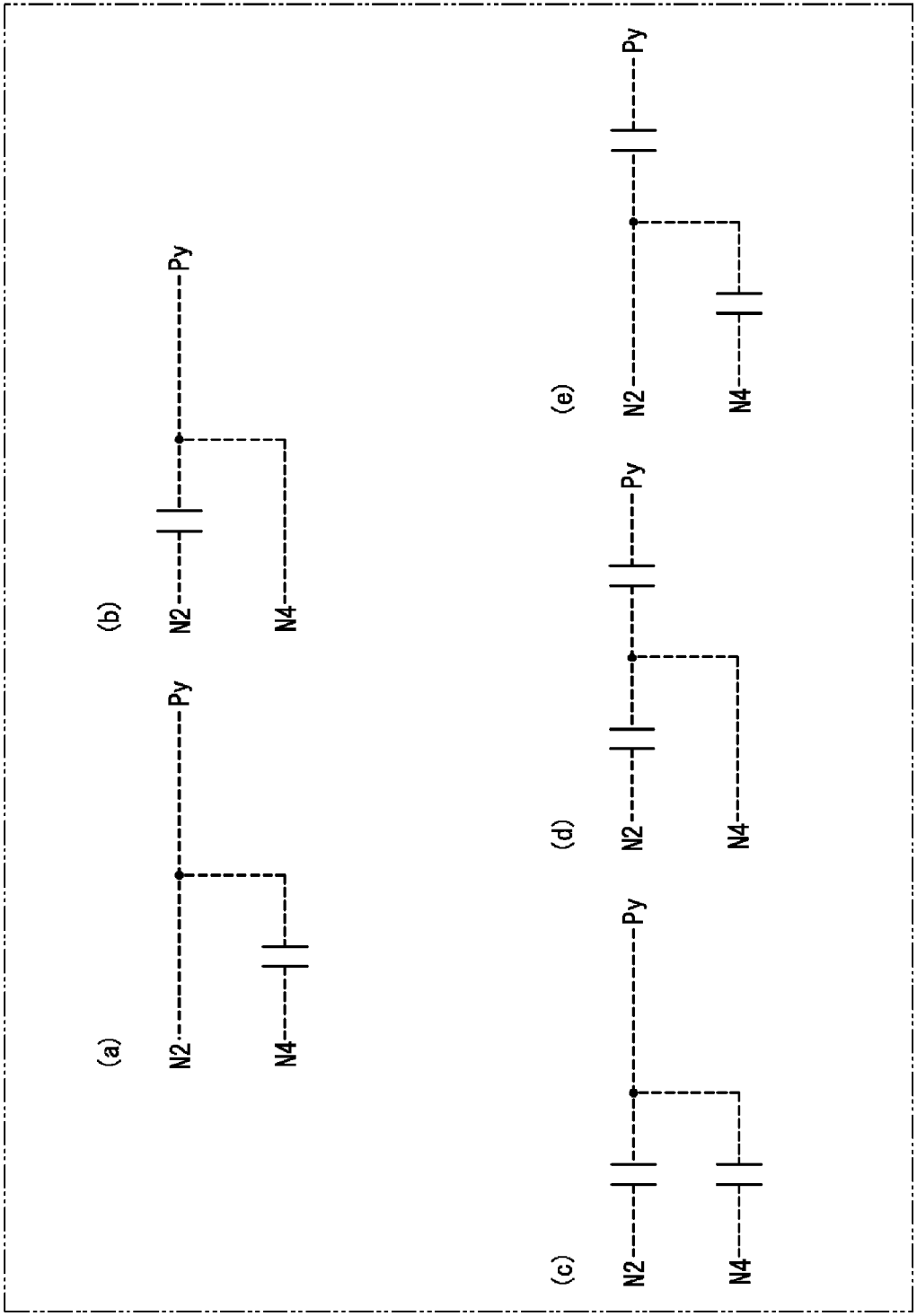
FIG. 14 is a diagram showing circuit variations of a second electrical path (dashed line) shown in FIG. 10.

FIG. 14 is a diagram showing circuit variations of the second electrical path (dashed line) shown in FIG. 10. In FIG. 14, (a) and (b) are circuit diagrams in the case where one capacitor is reduced in the second electrical path while no capacitor is reduced in the first electrical path. In the case of (a), the node N2 is directly connected to the second output port Py. The node N4 is connected to the second output port Py via a capacitor. In the case of (b), the node N4 is directly connected to the second output port Py. The node N2 is connected to the second output port Py via a capacitor.

In FIG. 14, (c), (d), and (e) are circuit diagrams in the case where one capacitor is reduced in the first electrical path while no capacitor is reduced in the second electrical path. In any of the cases of (c) (identical to FIG. 10), (d), and (e), the nodes N2 and N4 are each connected to the second output port Py via one capacitor or two capacitors.

(Topology of 6C Front Stage Circuit)

As a modification intended to increase a step-down ratio, "6C2L" is also conceivable.

Figure 15:
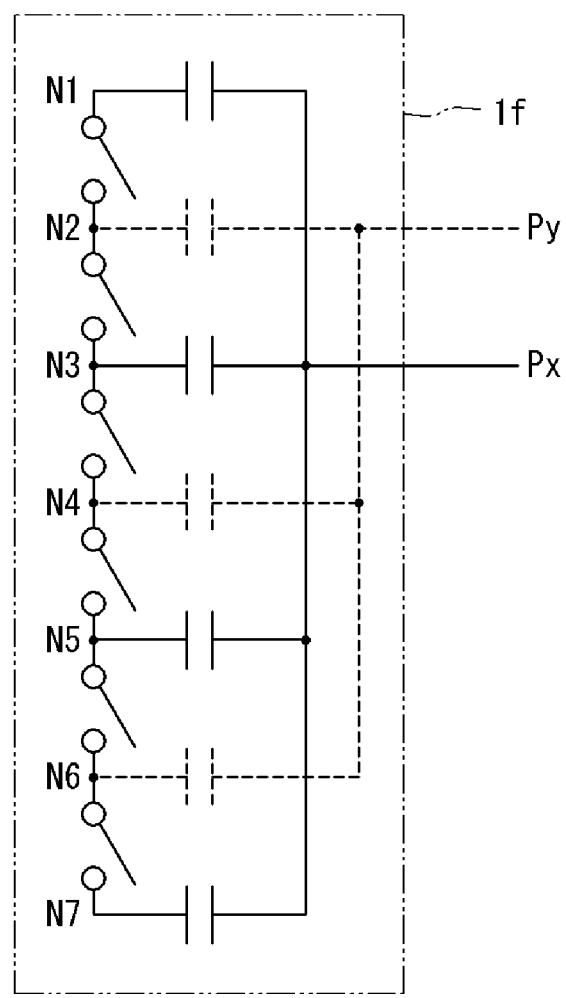
FIG. 15 is a diagram showing a main part of a front stage circuit in a "6C2L" transformer.

FIG. 15 shows a main part of a front stage circuit 1f in a "6C2L" transformer 1.

In FIG. 15, a first electrical path that combines odd nodes N1, N3, N5, and N7 as seen from one of both ends of the switch series unit and leads the odd nodes to the first output port Px is represented by a solid line, and a second electrical path that combines even nodes N2, N4, and N6 and leads the even nodes to the second output port Py is represented by a dashed line. Expressing the second electrical path by the dashed line is simply for convenience of illustration, and the second electrical path coexists with the first electrical path.

In the "6C2L" shown in FIG. 15, only one capacitor may be omitted from among seven capacitors to provide "6C". Assuming that the number of nodes is m (=7), the number of corresponding capacitors needs to be at least six.

At least one capacitor needs to be interposed between nodes that are mutually combined and connected by the first electrical path (solid line) or the second electrical path (dashed line) among the seven nodes N1 to N7, in order to realize DC insulation therebetween.

Figure 16:
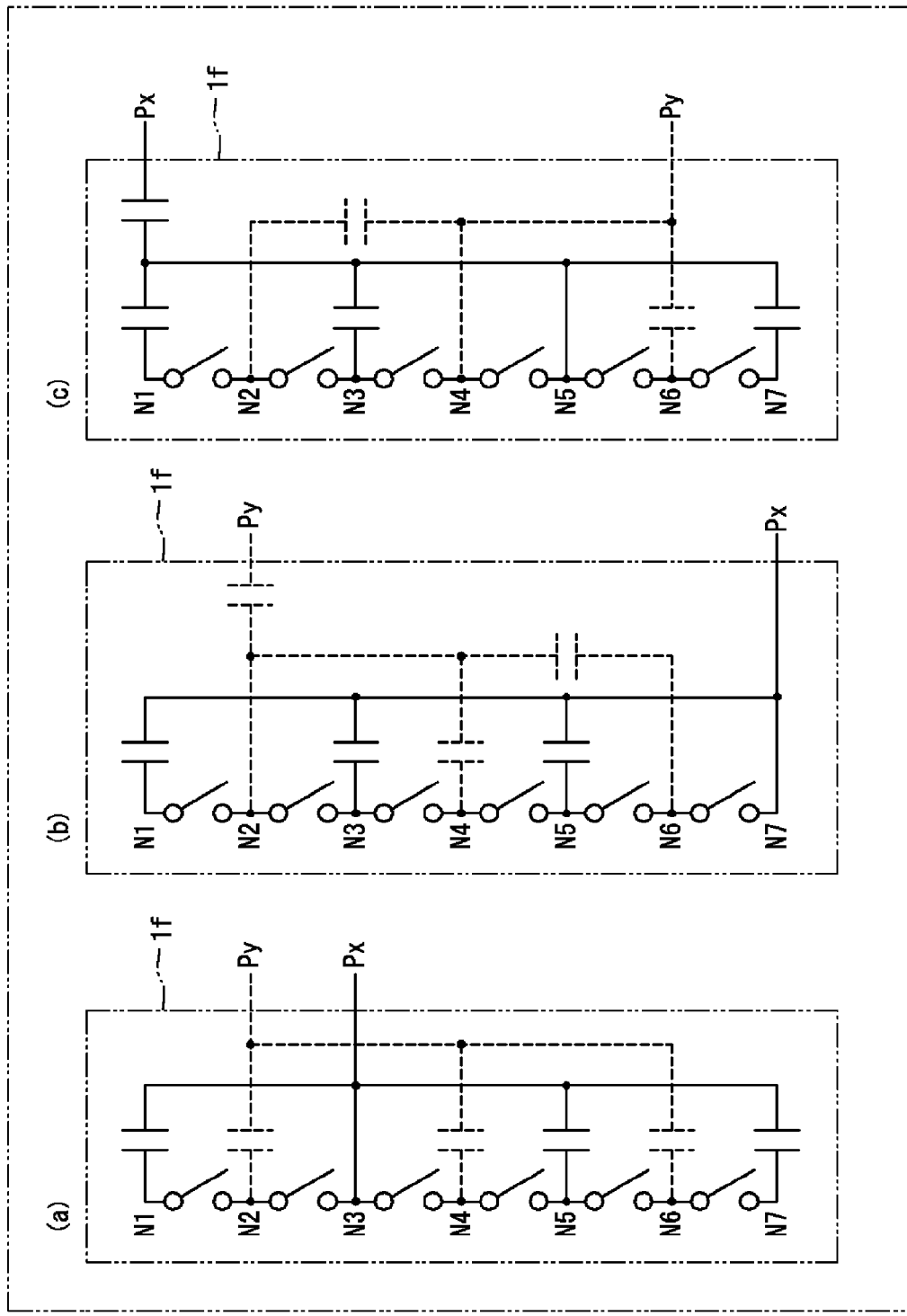
FIG. 16 is a diagram showing circuit variations in a case where the total number of capacitors are reduced by one in the first electrical path (solid line) or the second electrical path (dashed line) shown in FIG. 15.

FIG. 16 shows circuit variations in the case where one capacitor is reduced in the first electrical path (solid line) or the second electrical path (dashed line) shown in FIG. 15. In the circuit shown in (a) of FIG. 16, the node N3 is directly connected to the first output port Px without an interposed capacitor. In the circuit shown in (b), the node N7 is directly connected to the first output port Px without an interposed capacitor. In the circuit shown in (c), the node N4 is directly connected to the second output port Py without an interposed capacitor.

<<Overview of Topology>>

Further, the front stage circuit 1f can be similarly extended to "8C" or more.

On the basis of the various circuits exemplified above, the front stage circuit 1f can be topologically expressed as follows.

The front stage circuit 1f (see FIG. 1, FIG. 8, and FIGS. 10 to 16) includes: (a) a switch series unit composed of a plurality of switches, as many as a multiple of 2, connected in series to each other, the plurality of switches including odd-numbered switches and even-numbered switches as seen from one of both ends of the series unit, the odd-numbered switches and even-numbered switches being configured to be alternately turned ON, the switch series unit as a whole being connected in parallel to a power supply; and (b) assuming that mutual connection points of the respective switches and points at the both ends of the switch series unit are regarded as m nodes in total and these nodes are seen in order of 1 to m from one of the both ends of the switch series unit, capacitors provided on at least one electrical path of a first electrical path and a second electrical path, the first electrical path being configured to combine odd nodes and lead the odd nodes to a first output port, the second electrical path being configured to combine even nodes and lead the even nodes to a second output port, the capacitors being present so as to correspond to at least (m−1) nodes.

On the other hand, the rear stage circuit 1r (see FIG. 1, FIG. 7, and FIG. 9) includes: (c) an element series unit composed of a pair of semiconductor elements that are connected in series to each other and perform conducting operations of mutually opposite polarities, one of both ends of the series unit being connected to the first output port while the other end being connected to the second output port; and (d) inductors provided on at least one electrical path of a third electrical path and a fourth electrical path, the third electrical path being configured to combine two nodes that are points at the both ends of the element series unit and lead the two nodes to one end of a load, the fourth electrical path being configured to lead one node that is a mutual connection point of the pair of semiconductor elements to the other end of the load, the inductors being present so as to correspond to at least two nodes of the three nodes in total.

If the semiconductor elements of the rear stage circuit 1r are diodes, the element series unit can be configured by connecting the diodes in series with conducting directions thereof being opposite to each other. If the semiconductor elements are switches, the element series unit is configured by connecting a pair of switches in series, and the pair of switches are alternately turned ON.

The transformer 1 as described above can perform transformation by the circuit configuration including the front stage circuit 1f and the rear stage circuit 1r and by switching. Using the transformer 1 as a power transformer makes it unnecessary to use a conventional transformer including a coil, an iron core, and the like. Therefore, it is possible to realize drastic size reduction and weight reduction of a transformer, and thereby realize cost reduction accordingly. In addition, problems of parasitic capacitance and occurrence of magnetic field leakage, which arise in a high-frequency transformer, are also solved, and thus a transformer with low loss can be realized. As for the power supply, either an AC power supply or a DC power supply is applicable.

<<Input/Output Common Grounding Type Transformer>>

Next, an input/output common grounding type transformer which is, so to speak, a main subject of the present invention will be described. The transformers 1 shown in FIG. 1 and FIG. 7 are not capable of input/output common grounding from the power supply 2 to the load R. Grounding is facilitated if input/output common grounding is possible. Therefore, modification to an input/output common grounding type transformer is considered.

Figure 17:
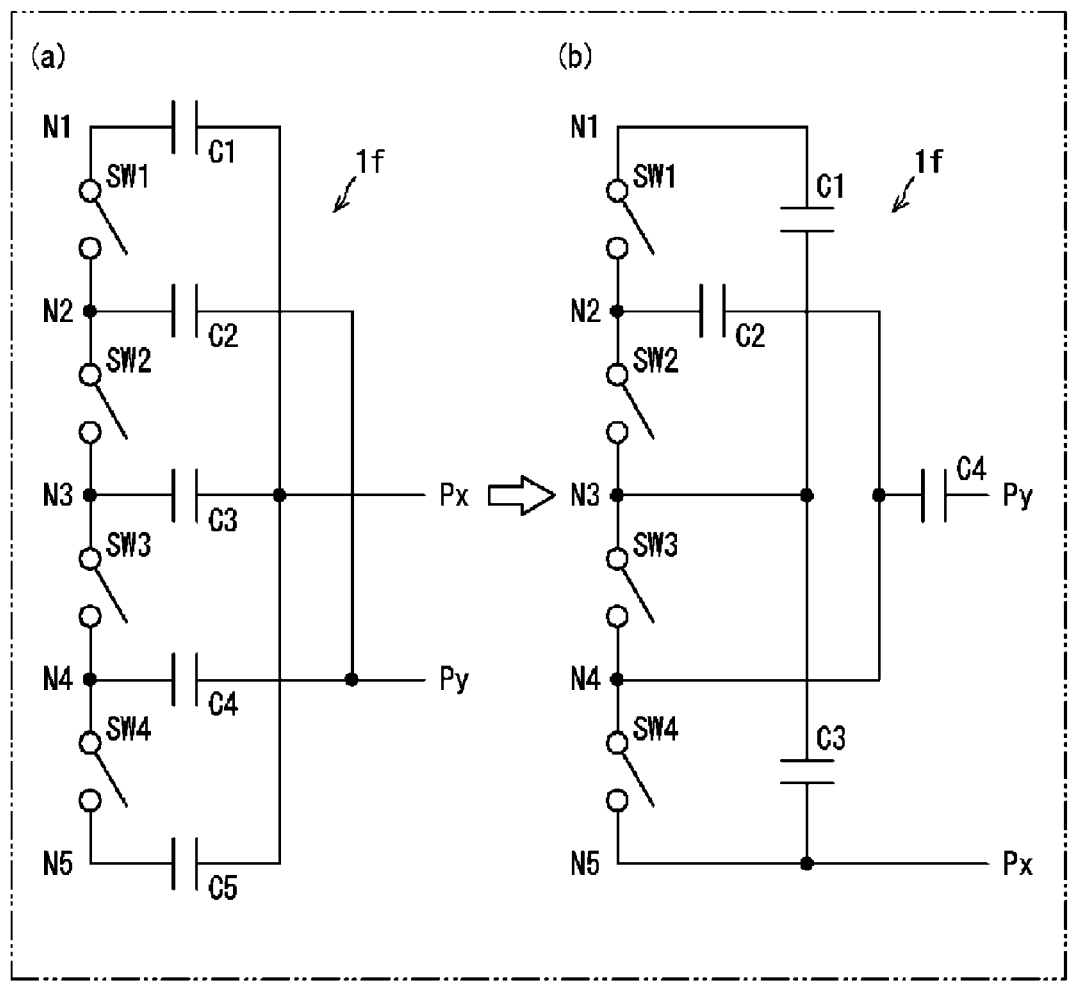
FIG. 17 is a circuit diagram showing a manner of modifying a front stage circuit to an input/output common grounding type.

FIG. 17 is a circuit diagram showing a manner of modifying a front stage circuit 1f to the input/output common grounding type. In FIG. 17, (a) shows a front stage circuit 1f similar to that shown in FIG. 7 and FIG. 10, and (b) shows a front stage circuit 1f that performs an input/output operation equivalent to that of the front stage circuit 1f shown in (a) of FIG. 17. Here, the topology shown in (e) of FIG. 13 and the topology shown in (d) of FIG. 14 are used. According to the front stage circuit 1f shown in (b) of FIG. 17, the node N5 can be directly connected to the first output port Px without an interposed capacitor. Therefore, the front stage circuit 1f shown in (b) of FIG. 17 is suitable for input/output common grounding.

Figure 18:
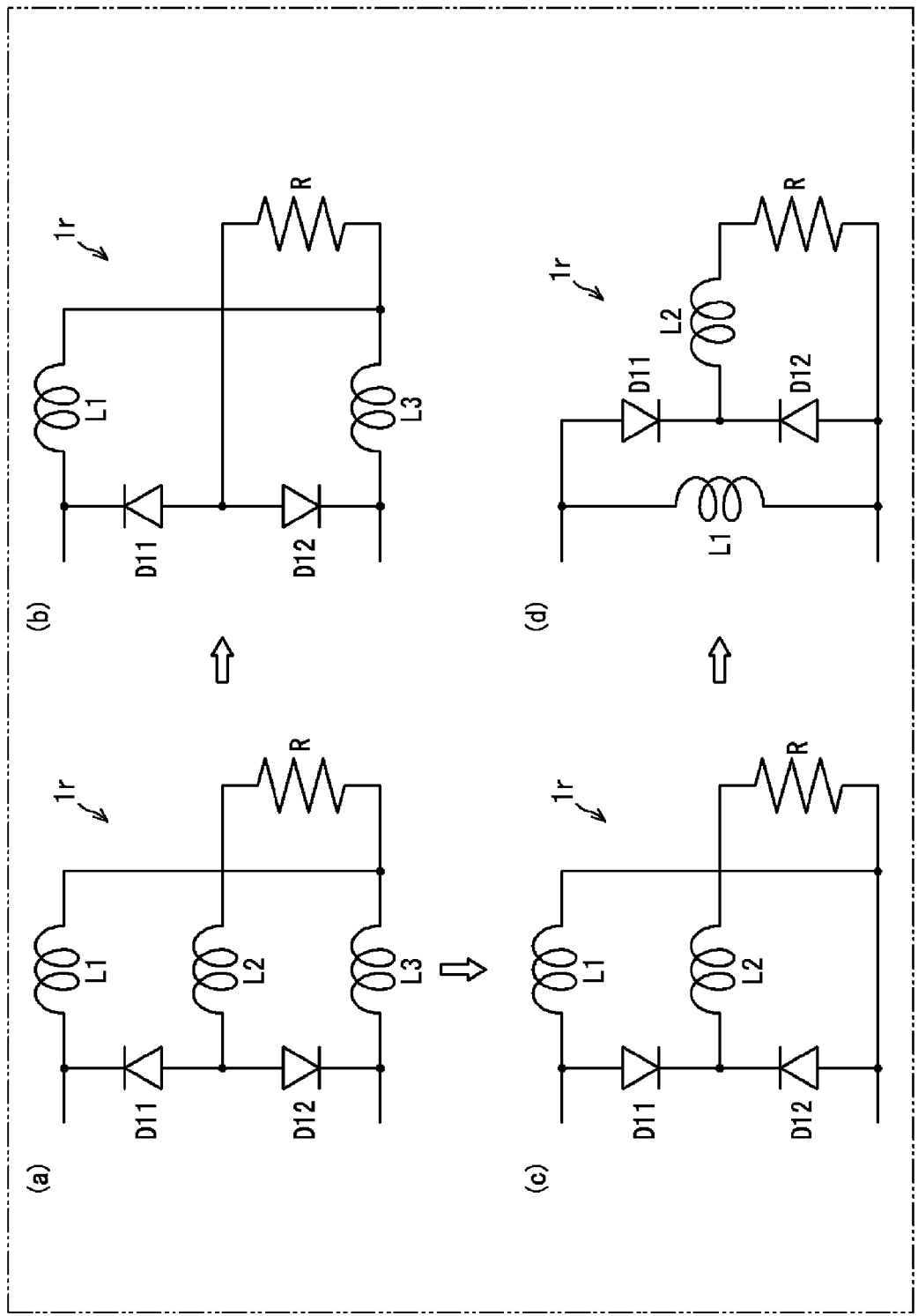
FIG. 18 is a circuit diagram showing a manner of modifying a rear stage circuit connected to a load, to the input/output common grounding type.

FIG. 18 is a circuit diagram showing a manner of modifying the rear stage circuit 1r connected to the load R, to the input/output common grounding type. In FIG. 18, (a) shows a circuit using three inductors L1 to L3, which can be also referred to as an original form of the rear stage circuit 1r. This circuit can be modified to a circuit shown in (b) of FIG. 18 by omitting the inductor L2. However, the circuit shown in (b) is not suitable for a case where an electrical path located at the bottom of the circuit is desired to be grounded. Therefore, the inductor L3 is omitted from (a) and the polarities of the diodes D11 and D12 are inverted to make a circuit shown in (c) of FIG. 18. The circuit shown in (c) has no circuit element in the electrical path located at the bottom of the circuit, and therefore is suitable for input/output common grounding. The circuit shown in (c) becomes a circuit shown in (d) of FIG. 18 when being expressed with the position of the inductor L1 being changed. The circuit shown in (c) and the circuit shown in (d) are the same in terms of circuit connection.

Figure 19:
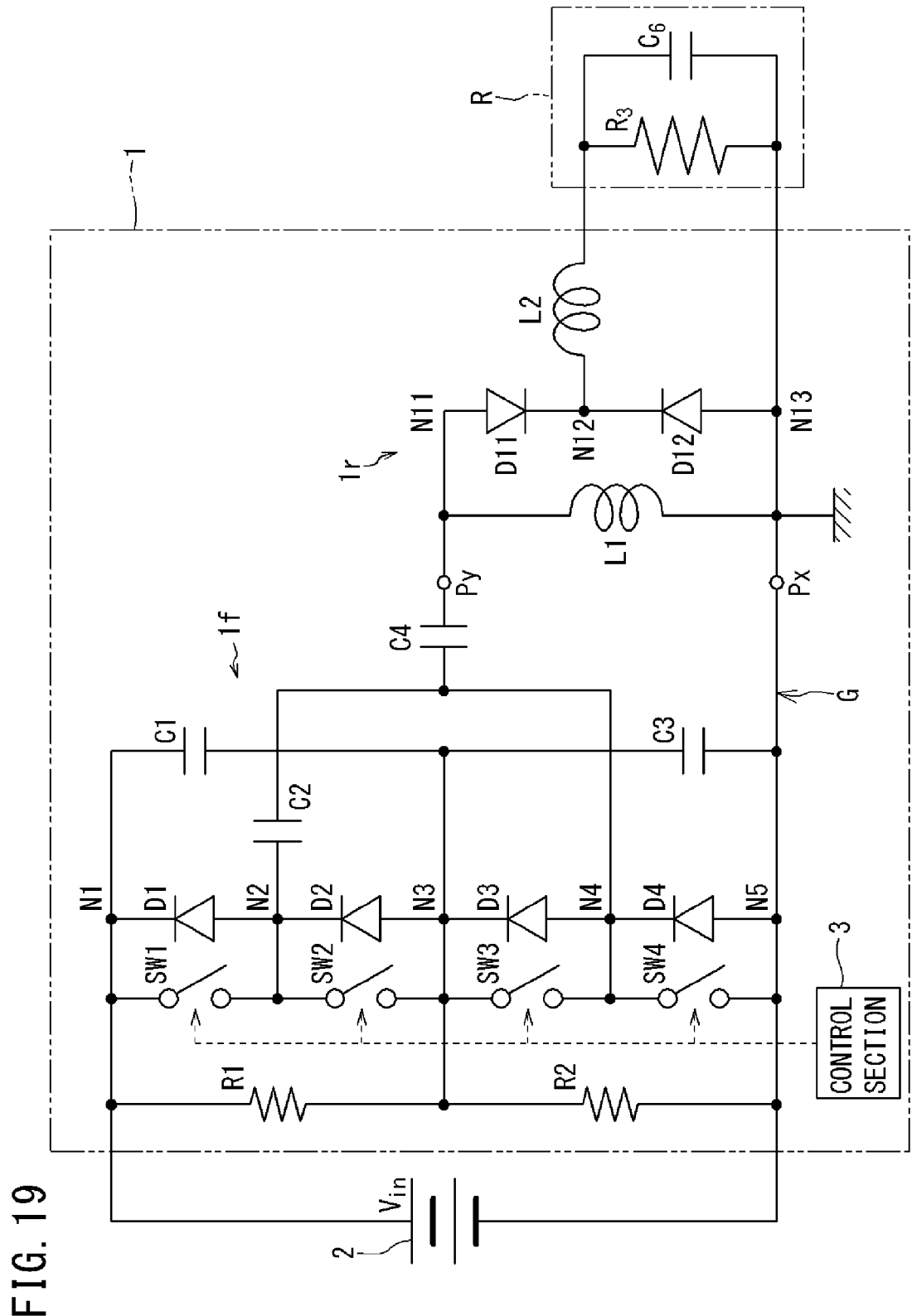
FIG. 19 is a circuit diagram showing an input/output common grounding type transformer.

FIG. 19 is a circuit diagram showing an input/output common grounding type transformer 1. This transformer 1 is obtained by applying the manner of modification shown in FIG. 17 and FIG. 18 to the circuit shown in FIG. 7.

In FIG. 19, the transformer 1 is provided between a power supply 2 and a load R, and is composed of a front stage circuit 1f and a rear stage circuit 1r.

The front stage circuit 1f includes a "switch series unit", "capacitors", and a "ground electrical path" described below. The "switch series unit" is composed of four switches SW1 to SW4 connected in series to each other. As seen from, for example, an upper end of the series unit, the odd-numbered switches SW1 and SW3 and the even-numbered switches SW2 and SW4 are alternately turned ON, and the switch series unit as a whole is connected in parallel to the power supply 2.

Assuming that mutual connection points N2, N3, and N4 of the respective switches and points N1 and N5 at the both ends of the switch series unit are regarded as five nodes in total and one of the points at the both ends is regarded as a ground node N5, there are a first electrical path that combines the odd nodes N1, N3, and N5 as seen from the upper end of the switch series unit, and leads the odd nodes to a first output port Px, and a second electrical path that combines the even nodes N2 and N4 as seen from the upper end of the switch series unit, and leads the even nodes to a second output port Py.

The first electrical path is provided with capacitors C1 and C3, and the second electrical path is provided with capacitors C2 and C4. These capacitors are present in the output direction so as to correspond to the four nodes other than the ground node N5. The correspondence between the nodes and the capacitors is as follows:

N1: C1, C3
N2: C2, C4
N3: C3
N4: C4

The ground electrical path G connects the ground node N5 directly to the first output port Px without an interposed capacitor.

When the "switch series unit" is generally expressed with various topologies being assumed, the switch series unit is composed of a plurality of switches, as many as a multiple of 2, connected in series to each other, the odd-numbered switches and the even-numbered switches, as seen from one of both ends of the series unit, are alternately turned ON, and the switch series unit as a whole is connected in parallel to the power supply.

When the mutual connection points of the respective switches and the points at the both ends of the switch series unit are regarded as m nodes in total, one of the points at the both ends is regarded as a ground node, and these nodes are seen in order of 1 to m from one of the both ends of the switch series unit, the "capacitors" are provided on at least one electrical path of the first electrical path that combines the odd nodes and leads the odd nodes to the first output port, and the second electrical path that combines the even nodes and leads the even nodes to the second output port, and the "capacitors" are present so as to correspond to (m−1) nodes excluding the ground node.

Meanwhile, the rear stage circuit 1r includes a "diode series unit" and "inductors".

The "diode series unit" is composed of a pair of diodes D11 and D12 that are connected in series to each other and perform conducting operations of mutually opposite polarities, and one (node N13) of both ends of the series unit is connected to the first output port Px and to a grounded end of the load R while the other end (node N11) of the series unit is connected to the second output port Py.

The inductor L1 is provided in the third electrical path that leads a non-grounded end (node N11) of the diode series unit to the grounded end of the load R. The inductor L2 is provided in the fourth electrical path that leads a mutual connection point (node N12) of the pair of diodes D11 and D12 to a non-grounded end of the load R.

The diodes D11 and D12 may be switches controlled so as to perform similar operations. Therefore, in more general expression, the rear stage circuit 1r includes an "element series unit" and "inductors".

The element series unit is composed of a pair of semiconductor elements that are connected in series to each other and perform conducting operations of mutually opposite polarities, one of both ends of the series unit is connected to the first output port and to the grounded end of the load while the other end thereof is connected to the second output port.

The "inductors" are provided in a third electrical path that leads a non-grounded end of the element series unit to the grounded end of the load and in a fourth electrical path that leads a mutual connection point of the pair of semiconductor elements to the non-grounded end of the load, respectively.

The input/output common grounding type transformer 1 configured as described above can perform transformation by the circuit configuration including the front stage circuit 1f and the rear stage circuit 1r and by switching as in FIG. 7. Using this transformer 1 as a power transformer makes it unnecessary to use a conventional transformer including a coil, an iron core, and the like. Therefore, it is possible to realize drastic size reduction and weight reduction of the transformer, and thereby realize cost reduction accordingly. In addition, problems of parasitic capacitance and occurrence of magnetic field leakage, which arise in a high-frequency transformer, are also solved, and thus a transformer with low loss can be realized. As for the power supply, either an AC power supply or a DC power supply is applicable.

This transformer 1 is capable of input/output common grounding from the power supply 2 to the load R. This is advantageous in that a ground wire can be shared. In addition, reduction in the number of parts can be achieved.

<<Design of Dead Time>>

Next, design of a dead time in the transformer 1 shown in FIG. 19 will be described. A dead time is a transient time from a moment when control for all switches is turned OFF to when control for either switches is turned on when the odd-numbered switches SW1 and SW3 and the even-numbered switches SW2 and SW4 shown in FIG. 19 are alternately turned ON.

Figure 20:
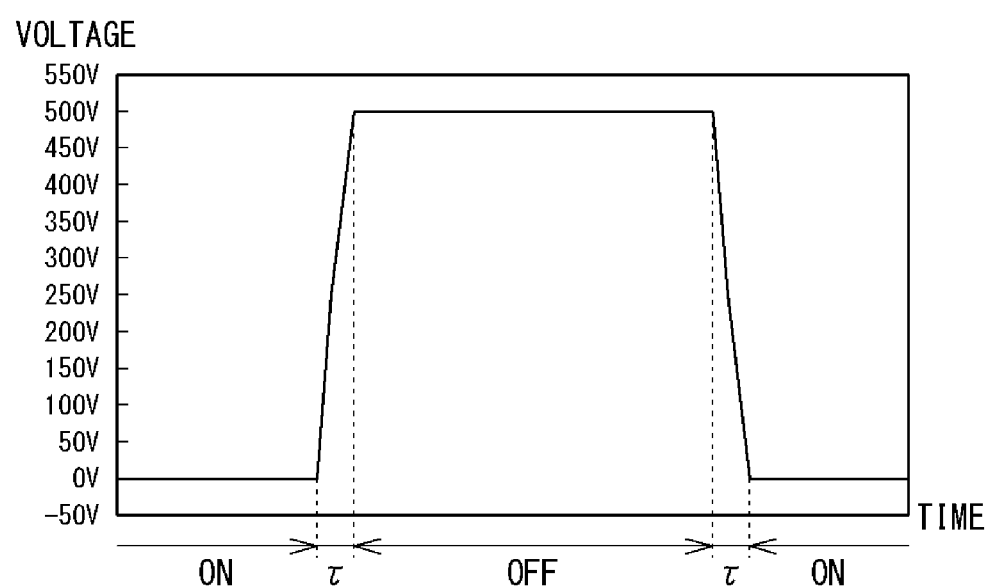
FIG. 20 is a graph showing a change in switching voltage (drain-to-source voltage) when odd-numbered switches or even-numbered switches change from ON to OFF and then change to ON again.

FIG. 20 is a graph showing a change in switching voltage (drain-to-source voltage) when the odd-numbered switches or the even-numbered switches change from ON to OFF and then change to ON again. When the switches are ON, the switching voltage is 0 V. When the switches are OFF, the switching voltage is 500 V, for example. There is a transient voltage change in a dead time $\tau$ during the ON to OFF change or the OFF to ON change of the switches. When the switches change from OFF to ON, zero voltage transition (ZVT) in which the switching voltage drops to 0 V and thereafter the switches change to ON is desired in order to minimize switching loss.

Figure 21:
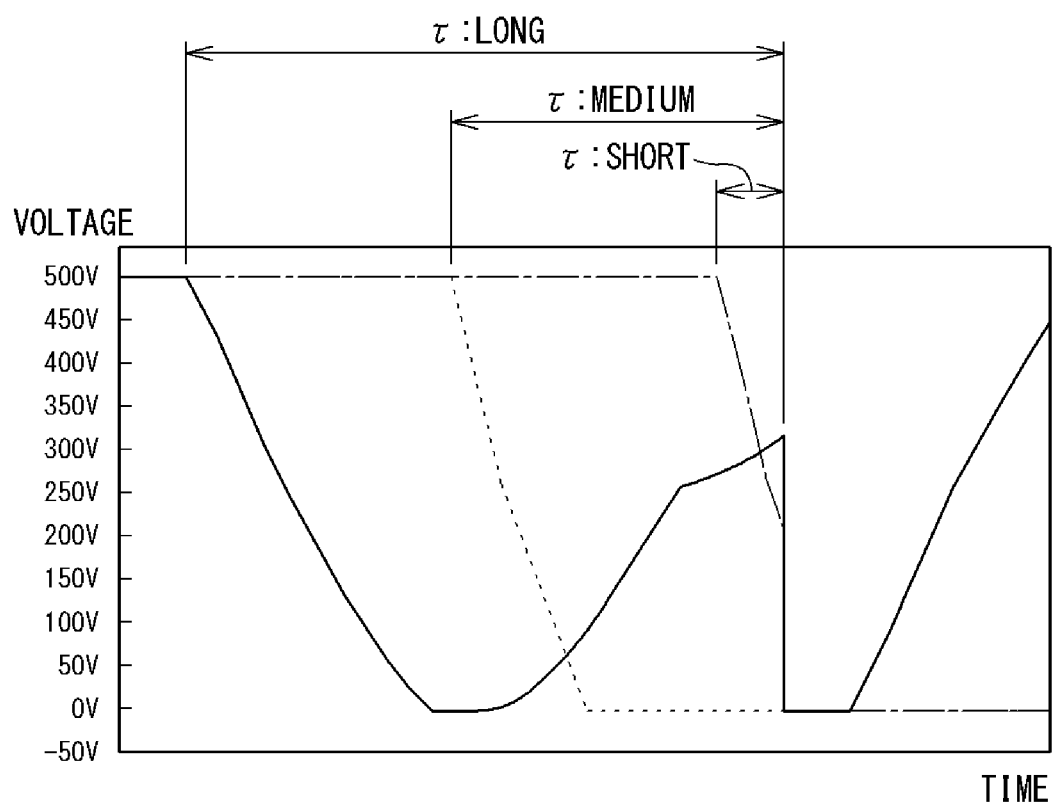
FIG. 21 is a graph showing the relationship between ZVT and the length of dead time from OFF to ON, which is set to be "long", "medium", and "short".

FIG. 21 is a graph showing the relationship between ZVT and the length of the dead time from OFF to ON, which is set to be "long", "medium", and "short". In FIG. 21, when the dead time τ is shorter than an appropriate value (medium), a voltage change indicated by an alternate long and short dash line occurs, and next ON starts before the voltage reaches 0 V. That is, this is not ZVT. On the other hand, when the dead time τ is longer than the appropriate value (medium), a voltage change indicated by a solid line occurs and the voltage once reaches 0 V, but thereafter the voltage increases again, and eventually, next ON starts with the voltage remaining increased. That is, this is also not ZVT. Therefore, there is an appropriate (not too long and not too short) range of "τ" indicated by the dashed line.

Figure 22:
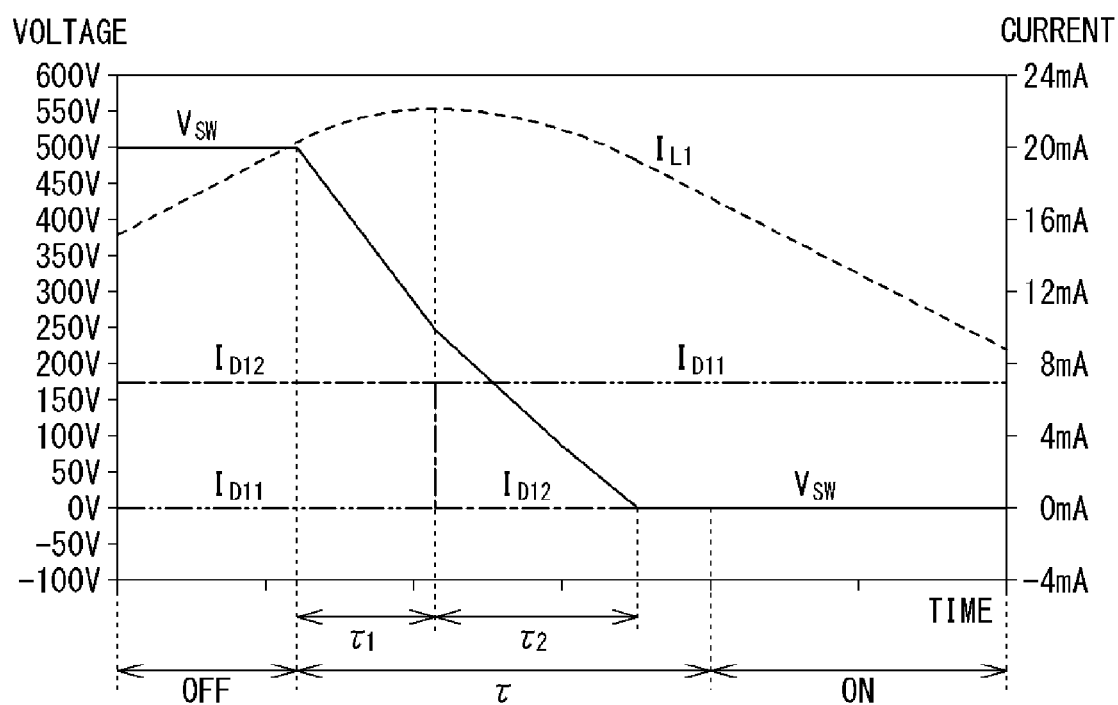
FIG. 22 is a graph showing changes of various amounts when switches change from OFF to ON across dead time $\tau$, with the time on the horizontal axis being scaled up.

FIG. 22 is a graph showing changes of various amounts when the switches change from OFF to ON across the dead time τ, with the time on the horizontal axis being scaled up. In FIG. 22, changes of amounts of: any one switching voltage $V_{SW}$ (solid line); current $I_{L1}$ (dashed line) that flows into the inductor L1; current $I_{D11}$ that flows into the diode D11; and current $I_{D12}$ that flows into the diode D12, are shown.

It is found that, in FIG. 22, the dead time τ includes a first half time $τ_1$ from 500 V to 250 V, and a subsequent second half time $τ_2$ from 250 V to 0 V. That is, the following relationship is satisfied:

$$τ≥τ_1+τ_2 \quad (1)$$

The gradient of the first half time $τ_1$ and the gradient of the second half time $τ_2$ are slightly different from each other, and $τ_1<τ_2$ is satisfied. Therefore, the dead time τ can be considered separately for the first half time $τ_1$ and the second half time $τ_2$. Assuming that the output voltage of 125 V from the transformer 1 is $V_{out}$, $τ_1$: a period in which the voltage is from $4 V_{out}$ to $2 V_{out}$
$τ_2$: a period in which the voltage is from $2 V_{out}$ to 0

During the first half time $τ_1$, the diode D12 is in the conductive state, and current $I_{D12}$ flows. During the second half time $τ_2$, the diode D11 is in the conductive state, and current $I_{D11}$ flows.

Figure 23:
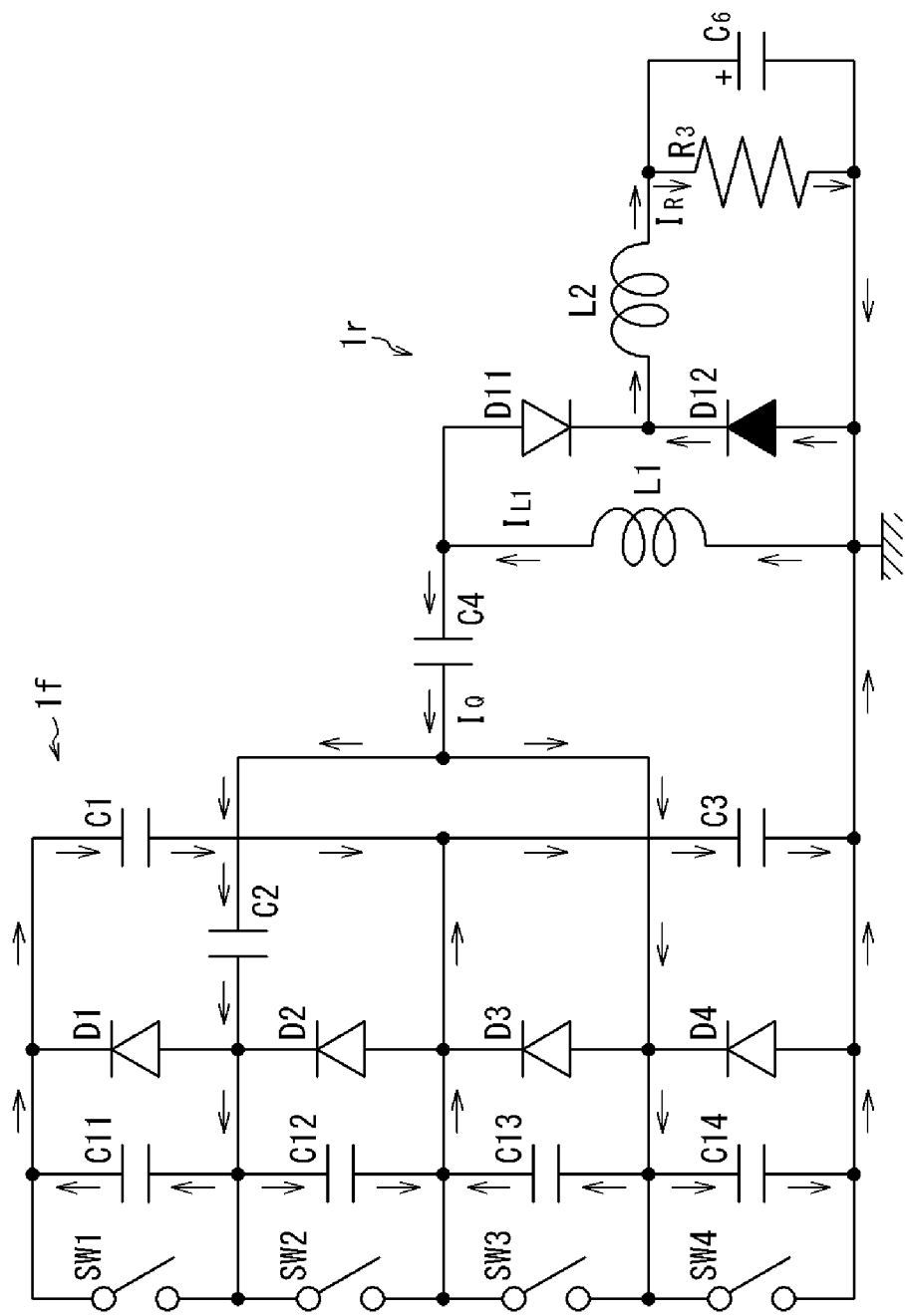
FIG. 23 is a diagram showing a current flow during first half time in the circuit on the stage subsequent to the switches, with floating capacitances of the respective switches shown in FIG. 19 being shown therein.

FIG. 23 shows a current flow during the first half time $τ_1$ in the circuit on the post stage with respect to the switches SW1 to SW4, with floating capacitances C11 to C14 possessed by the switches SW1 to SW4 shown in FIG. 19 being shown therein. The floating capacitances C11 to C14 have a common capacitance $C_{DS}$.

During the first half time $τ_1$, the diode D12 is in the conductive state while the diode D11 is not in the conductive state. In this state, current $I_Q$ that flows from the rear stage circuit 1r into the floating capacitances C11 to C14 of the front stage circuit 1f is equal to the current that flows into the inductor L1, and the following relationship is satisfied:

$$I_Q=I_{L1}$$

Figure 24:
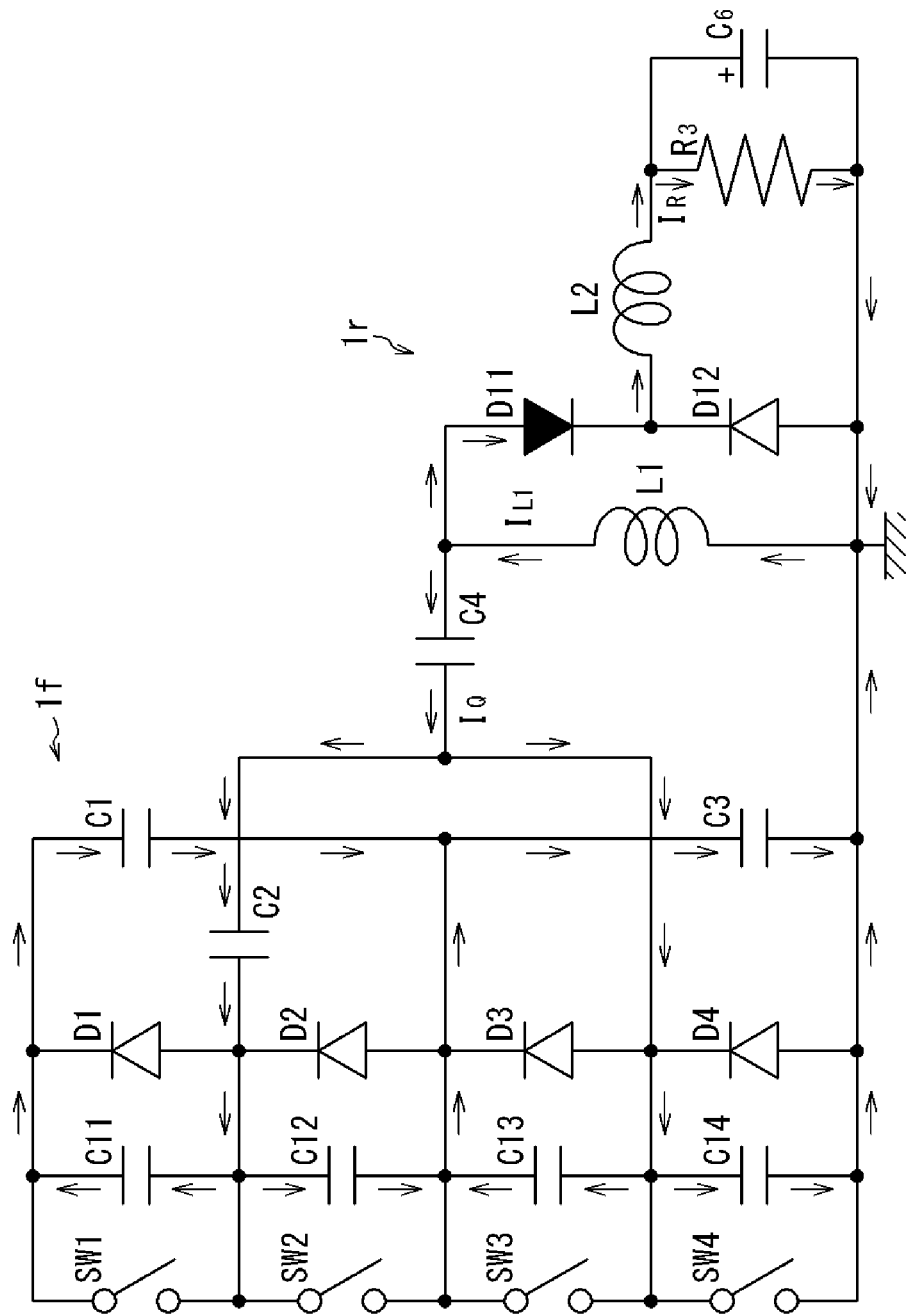
FIG. 24 is a diagram showing a current flow during second half time in the circuit on the stage subsequent to the switches, with floating capacitances of the respective switches shown in FIG. 19 being shown therein.

Likewise, FIG. 24 shows a current flow during the second half time $τ_2$ in the circuit on the post stage with respect to the switches SW1 to SW4, with the floating capacitances C11 to C14 possessed by the switches SW1 to SW4 shown in FIG. 19 being shown therein.

During the second half time $τ_2$, the diode D11 is in the conductive state while the diode D12 is not in the conductive state. In this state, current $I_Q$ that flows from the rear stage circuit 1r into the floating capacitances C11 to C14 of the front stage circuit 1f is calculated by subtracting, from the current that flows into the inductor L1, current $I_R$ that flows into the resistance $R_3$ of the load, and the following relationship is satisfied:

$$I_Q=I_{L1}-I_R$$

Here, the following approximate conditions for analysis are adopted.

(Approximate Condition 1)
First, it is assumed that the step-down ratio is constant at ⅛. That is, assuming that the input voltage of the transformer 1 is $V_{in}$ and output voltage thereof is $V_{out}$, the following relationship is satisfied:

$$V_{out}≈V_{in}/8=125[V]$$

(Approximate Condition 2)
The voltage waveform at both ends of each of the inductors L1 and L2 is a rectangular wave having a duty ratio of 50%.

(Approximate Condition 3)
The absolute value of voltage $V_L$ between the both ends of the inductor L1 is twice the output voltage. That is, assuming that the maximum value of voltage $V_L$ is $V_{Lmax}$ and the minimum value of voltage $V_L$ is $V_{Lmin}$, the following relationships are satisfied:

$$V_{Lmax}≈2V_{out}$$

$$V_{Lmin}≈2V_{out}$$

Figure 25:
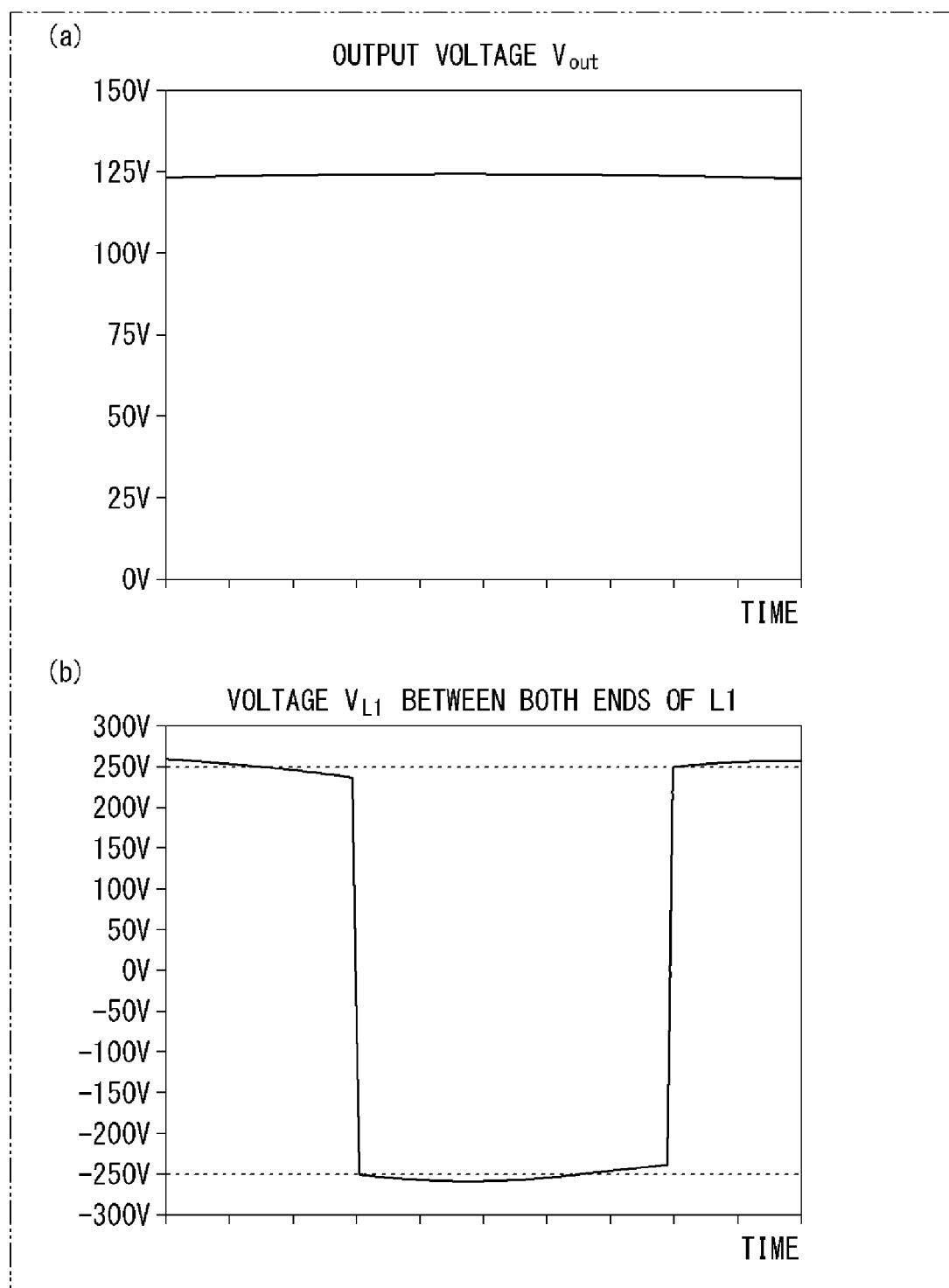
In FIG. 25, (a) is a graph showing an output voltage of the transformer, and (b) is a graph showing voltage between the both ends of an inductor.

In FIG. 25, (a) is a graph showing the output voltage of the transformer 1. The output voltage $V_{out}$ is ⅛ of the input voltage $V_{in}$ (=1 kV), and is 125 V. In FIG. 25, (b) is a graph showing the voltage $V_{L1}$ between the both ends of the inductor L1. The voltage $V_{L1}$ is ±250 V, and the following relationship is satisfied:

$$|V_{L1}|≈2V_{out}$$

Therefore, in the following calculation, $$V_{L1}≈±2V_{out}$$

Figure 26:
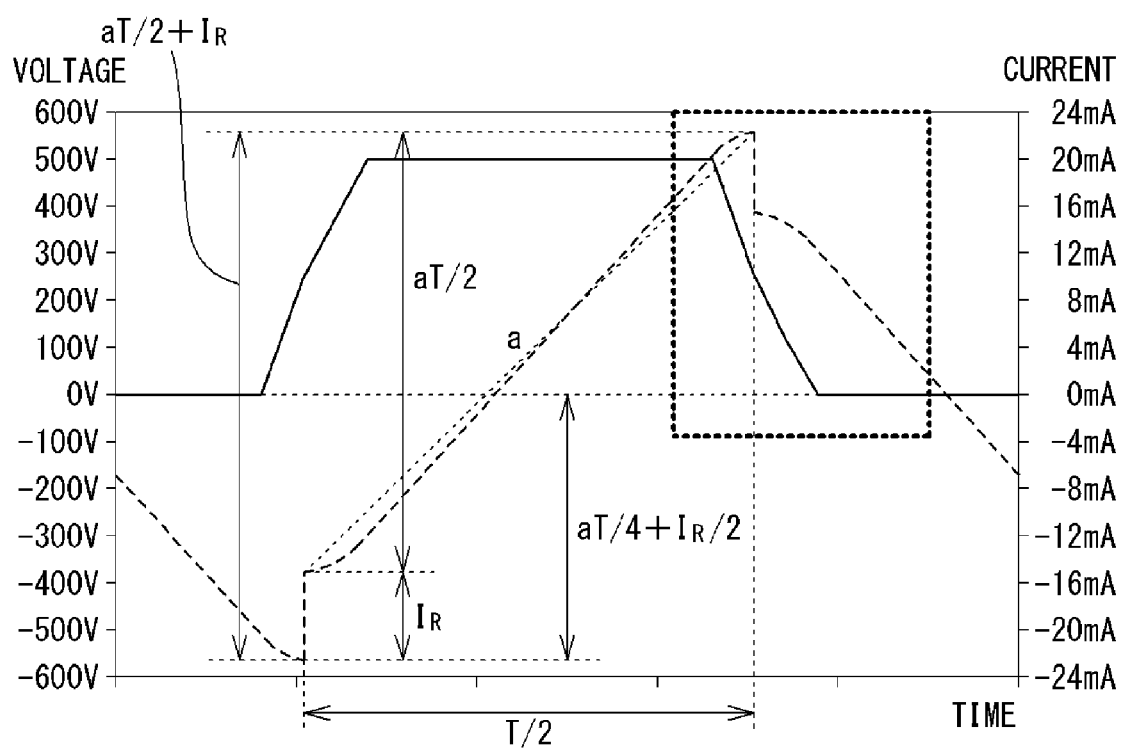
FIG. 26 is a graph showing waveforms of switching voltage $V_{SW}$ (solid line) and current $I_Q$ (dashed line).

FIG. 26 is a graph showing the waveforms of the switching voltage $V_{SW}$ (solid line) and the current $I_Q$ (dashed line).

The voltage $V_{L1}$ between the both ends of the inductor L1 is expressed by $$V_{L1}=L_1(dI_L(t)/dt)=L_1·a$$

where a is inclination of an approximate straight line of the current $I_Q$.

Therefore, the following relationship is satisfied:

$$a=2V_{out}/L_1 \quad (2)$$

In addition, the current $I_R$ that flows into the load is expressed by $$I_R=V_{out}/R_3 \quad (3)$$

Figure 27:
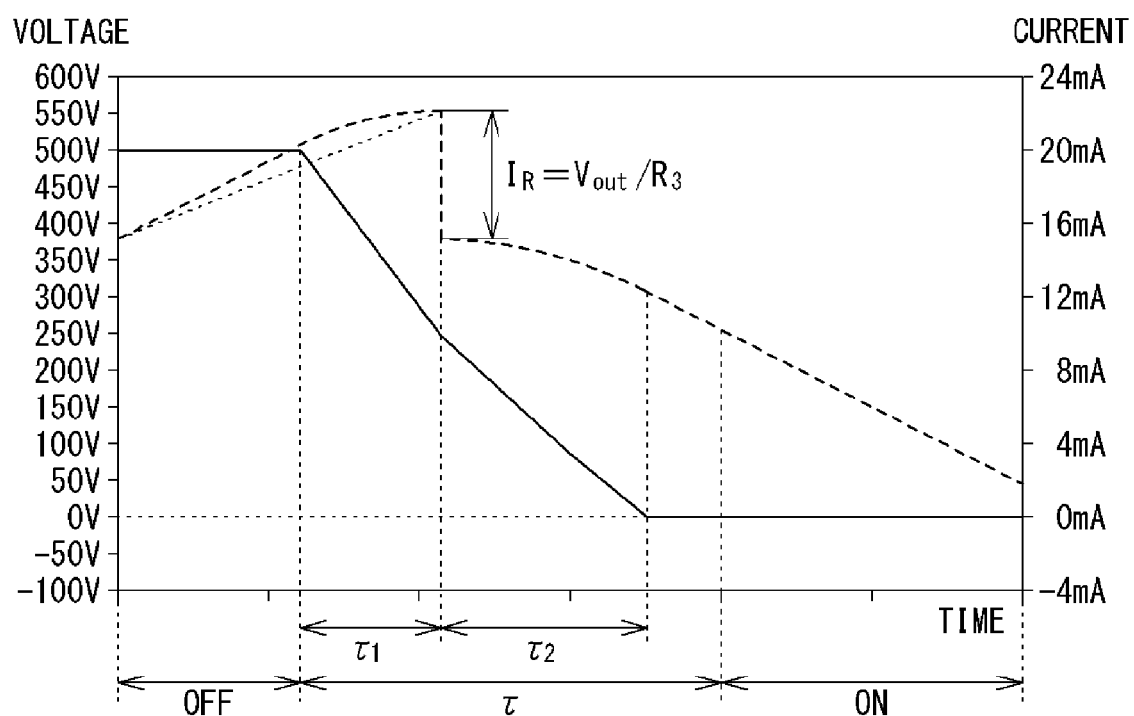
FIG. 27 is a diagram obtained by scaling up an upper right portion, of FIG. 26, enclosed in a rectangle.

An upper right portion, of FIG. 26, enclosed in a rectangle is scaled up to obtain FIG. 27. During the dead time τ, change characteristics of the current $I_Q$ change at the boundary between the first half time τ1 and the second half time τ2, at which the gradient of the switching voltage (solid line) changes. Therefore, change of the current $I_Q$ is considered separately for the first half time τ1 and the second half time τ2.

Figure 28:
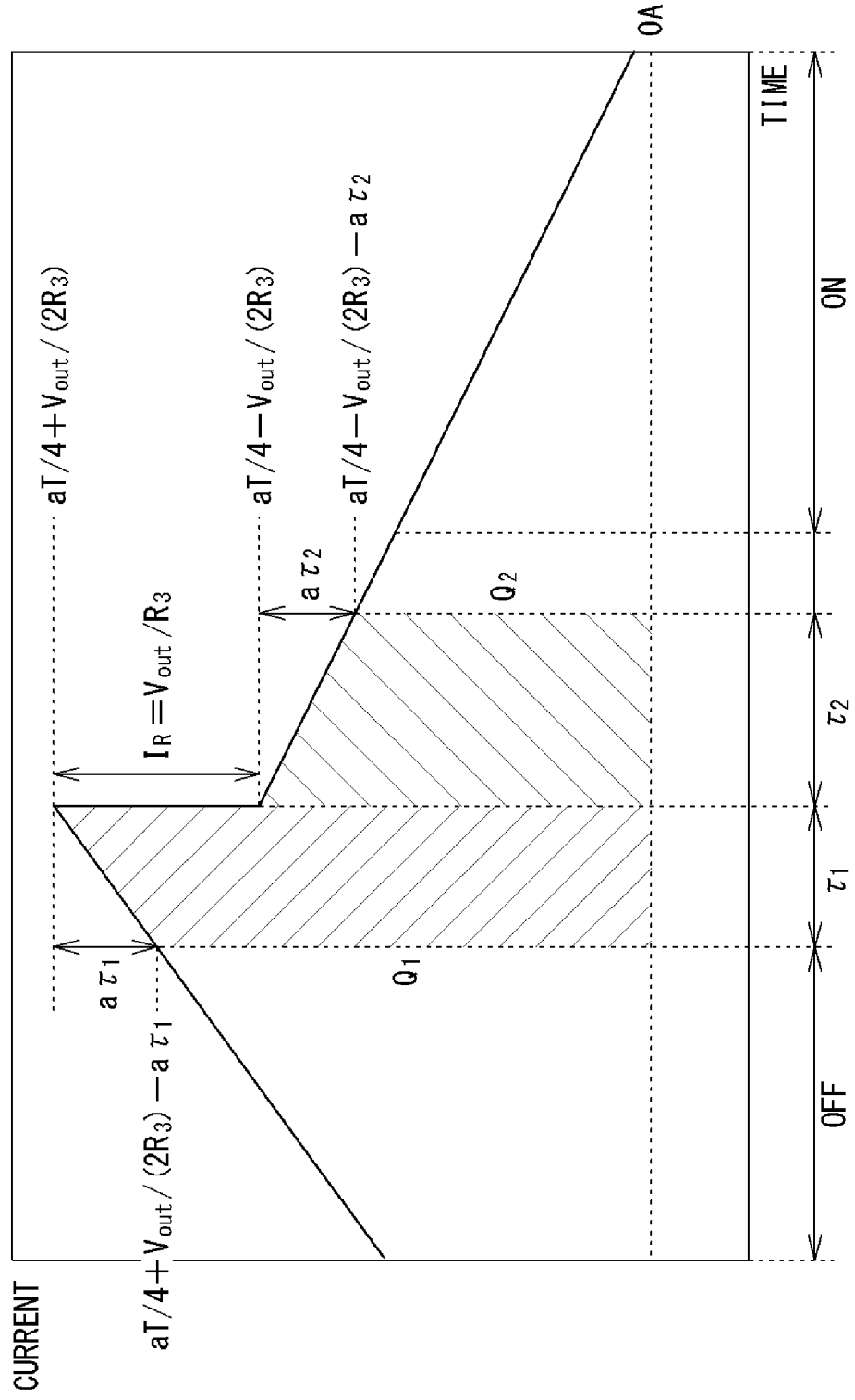
FIG. 28 is a diagram showing a region near a peak of linearly approximated current $I_Q$.

FIG. 28 shows a part around a peak of the current $I_Q$ that is linearly approximated.

In FIG. 28, electric charges $Q_1$ that flow into the floating capacitance $C_{DS}$ (general term for C11 to C14) during the first half time $τ_1$ are represented by a hatched area on the left side in FIG. 23. The electric charges $Q_1$ are expressed as follows, while calculations to reach the following result are omitted.

$$Q_1=(V_{out}·τ_1/2)\{(T/L_1)+(1/R_3)\}-(V_{out}·τ_1^2/L_1) \quad (4)$$

In addition, electric charges $Q_2$ that flow into the floating capacitance $C_{DS}$ during the second half time $\tau_2$ are represented by a hatched area on the right side in FIG. 23. That is, the electric charges $Q_2$ are expressed as follows:

$$Q_2 = (V_{out} \cdot \tau_2/2)\{(T/L_1) - (1/R_3)\} - (V_{out} \cdot \tau_2^2/L_1) \quad (5)$$

Because of the electric charges $Q_1$, electric charges equivalent to $V_{in}$ (=1 kV)/4, i.e., 250 V (=$2V_{out}$) move to the four floating capacitances $C_{DS}$ (C11 to C14), and therefore, the following expression is obtained:

$$Q_1 = 4C_{DS} \cdot 2V_{out} = 8C_{DS} \cdot V_{out} \quad (6)$$

When a quadratic equation obtained from expressions (4) and (6) is solved with respect to $\tau_1$, the following expression is obtained:

$$\tau_1 = (T/4) + (L_1/4R_3) - (1/4)[\{T+(L_1/R_3)\}^2 - 128L_1C_{DS}]^{1/2} \quad (7)$$

Likewise, because of the electric charges $Q_2$, electric charges equivalent to $V_{in}$ (=1 kV)/4, i.e., 250 V (=$2V_{out}$) move to the four floating capacitances $C_{DS}$ (C11 to C14), and therefore, the following expression is obtained:

$$Q_2 = 4C_{DS} \cdot 2V_{out} = 8C_{DS} \cdot V_{out} \quad (8)$$

When a quadratic equation obtained from expressions (5) and (8) is solved with respect to $\tau_2$, the following expression is obtained:

$$\tau_2 = (T/4) - (L_1/4R_3) - (1/4)[\{T-(L_1/R_3)\}^2 - 128L_1C_{DS}]^{1/2} \quad (9)$$

In addition, a minimum value $\tau_{min}$ of the dead time $\tau$ is expressed as follows:

$$\tau_{min} = \tau_1 + \tau_2 \quad (10)$$

Next, the maximum value of the dead time $\tau$ will be considered.

Figure 29:
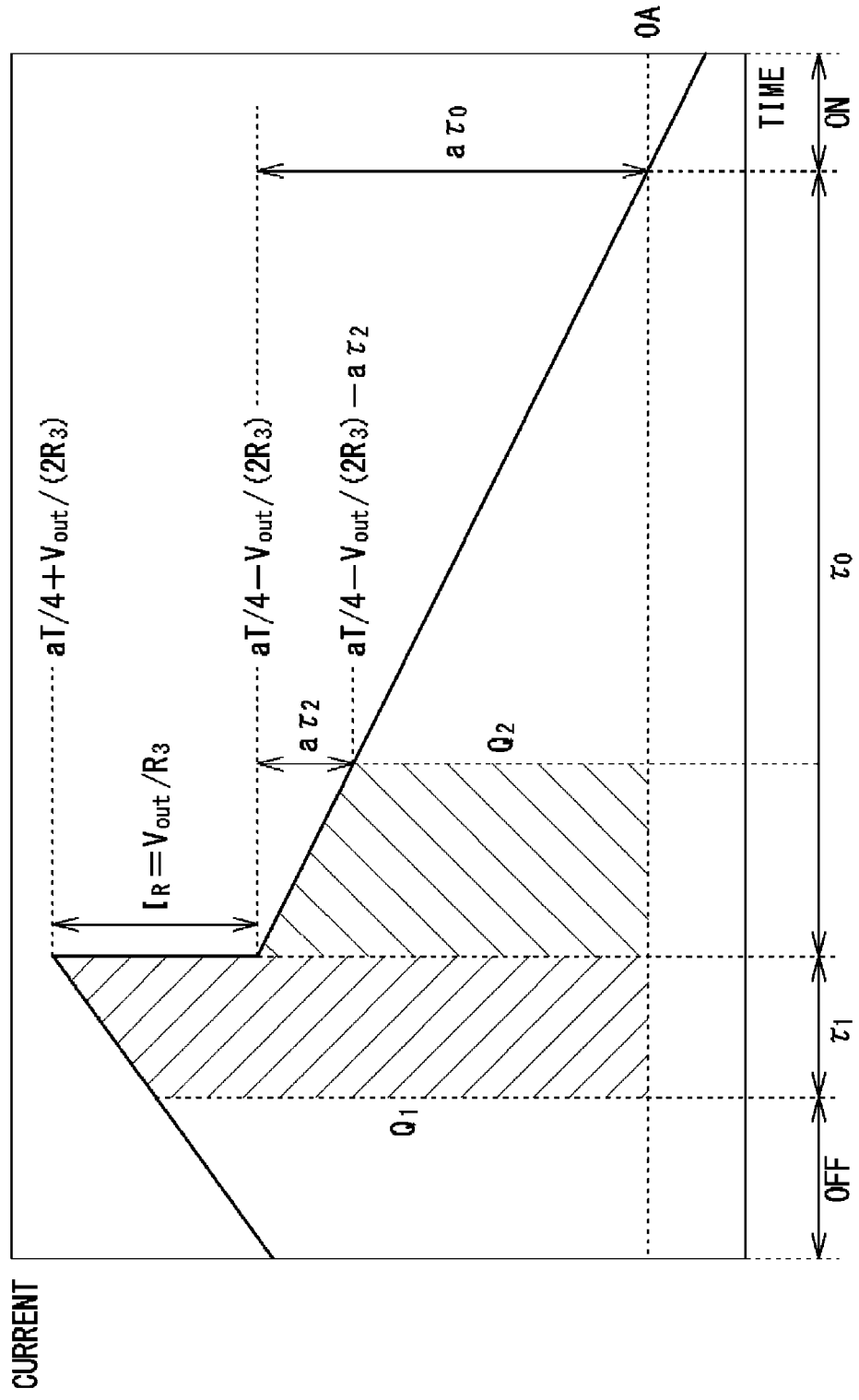
FIG. 29 a diagram showing the waveforms shown in FIG. 28 extended in the time-axis direction (rightward direction).

FIG. 29 is a diagram showing the waveforms shown in FIG. 28 extended in the time-axis direction (rightward direction). In a second half region of the second half time $\tau_2$, the gradient of current becomes (−a). Therefore, there is time $\tau_0$ from the peak to $I_Q$=0. After time $\tau_0$ has passed, negative current flows. This means that the electric charges return from the floating capacitances $C_{DS}$ to the inductor L1. If so, the switching voltage increases again. Therefore, the dead time $\tau$ must be set so as not to exceed time $\tau_0$. When the maximum value of the dead time that does not exceed $\tau_0$ is $\tau_{max}$, the $\tau_{max}$ is expressed as follows:

$$\tau_{max} = \tau_1 + \tau_0 \quad (11)$$

It is needless to say that $\tau_{max}$ must satisfy $\tau_{max} < (T/2)$ in order to secure ON time of switching.

In FIG. 29, "current $I_Q$=0" is expressed as follows:

$$\{(aT/4) - (V_{out}/2R_3)\} - a\tau_0 = 0 \quad (12)$$

and expression (12) is further converted to $$\tau_0 = (T/4) - (L_1/4R_3) \quad (13)$$

As a result, the range of the dead time $\tau$ should be set as follows:

$$\tau_1 + \tau_2 \leq \tau \leq \tau_0 + \tau_1 \quad (14)$$

where $\tau_0$, $\tau_1$, and $\tau_2$ are as follows.

$$\tau_0 = \frac{T}{4} - \frac{L_1}{4R_3} \quad (15)$$

$$\tau_1 = \frac{T}{4} + \frac{L_1}{4R_3} - \frac{1}{4}\sqrt{\left(T + \frac{L_1}{R_3}\right)^2 - 128L_1C_{nDS}}$$

$$\tau_2 = \frac{T}{4} - \frac{L_1}{4R_3} - \frac{1}{4}\sqrt{\left(T + \frac{L_1}{R_3}\right)^2 - 128L_1C_{nDS}}$$

where the sign of a value in each radical sign is plus, and $\tau_1 < \tau_2$ is satisfied.

The $\tau_0$, $\tau_1$, and $\tau_2$ are generalized as follows, taking into consideration multistage configuration of the front stage circuit. Expression (14) is unchanged even when multistage configuration of the front stage circuit is considered.

Assuming that the number of the floating capacitances $C_{DS}$ (equal to the number of the switches constituting the switch series unit) is n, and the n-th floating capacitance counted in order from 1 is $C_{nDs}$, $\tau_0$, $\tau_1$, and $\tau_2$ are generalized as follows:

$$\tau_0 = \frac{T}{4} - \frac{L_1}{4R_3} \quad (16)$$

$$\tau_1 = \frac{T}{4} + \frac{L_1}{4R_3} - \frac{1}{4}\sqrt{\left(T + \frac{L_1}{R_3}\right)^2 - 32L_1 \sum_{n=1}^{n} C_{nDS}}$$

$$\tau_2 = \frac{T}{4} - \frac{L_1}{4R_3} - \frac{1}{4}\sqrt{\left(T - \frac{L_1}{R_3}\right)^2 - 32L_1 \sum_{n=1}^{n} C_{nDS}}$$

where the sign of a value in each radical sign is plus, and $\tau_1 < \tau_2$ is satisfied.

CONCLUSION

As described above in detail, for example, in FIG. 19, the control section 3 of the transformer 1, after the time at which the dead time has started, obtains: the first half time $\tau_1$ which can be calculated on the basis of the electric charges that move from the inductor L1 to the floating capacitance $C_{DS}$ of the switch while one (D12) of the diodes D11 and D12 is in the conductive state; and the second half time $\tau_2$ which can be calculated on the basis of the electric charges that move from the inductor L1 to the floating capacitance $C_{DS}$ of the switch while one (D11) of the diodes D11 and D12 is in the conductive state, and then the control section 3 can determine the dead time $\tau$ on the basis of the first half time $\tau_1$ and the second half time $\tau_2$.

Thus, on the basis of the times $\tau_1$ and $\tau_2$ calculated focusing on movement of the electric charges during the dead time, an appropriate dead time $\tau$ can be determined to realize zero voltage transition (ZVT).

Further, the control section 3 terminates the dead time $\tau$ before the electric charges that have moved to the floating capacitance $C_{DS}$ return to the inductor L1, thereby preventing the switching voltage from increasing again.

Further, the appropriate range of the dead time $\tau$ can be precisely determined on the basis of the above expressions (7), (9), (13), and (14), thereby reliably realizing zero voltage transition.

Further, since the inductance as a factor to determine the range of the dead time is only the inductance of the inductor L1, the transformer 1 of the present embodiment is advantageous in that a low-loss inductor having a precise inductance may be only the inductor L1.

<<Verification of Effect of Dead Time $\tau$>>

Regarding various input/output common grounding type transformers in which the dead time $\tau$ is designed within the above-described range, the performances thereof have been verified. The verification results are described below.

Figure 30:
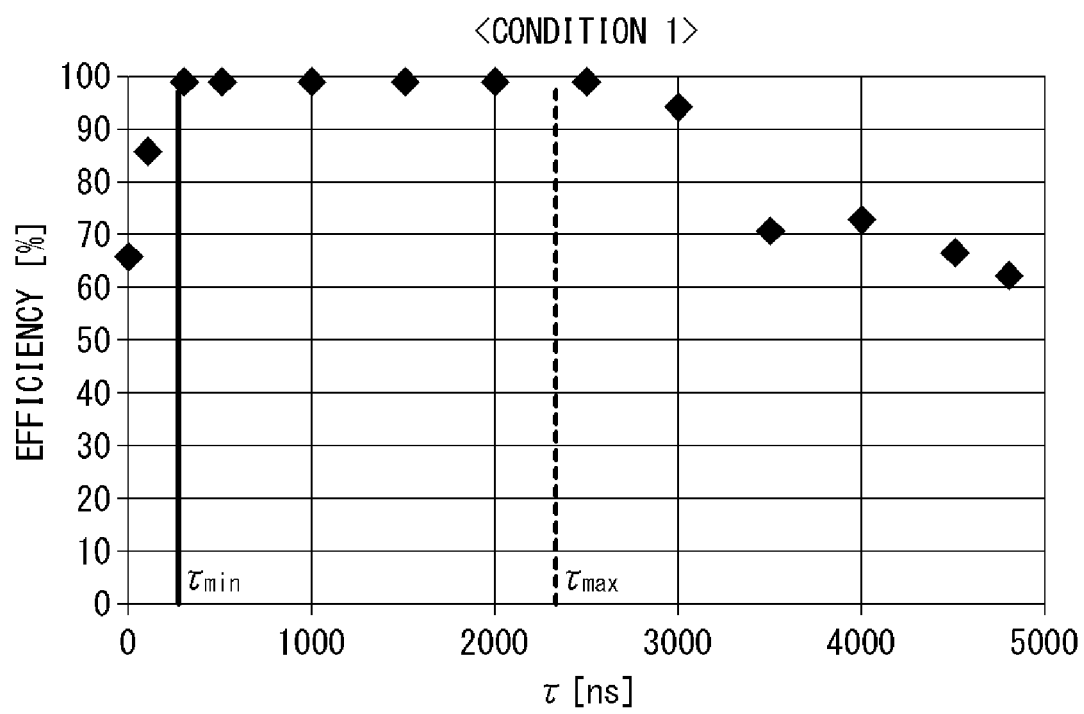
FIG. 30 is a graph showing the relationship between dead time $\tau$ [ns] and efficiency [%] in the case of condition 1.
Figure 31:
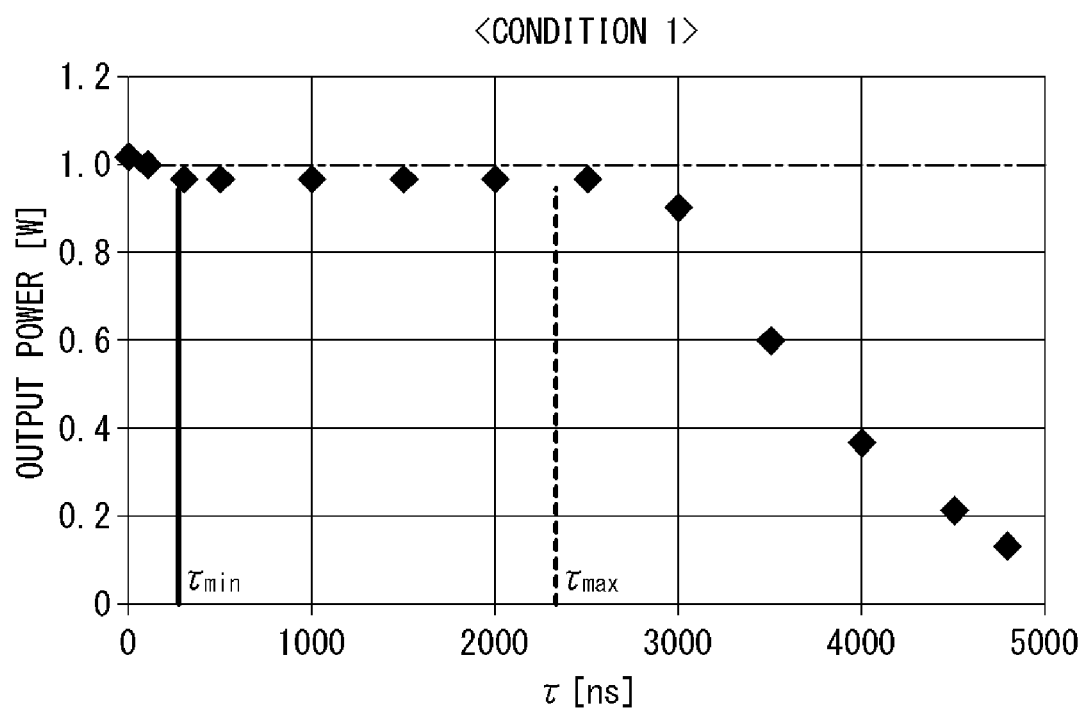
FIG. 31 is a graph showing the relationship between dead time $\tau$ [ns] and output power [W] of the transformer in the case of condition 1.
Figure 32:
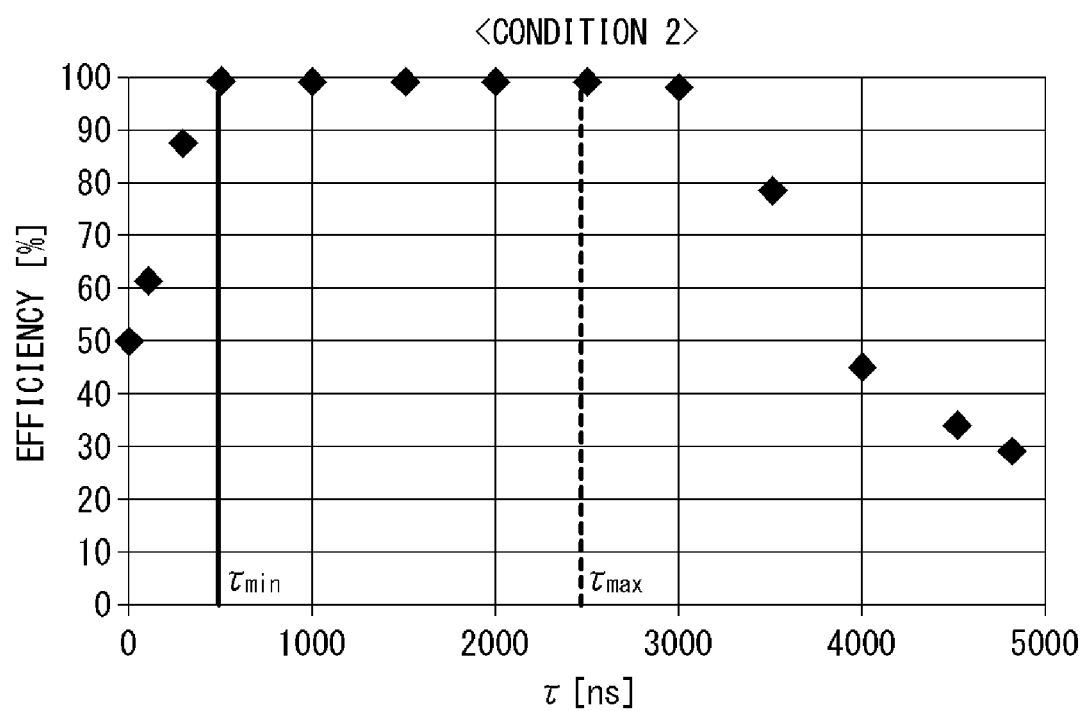
FIG. 32 is a graph showing the relationship between dead time $\tau$ [ns] and efficiency [%] in the case of condition 2.
Figure 33:
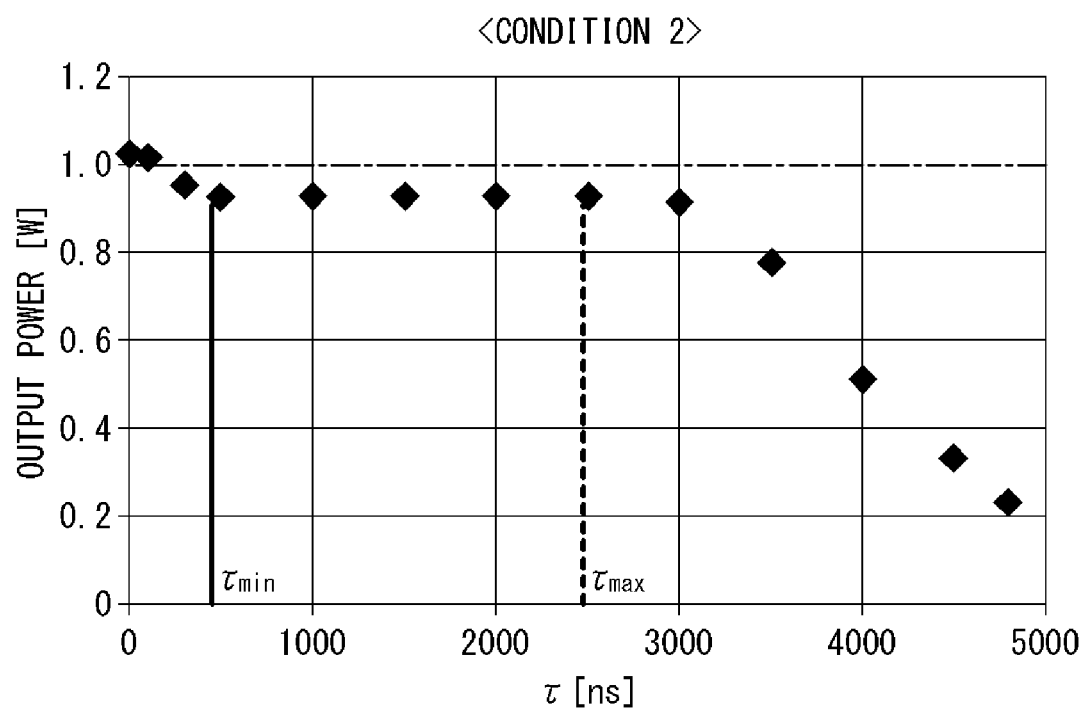
FIG. 33 is a graph showing the relationship between dead time $\tau$ [ns] and efficiency [%] in the case of condition 2.

<Condition 1>
Circuit configuration: "input/output common grounding type (FIG. 19)"
Inductance $L_1$ of inductor L1=15 [mH]
Resistance $R_3$ of load=15625 [Ω]
Floating capacitance $C_{DS}$=5 [pF]
In the case of the above condition 1, the minimum value and the maximum value of the dead time τ are calculated as follows on the basis of above expression (14).
Minimum value $t_{min}$=249 [ns]
Maximum value $\tau_{max}$=2372 [ns]
FIG. 30 is a graph showing the relationship between the dead time τ [ns] and efficiency [%] in the case of the condition 1. When the calculated $\tau_{min}$ and $\tau_{max}$ are plotted on the graph, it is found that these values correspond to a range in which the efficiency is excellent on the characteristics shown in the graph.
FIG. 31 is a graph showing the relationship between the dead time τ [ns] and output power [W] of the transformer in the case of the condition 1. When the calculated $\tau_{min}$ and $\tau_{max}$ are plotted on the graph, it is found that these values correspond to a range in which stable high output is achieved on the characteristics shown in the graph.
<Condition 2>
Circuit configuration: "input/output common grounding type"
Inductance $L_1$ of inductor L1=15 [mH]
Resistance $R_3$ of load=15625 [Ω]
Floating capacitance $C_{DS}$=10 [pF]
In the case of the above condition 2, the minimum value and the maximum value of the dead time τ are calculated as follows on the basis of above expression (14).
Minimum value $\tau_{min}$=512 [ns]
Maximum value $\tau_{max}$=2489 [ns]
FIG. 32 is a graph showing the relationship between the dead time τ [ns] and efficiency [%] in the case of the condition 2. When the calculated $\tau_{min}$ and $\tau_{max}$ are plotted on the graph, it is found that these values correspond to a range in which the efficiency is excellent on the characteristics shown in the graph.
FIG. 33 is a graph showing the relationship between the dead time τ [ns] and output power [W] of the transformer in the case of the condition 2. When the calculated $\tau_{min}$ and $\tau_{max}$ are plotted on the graph, it is found that these values correspond to a range in which stable high output is achieved on the characteristics shown in the graph.

As described above, since the dead time τ is determined on the basis of the relationship shown by expression (14), the transformer can have excellent efficiency and stable high output.

Next, in the circuit shown in FIG. 19, observation of voltage waveforms regarding ZVT was performed with the numerical value of τ being appropriately changed, under the following conditions:
C1, C2, C3, C4, $C_6$: 10 nF
R1, R2: 330 kΩ
L1: 2.2 mH
L2: 100 mH
$R_3$: 15000Ω
switching frequency fs: 100 kHz
D1 to D4: body diode
Vin: 20 V
According to expression (14), the calculated values of $\tau_{min}$ and $t_{max}$ under the above conditions are as follows:

$\tau_{min}$=449 ns $\tau_{max}$=2685 ns

Figure 34:
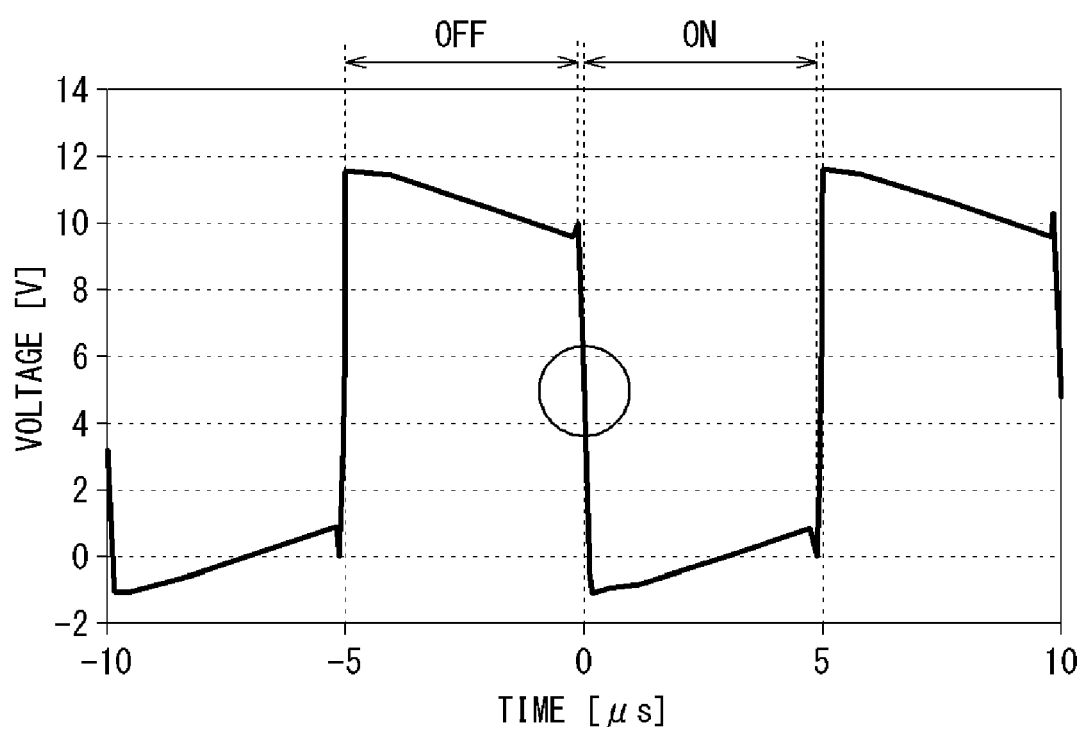
FIG. 34 shows an actually measured waveform of the switching voltage in the case where $\tau$ is 200 ns.
Figure 35:
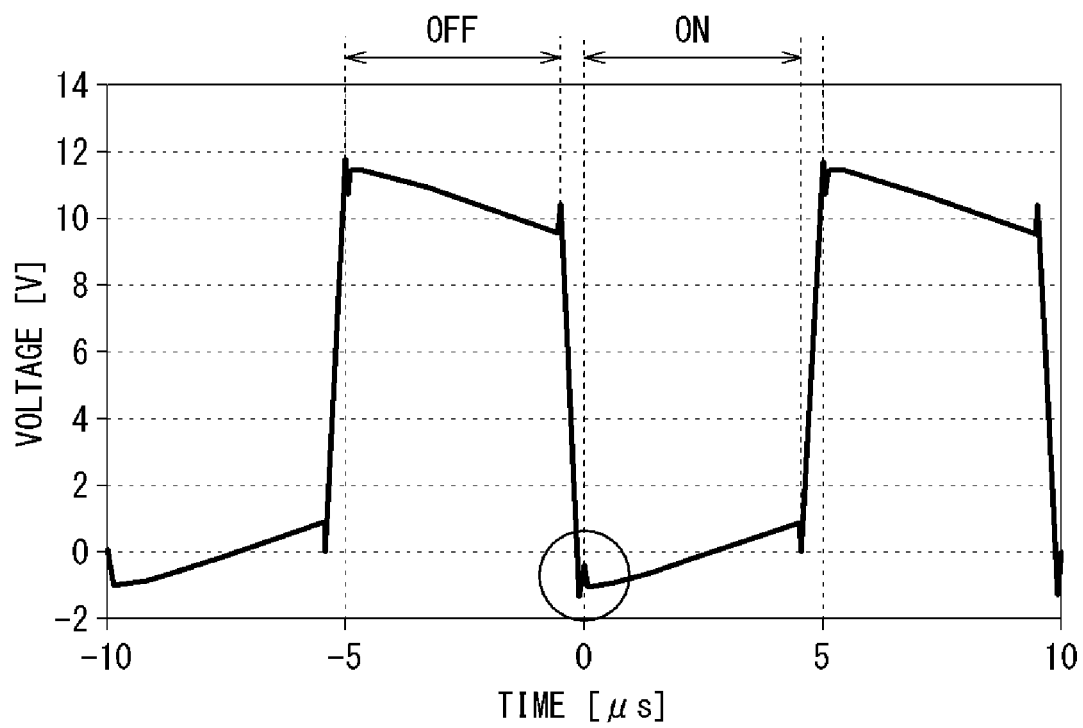
FIG. 35 shows an actually measured waveform of the switching voltage in the case where $\tau$ is 500 ns.
Figure 36:
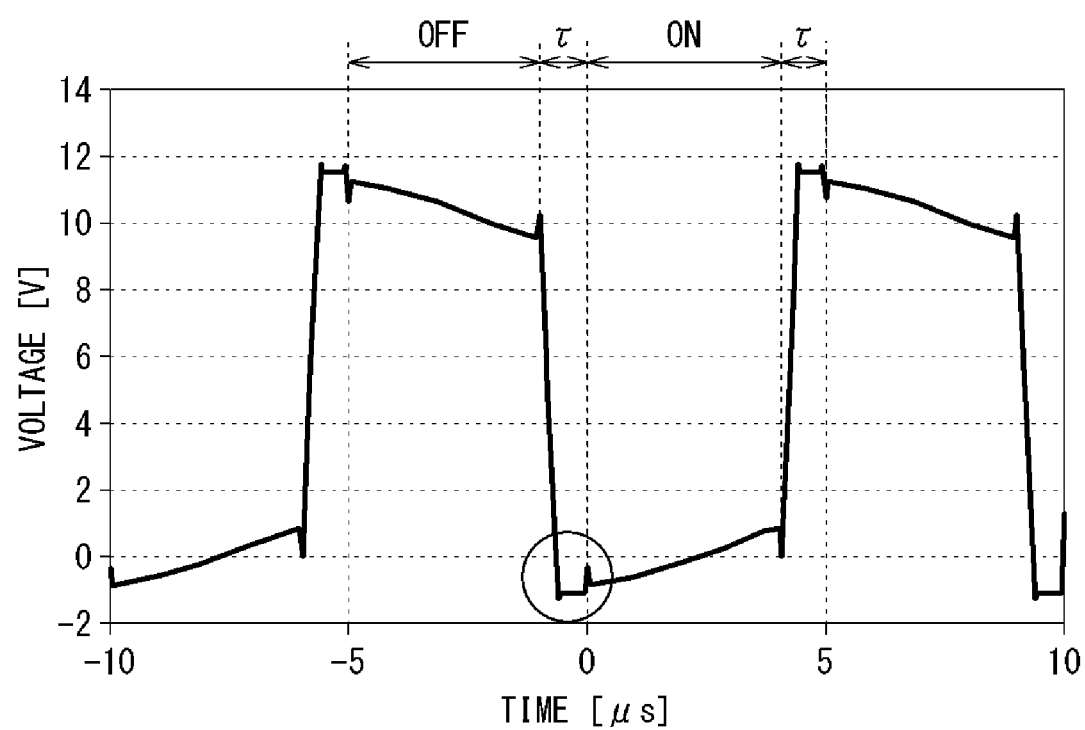
FIG. 36 shows an actually measured waveform of the switching voltage in the case where $\tau$ is 1000 ns.
Figure 37:
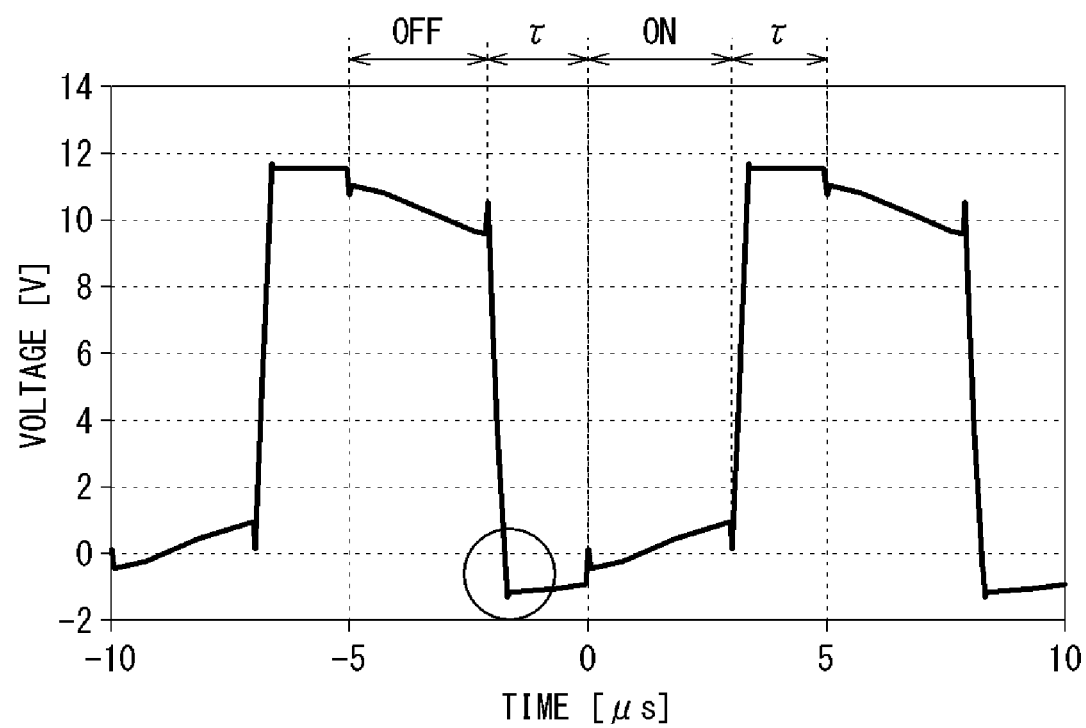
FIG. 37 shows an actually measured waveform of the switching voltage in the case where $\tau$ is 2000 ns.
Figure 38:
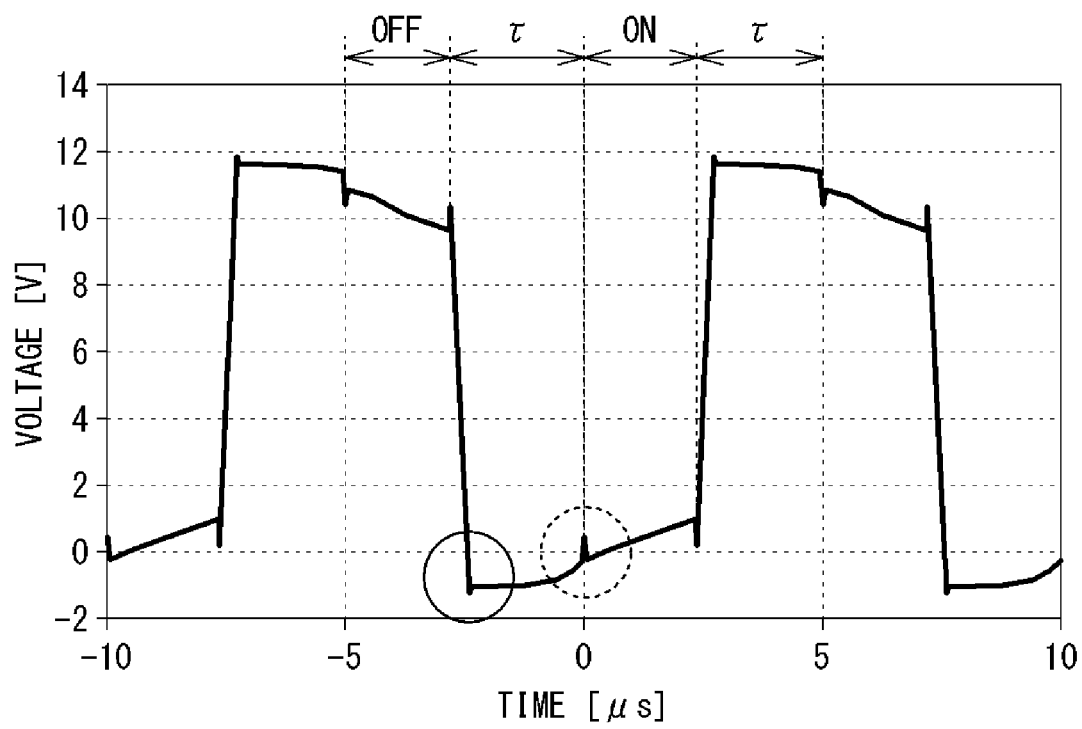
FIG. 38 shows an actually measured waveform of the switching voltage in the case where $\tau$ is 2700 ns.
Figure 39:
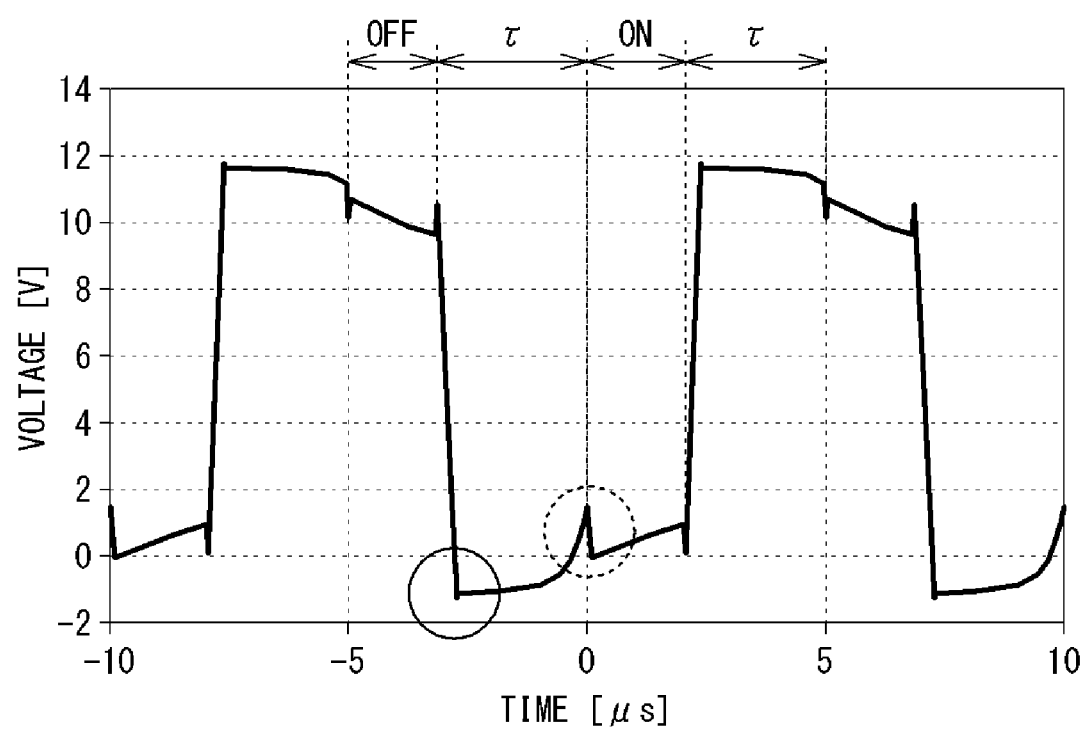
FIG. 39 shows an actually measured waveform of the switching voltage in the case where $\tau$ is 3000 ns.

FIG. 34 shows an actually measured waveform of the switching voltage of the switch SW4 in the case where τ is 200 ns. In this case, control is turned ON around a circle mark in FIG. 34. However, at this time, the voltage does not drop to 0 V yet. Therefore, ZVT is not achieved at τ=200 ns.
Likewise, FIG. 35 shows an actually measured waveform of the switching voltage in the case where τ is 500 ns. In this case, when control is turned ON, the voltage has already dropped to 0 V. Therefore, ZVT starts to occur at τ=500 ns. This value of τ roughly coincides with the calculated value of 449 ns.
FIG. 36 shows an actually measured waveform of the switching voltage in the case where τ is 1000 ns. In this case, ZVT is achieved.
FIG. 37 shows an actually measured waveform of the switching voltage in the case where τ is 2000 ns. In this case, ZVT is achieved.
That is, the theoretical result that ZVT is achieved when τ is in a range of 449 to 2685 ns is obtained.
FIG. 38 shows an actually measured waveform of the switching voltage in the case where τ is 2700 ns. In this case, when control is turned ON, the voltage starts to increase again.
FIG. 39 shows an actually measured waveform of the switching voltage in the case where τ is 3000 ns. In this case, when control is turned ON, reincrease of the voltage occurs.
That is, $t_{max}$ well coincides with the calculated value of 2685 ns.

<<Verification of Effect of Dead Time τ, and Supplementary Notes>>

For reference, regarding input/output common grounding type transformers having various topologies, the ranges of the dead time τ and the results of verification of the performances thereof are described below.

Figure 40:
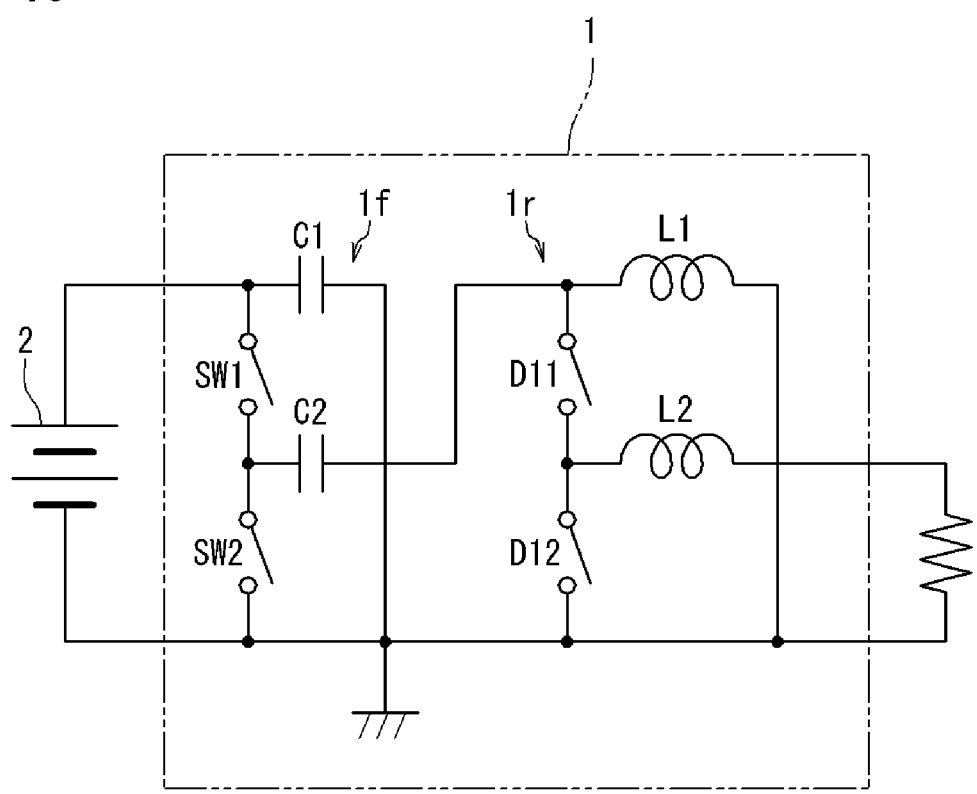
FIG. 40 is a circuit diagram showing an input/output common grounding type "2C2L" transformer.

FIG. 40 is a circuit diagram showing an input/output common grounding type "2C2L" transformer 1. Illustration of this circuit is simplified by omitting diodes, bleeder resistances, and the like. In addition, the semiconductor elements D11 and D12 in the rear stage circuit 1r are diodes having opposite polarities, or switches that are alternately turned ON (the same applies hereinafter).

Figure 41:
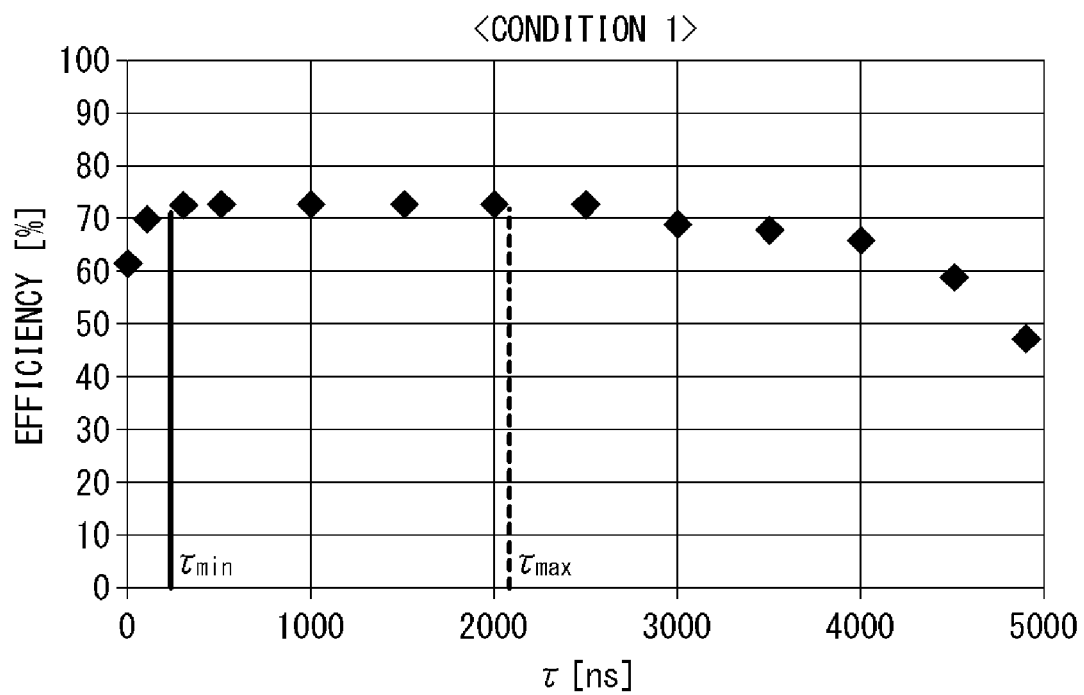
FIG. 41 is a graph showing the relationship between dead time $\tau$ [ns] and efficiency [%] in the case of condition 1 in the transformer shown in FIG. 40.
Figure 42:
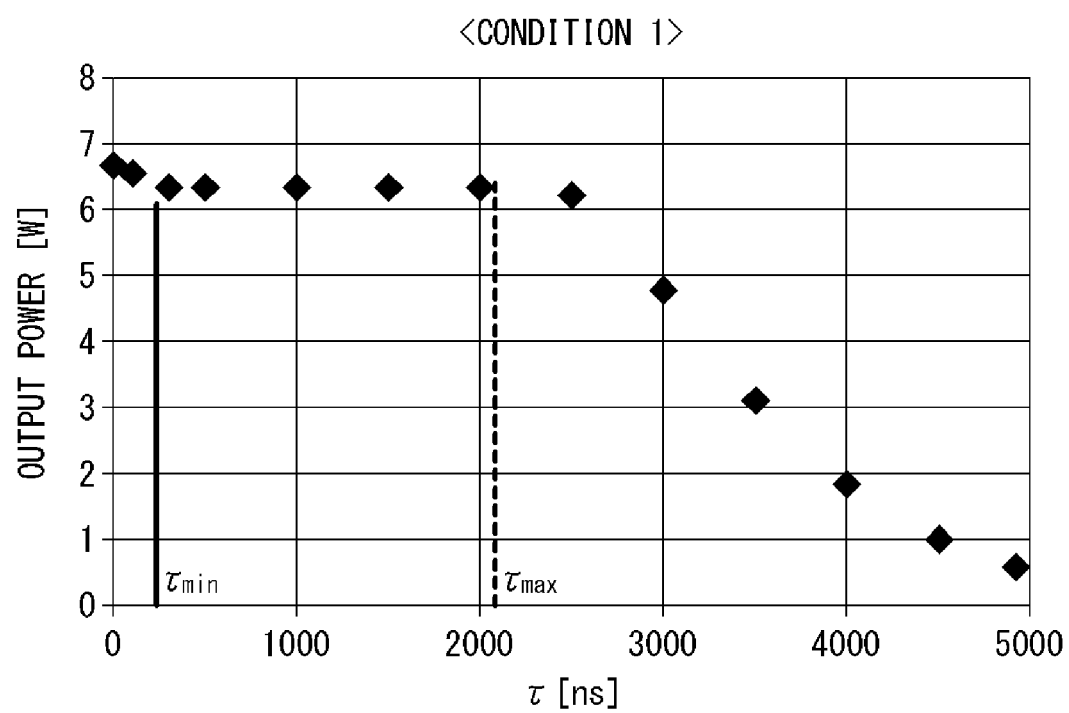
FIG. 42 is a graph showing the relationship between dead time $\tau$ [ns] and output power [W] in the case of condition 1 in the transformer shown in FIG. 40.

The performance of the transformer 1 shown in FIG. 40 has been verified. The verification results are described below.
<Condition 1>
Inductance $L_1$ of inductor L1=15 [mH]
Resistance $R_3$ of load=7000 [Ω]
Floating capacitance $C_{DS}$=10 [pF]
In this case, the minimum value and the maximum value of the dead time τ are calculated as follows on the basis of above expression (14).
Minimum value $\tau_{min}$=259 [ns]
Maximum value $\tau_{max}$=2065 [ns]
FIG. 41 is a graph showing the relationship between the dead time τ [ns] and efficiency [%] in the case of the condition 1. When the calculated $\tau_{min}$ and $\tau_{max}$ are plotted on the graph, it is found that these values correspond to a range in which the efficiency is excellent on the characteristics shown in the graph.
FIG. 42 is a graph showing the relationship between the dead time τ [ns] and output power [W] of the transformer in the case of the condition 1. When the calculated $\tau_{min}$ and $\tau_{max}$ are plotted on the graph, it is found that these values correspond to a range in which stable high output is achieved on the characteristics shown in the graph.

<Condition 2>
Inductance $L_1$ of inductor L1=30 [mH]
Resistance $R_3$ of load=15625 [Ω]
Floating capacitance $C_{DS}$=10 [pF]
In this case, the minimum value and the maximum value of the dead time τ are calculated as follows on the basis of above expression (14).
Minimum value $\tau_{min}$=531 [ns]
Maximum value $\tau_{max}$=2229 [ns]

Figure 43:
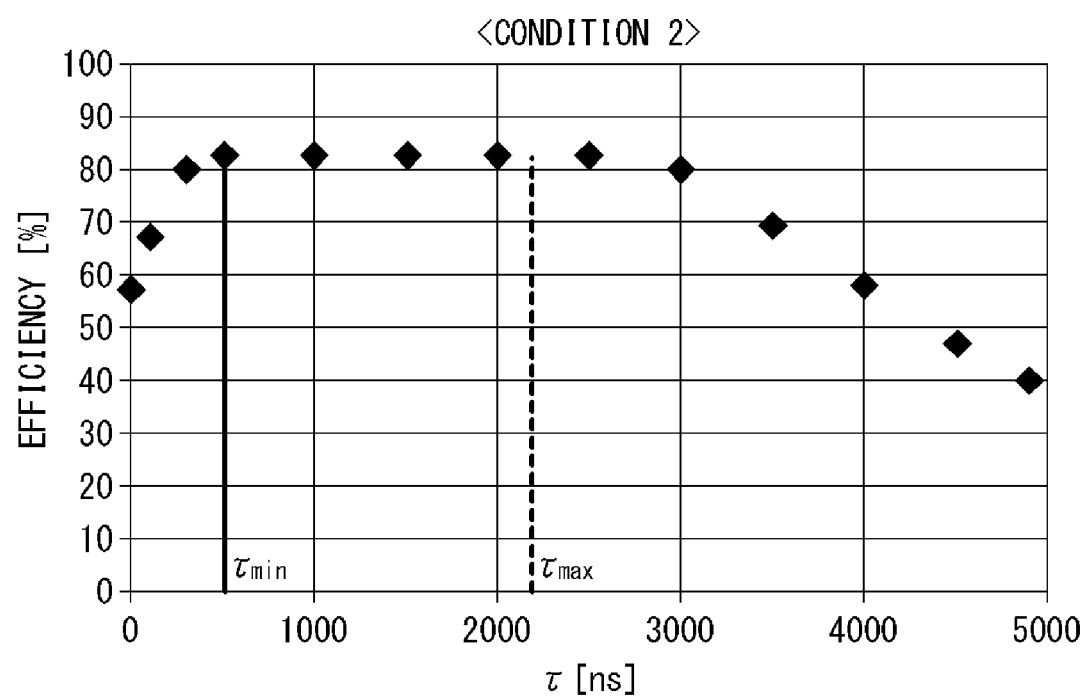
FIG. 43 is a graph showing the relationship between dead time $\tau$ [ns] and efficiency [%] in the case of condition 2 in the transformer shown in FIG. 40.

FIG. 43 is a graph showing the relationship between the dead time τ [ns] and efficiency [%] in the case of the condition 2. When the calculated $\tau_{min}$ and $\tau_{max}$ are plotted on the graph, it is found that these values correspond to a range in which the efficiency is excellent on the characteristics shown in the graph.

Figure 44:
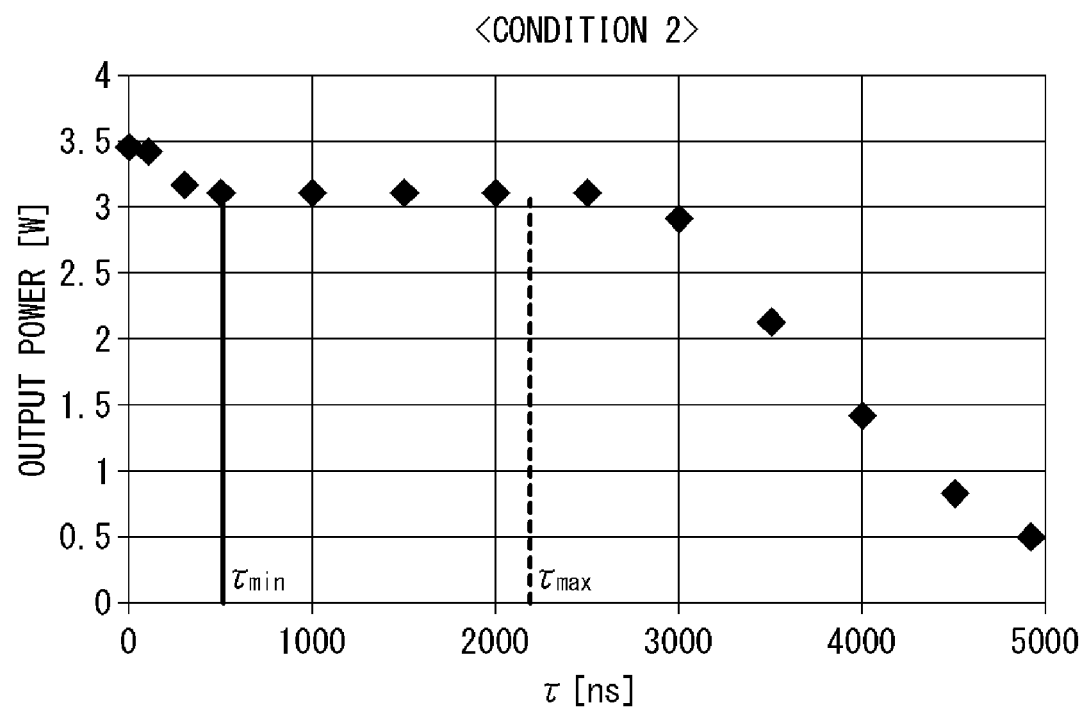
FIG. 44 is a graph showing the relationship between dead time $\tau$ [ns] and output power [W] in the case of condition 2 in the transformer shown in FIG. 40.

FIG. 44 is a graph showing the relationship between the dead time τ [ns] and output power [W] of the transformer in the case of the condition 2. When the calculated $\tau_{min}$ and $\tau_{max}$ are plotted on the graph, it is found that these values correspond to a range in which stable high output is achieved on the characteristics shown in the graph.

Figure 45:
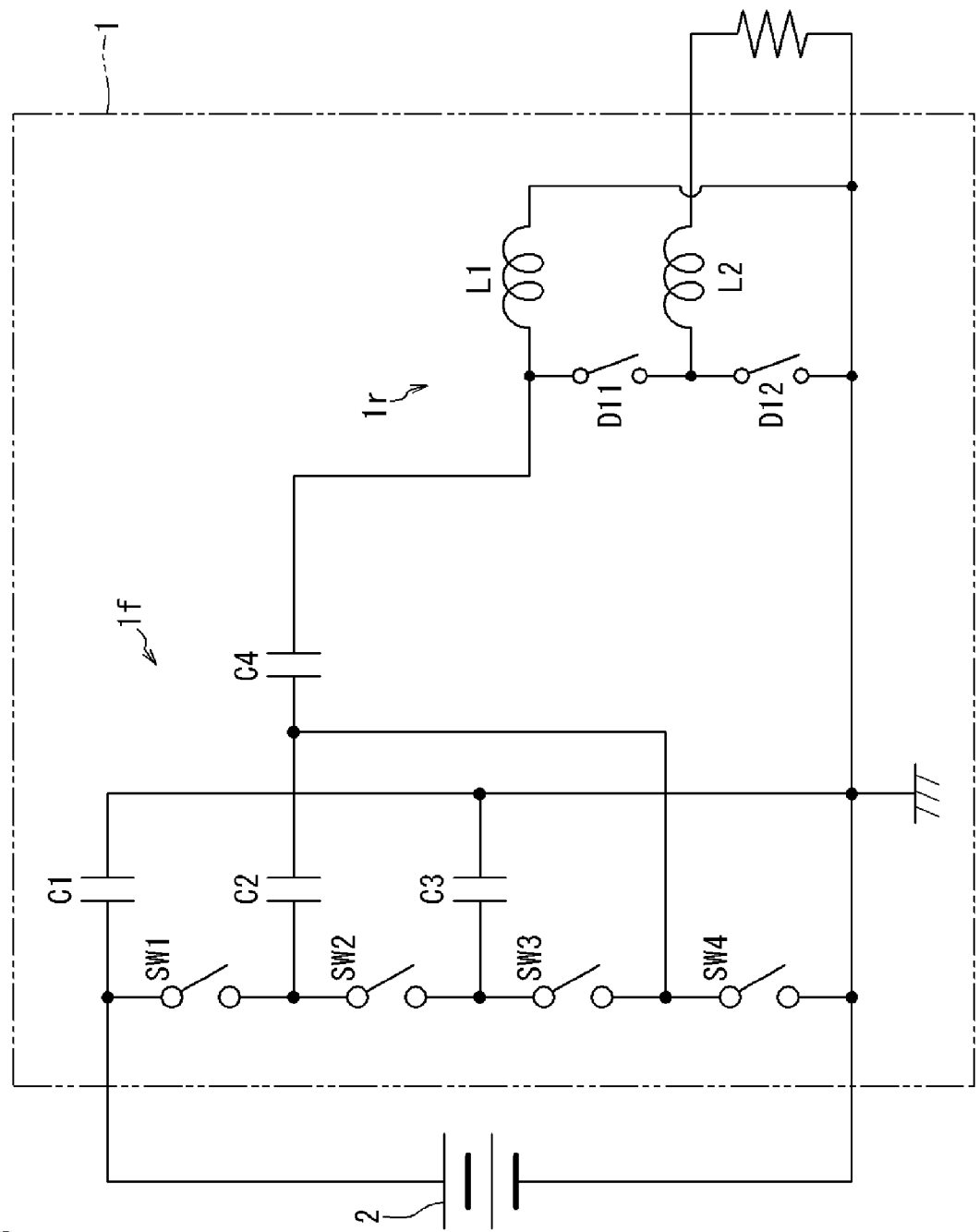
FIG. 45 is a circuit diagram showing an input/output common grounding type "4C2L" transformer.

FIG. 45 is a circuit diagram showing an input/output common grounding type "4C2L" transformer 1. Although this circuit is similar to the circuit shown in FIG. 19, the position of the capacitor C3 is slightly different from that in FIG. 19.

The performance of this transformer 1 has been verified. The verification results are described below.
<Condition 1>
Inductance $L_1$ of inductor L1=15 [mH]
Resistance $R_3$ of load=15625 [Ω]
Floating capacitance $C_{DS}$=5, 8, 13, 14 [pF]
In this case, the minimum value and the maximum value of the dead time τ are calculated as follows on the basis of above expression (14).
Minimum value $\tau_{min}$=512 [ns]
Maximum value $\tau_{max}$=2489 [ns]

Figure 46:
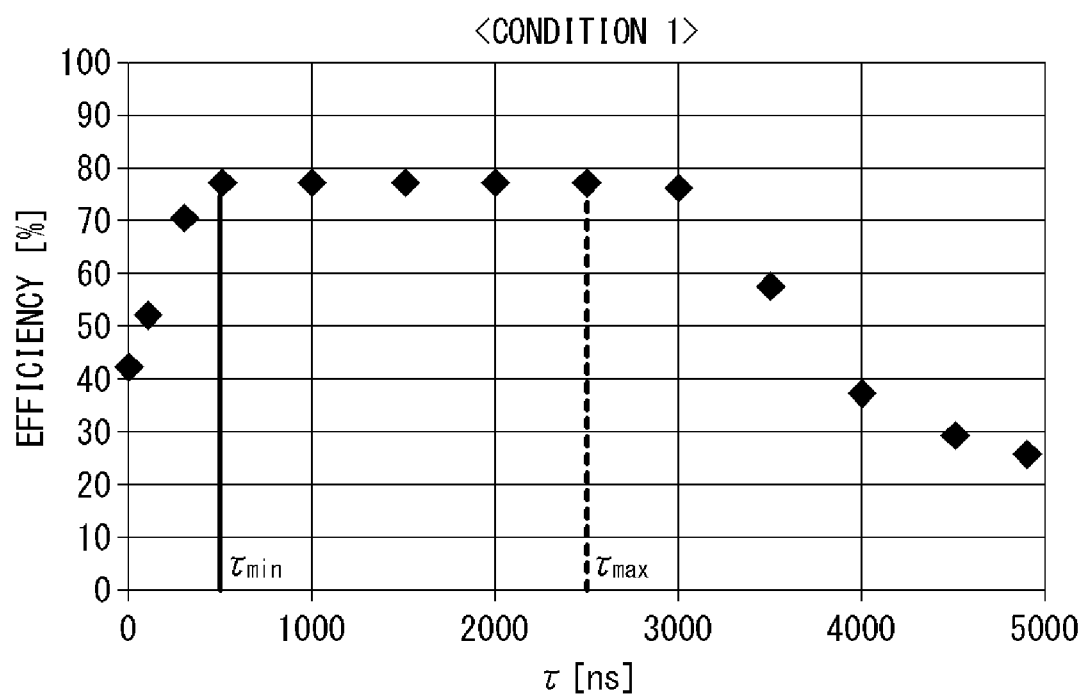
FIG. 46 is a graph showing the relationship between dead time $\tau$ [ns] and efficiency [%] in the case of condition 1 in the transformer shown in FIG. 45.

FIG. 46 is a graph showing the relationship between the dead time τ [ns] and efficiency [%] in the case of the condition 1. When the calculated $\tau_{min}$ and $\tau_{max}$ are plotted on the graph, it is found that these values correspond to a range in which the efficiency is excellent on the characteristics shown in the graph.

Figure 47:
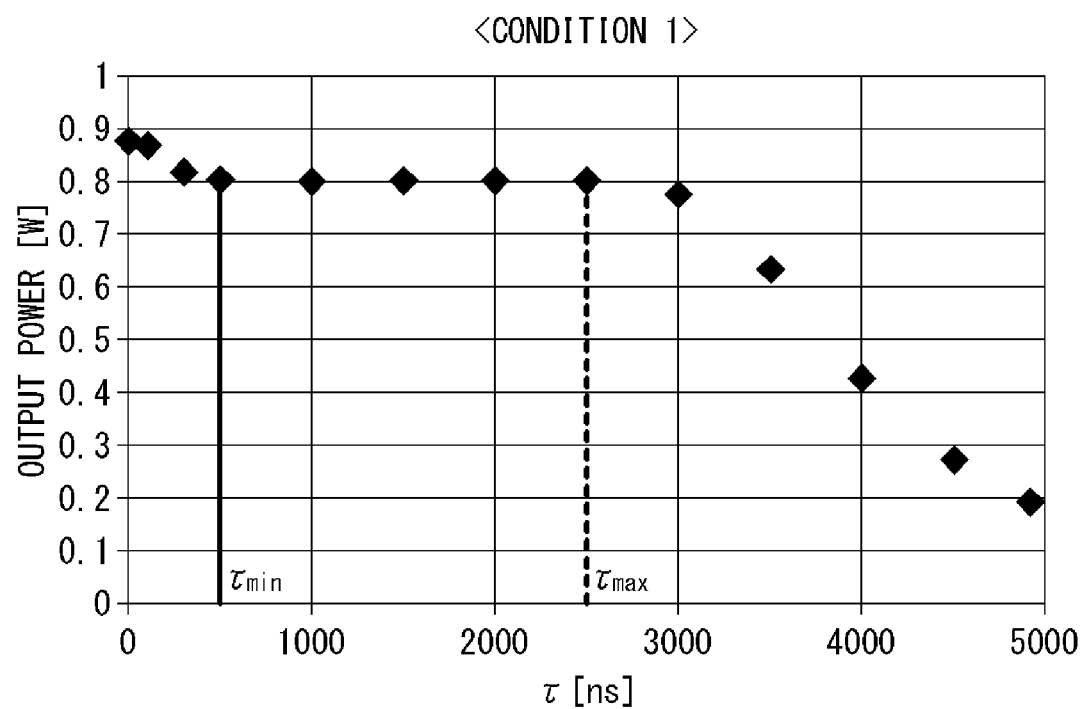
FIG. 47 is a graph showing the relationship between dead time $\tau$ [ns] and output power [W] in the case of condition 1 in the transformer shown in FIG. 45.

FIG. 47 is a graph showing the relationship between the dead time τ [ns] and output power [W] of the transformer in the case of the condition 1. When the calculated $t_{min}$ and $\tau_{max}$ are plotted on the graph, it is found that these values correspond to a range in which stable high output is achieved on the characteristics shown in the graph.

<Condition 2>
Inductance $L_1$ of inductor L1=15 [mH]
Resistance $R_3$ of load=15625 [Ω]
Floating capacitance $C_{DS}$=4, 7, 12, 9 [pF]
In this case, the minimum value and the maximum value of the dead time τ are calculated as follows on the basis of above expression (14).
Minimum value $\tau_{min}$=405 [ns]
Maximum value $\tau_{max}$=2441 [ns]

Figure 48:
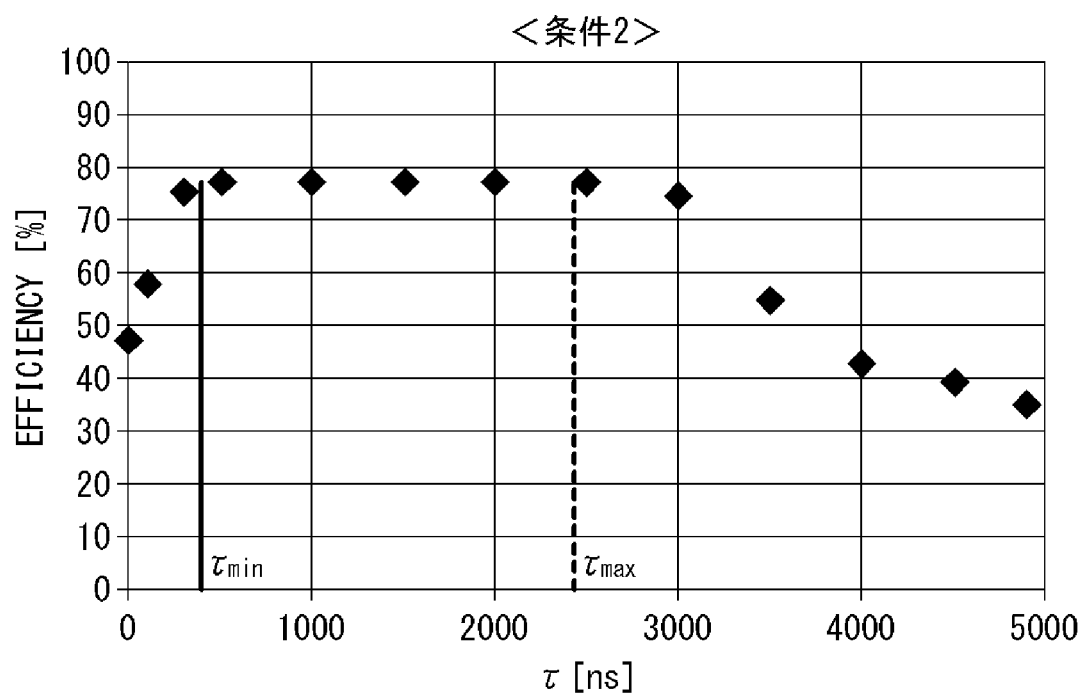
FIG. 48 is a graph showing the relationship between dead time $\tau$ [ns] and efficiency [%] in the case of condition 2 in the transformer shown in FIG. 45.

FIG. 48 is a graph showing the relationship between the dead time τ [ns] and efficiency [%] in the case of the condition 2. When the calculated $\tau_{min}$ and $\tau_{max}$ are plotted on the graph, it is found that these values correspond to a range in which the efficiency is excellent on the characteristics shown in the graph.

Figure 49:
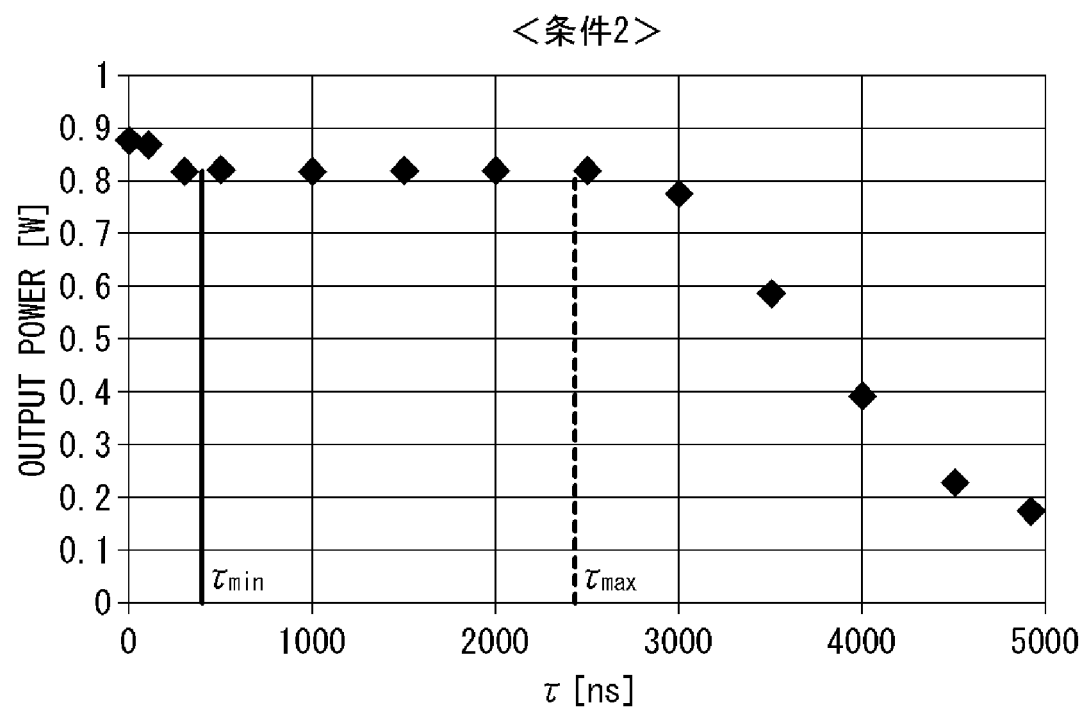
FIG. 49 is a graph showing the relationship between dead time $\tau$ [ns] and output power [W] in the case of condition 2 in the transformer shown in FIG. 45.

FIG. 49 is a graph showing the relationship between the dead time τ [ns] and output power [W] of the transformer in the case of the condition 2. When the calculated $\tau_{min}$ and $\tau_{max}$ are plotted on the graph, it is found that these values correspond to a range in which stable high output is achieved on the characteristics shown in the graph.

Figure 50:
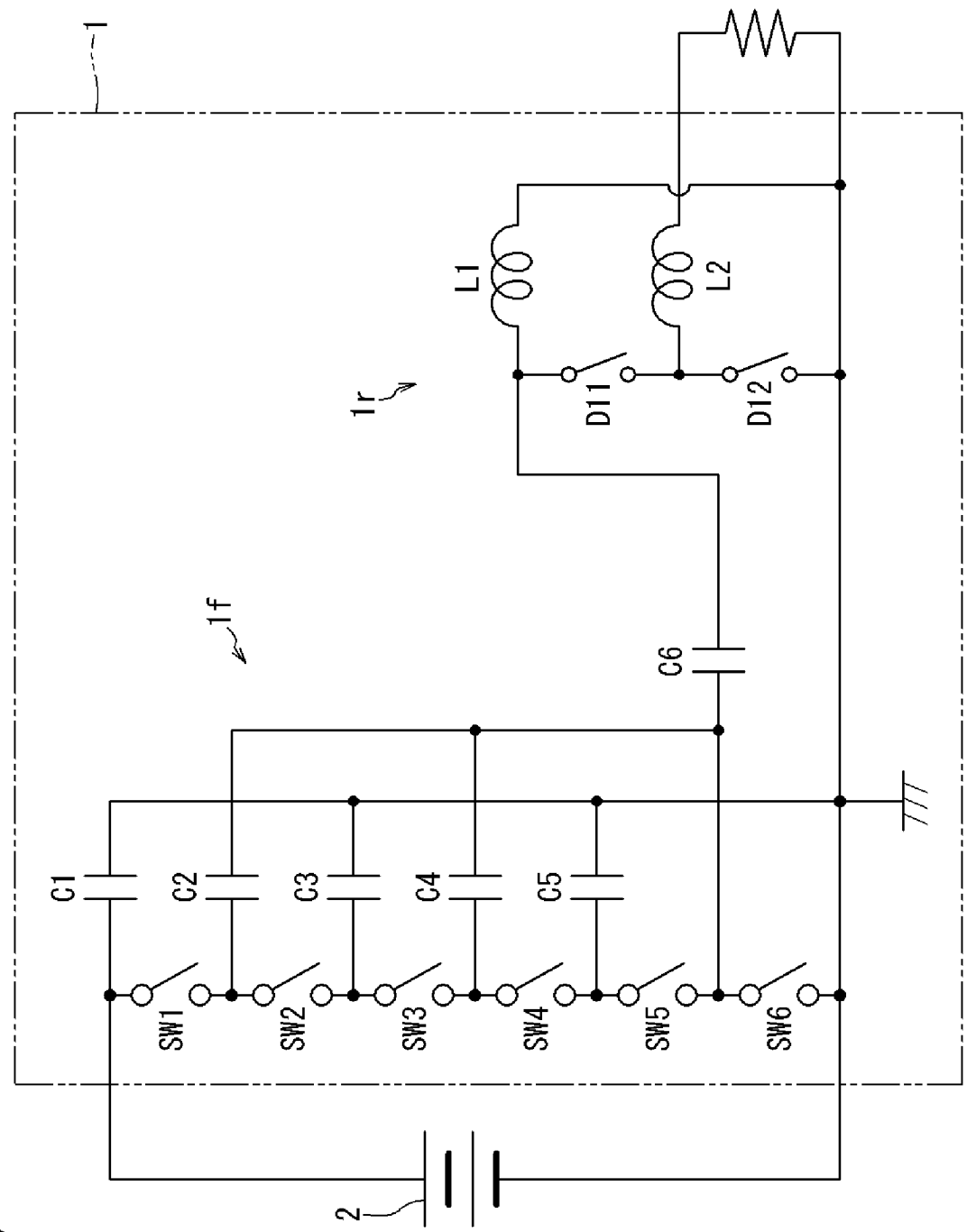
FIG. 50 is a circuit diagram showing an input/output common grounding type "6C2L" transformer.

FIG. 50 is a circuit diagram showing an input/output common grounding type "6C2L" transformer 1.

The performance of this transformer 1 has been verified. The verification results are described below.
<Condition 1>
Inductance $L_1$ of inductor L1=15 [mH]
Resistance $R_3$ of load=15625 [Ω]
Floating capacitance $C_{DS}$=10 [pF]
In this case, the minimum value and the maximum value of the dead time τ are calculated as follows on the basis of above expression (14).
Minimum value $\tau_{min}$=792 [ns]
Maximum value $\tau_{max}$=2611 [ns]

Figure 51:
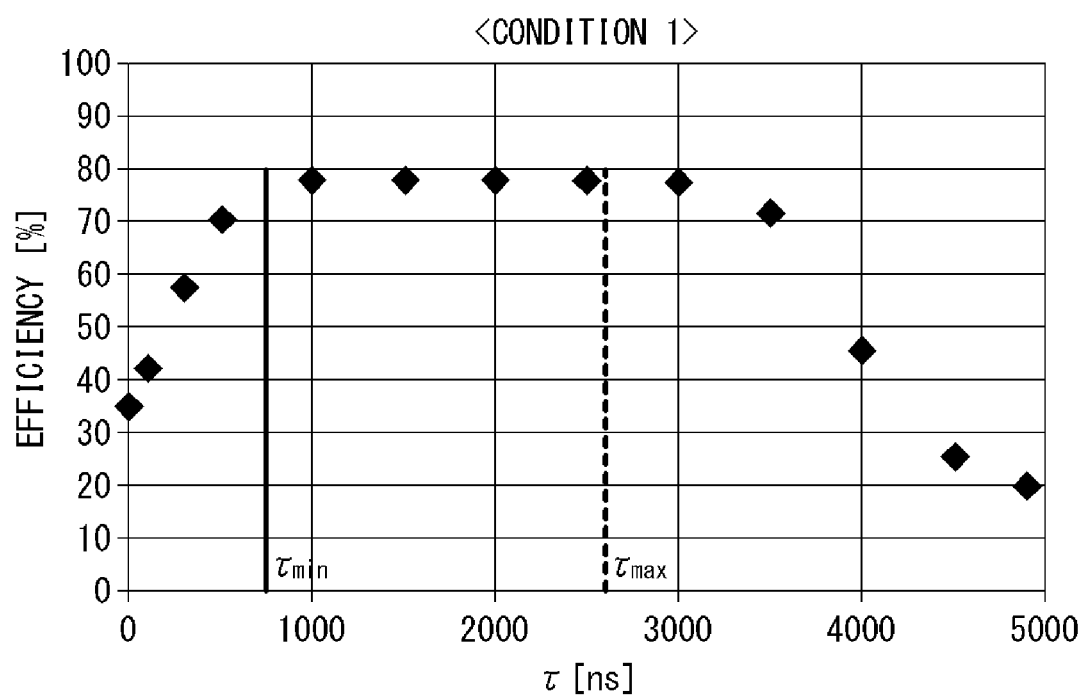
FIG. 51 is a graph showing the relationship between dead time $\tau$ [ns] and efficiency [%] in the case of condition 1 in the transformer shown in FIG. 50.

FIG. 51 is a graph showing the relationship between the dead time τ [ns] and efficiency [%] in the case of the condition 1. When the calculated $\tau_{min}$ and $\tau_{max}$ are plotted on the graph, it is found that these values correspond to a range in which the efficiency is excellent on the characteristics shown in the graph.

Figure 52:
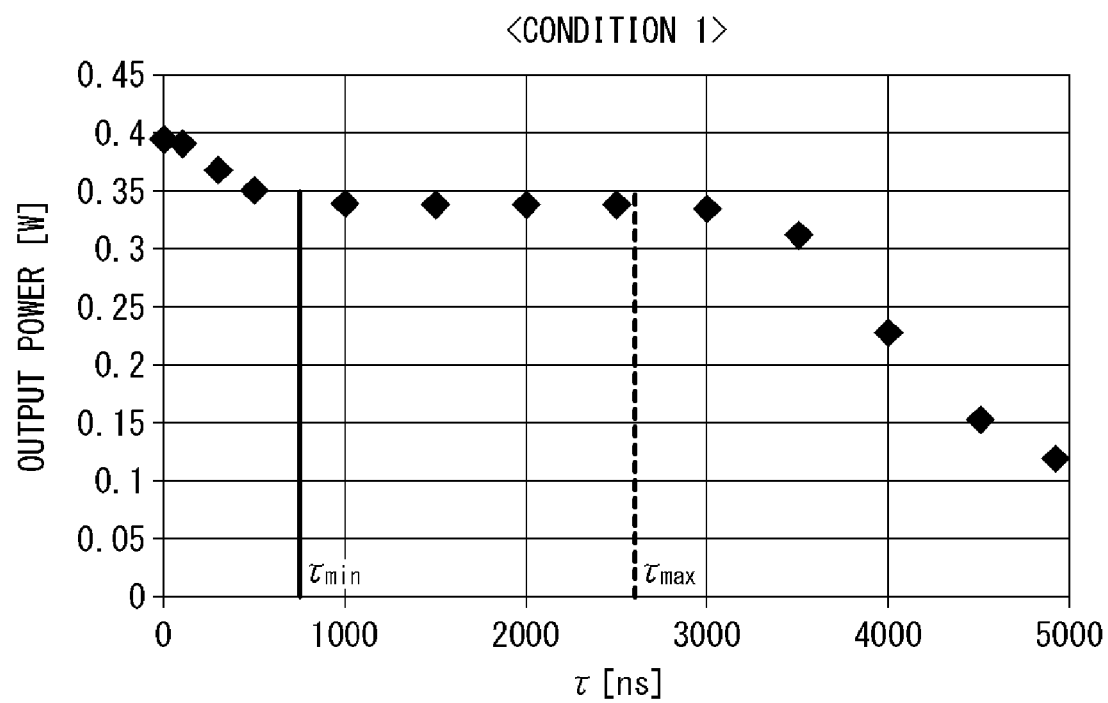
FIG. 52 is a graph showing the relationship between dead time $\tau$ [ns] and output power [W] in the case of condition 1 in the transformer shown in FIG. 50.

FIG. 52 is a graph showing the relationship between the dead time τ [ns] and output power [W] of the transformer in the case of the condition 1. When the calculated $\tau_{min}$ and $\tau_{max}$ are plotted on the graph, it is found that these values correspond to a range in which stable high output is achieved on the characteristics shown in the graph.

<Condition 2>
Inductance $L_1$ of inductor L1=15 [mH]
Resistance $R_3$ of load=15625 [Ω]
Floating capacitance $C_{DS}$=5 [pF]
In this case, the minimum value and the maximum value of the dead time τ are calculated as follows on the basis of above expression (14).
Minimum value $\tau_{min}$=378 [ns]
Maximum value $\tau_{max}$=2429 [ns]

Figure 53:
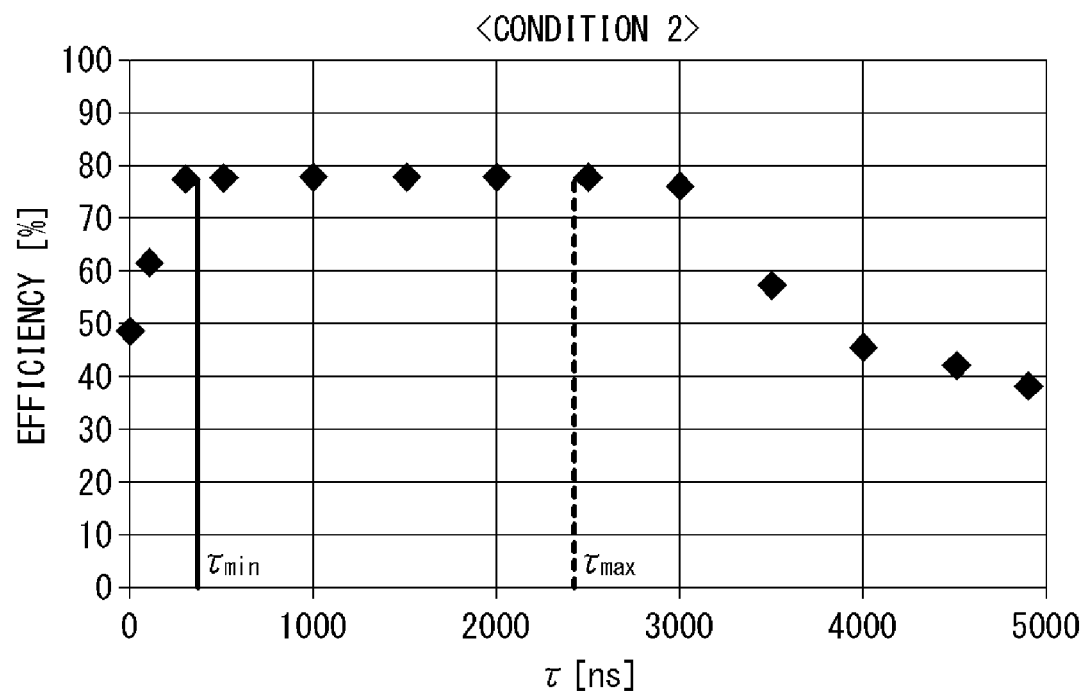
FIG. 53 is a graph showing the relationship between dead time $\tau$ [ns] and efficiency [%] in the case of condition 2 in the transformer shown in FIG. 50.

FIG. 53 is a graph showing the relationship between the dead time τ [ns] and efficiency [%] in the case of the condition 2. When the calculated $\tau_{min}$ and $\tau_{max}$ are plotted on the graph, it is found that these values correspond to a range in which the efficiency is excellent on the characteristics shown in the graph.

Figure 54:
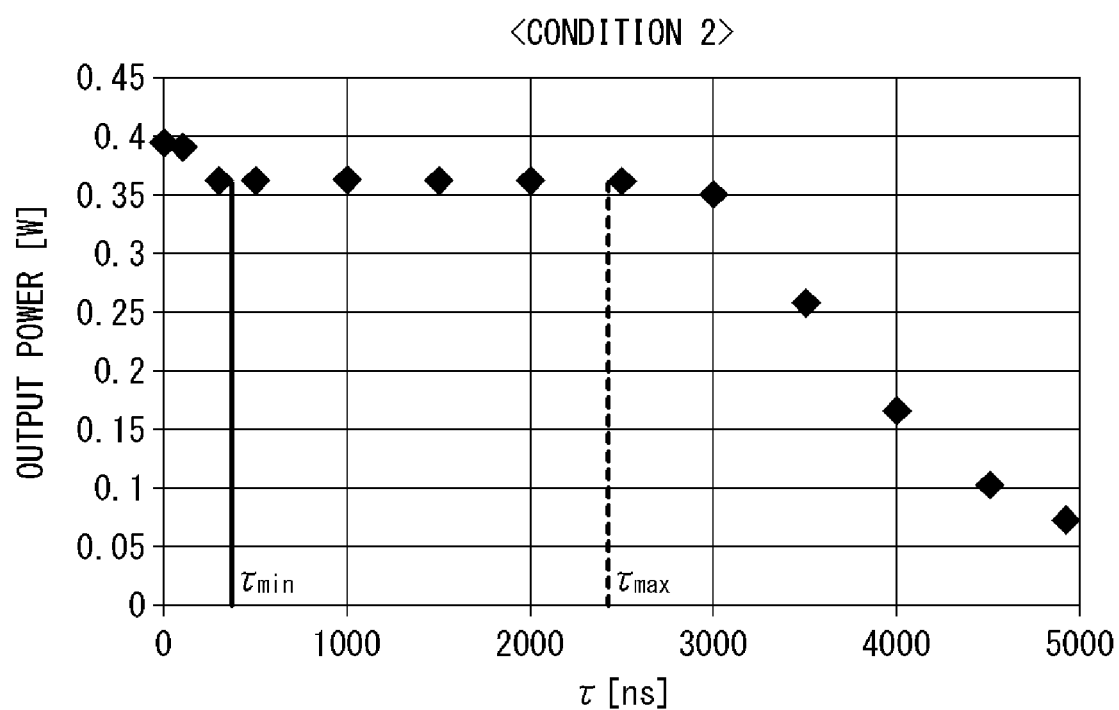
FIG. 54 is a graph showing the relationship between dead time τ [ns] and output power [W] in the case of condition 2 in the transformer shown in FIG. 50.

FIG. 54 is a graph showing the relationship between the dead time τ [ns] and output power [W] of the transformer in the case of the condition 2. When the calculated $\tau_{min}$ and $\tau_{max}$ are plotted on the graph, it is found that these values correspond to a range in which stable high output is achieved on the characteristics shown in the graph.

As described above, the range of the dead time τ determined according to expression (14) being appropriate is also supported by the above supplementary notes.

<<Supplement>>

It is noted that the embodiments disclosed herein are merely illustrative in all aspects and should not be recognized as being restrictive. The scope of the present invention is defined by the scope of the claims and is intended to include meaning equivalent to the scope of the claims and all modifications within the scope.

REFERENCE SIGNS LIST 1 transformer
1f front stage circuit
1r rear stage circuit
2 AC power supply, power supply
3 control section 4 switch device
C1 to C6 capacitor
$C_6$ capacitance
D1 to D4, D11, D12 diode
G ground electrical path
L1, L2 inductor
M1, M2 connection point
N1 to N7, N11 to N13 node
Px first output port
Py second output port
R load
R1, R2 bleeder resistor
$R_3$ resistance
Sr1, Sr2, Sb1, Sb2 switch
SW1 to SW6 switch

The invention claimed is:

1. A transformer provided between a power supply and a load, and composed of a front stage circuit and a rear stage circuit, the transformer comprising:

the front stage circuit comprising,
a switch series unit composed of a plurality of switches, as many as a multiple of 2, connected in series with each other, the plurality of switches including odd-numbered switches and even-numbered switches as seen from one of both ends of the switch series unit, the odd-numbered switches and the even-numbered switches being configured to be alternately turned ON, the switch series unit as a whole being connected in parallel to the power supply, under a condition that mutual connection points of the respective switches and points at the both ends of the switch series unit are nodes, a number of nodes being m in total, one of the points at the both ends is a ground node, capacitors provided on at least one electrical path of a first electrical path and a second electrical path, the first electrical path being configured to combine odd-numbered nodes and lead the odd-numbered nodes to a first output port, the second electrical path being configured to combine even-numbered nodes and lead the even-numbered nodes to a second output port, the capacitors being provided correspond to at least (m −1) nodes excluding the ground node, and a ground electrical path being configured to connect the ground node directly to the first output port without an interposed capacitor;

the rear stage circuit comprising:
an element series unit composed of a pair of semiconductor elements that are connected in series to each other and perform conducting operations of mutually opposite polarities, one of both ends of the element series unit being connected to the first output port and to a grounded end of the load while the other end of the element series unit being connected to the second output port, and inductors provided on a third electrical path and a fourth electrical path, respectively, the third electrical path being configured to lead a non-grounded end of the element series unit to the grounded end of the load, the fourth electrical path being configured to lead a mutual connection point of the pair of semiconductor elements to a non-grounded end of the load; and a control section configured to control ON/OFF operations of the switches.

2. The transformer according to claim 1, wherein
under a condition that a time period from a dead-time start time to a dead-time end time is a dead time ($\tau$), the dead-time start time being a time at which control for the odd-numbered switches and control for the even-numbered switches are both turned OFF, the dead-time end time being a time at which control for either the odd-numbered switches or the even-numbered switches is turned ON, the control section, after the dead-time start time, calculates a first half time ($\tau_1$) and a second half time ($\tau_2$), the first half time ($\tau_1$) being calculated on the basis of electric charges that move from the inductor of the third electrical path to floating capacitances of the switches while one of the semiconductor elements is in a conductive state, the second half time ($\tau_2$) being calculated on the basis of electric charges that move from the inductor of the third electrical path to the floating capacitances of the switches while the other semiconductor element is in a conductive state, and the control section determines the dead time ($\tau$) on the basis of the first half time ($\tau_1$) and the second half time ($\tau_2$).

3. The transformer according to claim 2, wherein the control section terminates the dead time ($\tau$) before the electric charges that have moved to the floating capacitances return to the inductor of the third electrical path.

4. The transformer according to claim 3, wherein
under a condition that a switching cycle of the switches is T, an inductance of the inductor of the third electrical path is $L_1$, and a resistance value of the load is $R_3$, the dead time ($\tau$) satisfies the following relationship:

$$\tau_1 + \tau_2 \leq \tau \leq \tau_0 + \tau_1$$

where $$\tau_0 = \frac{T}{4} - \frac{L_1}{4R_3}$$

$$\tau_1 = \frac{T}{4} + \frac{L_1}{4R_3} - \frac{1}{4}\sqrt{\left(T + \frac{L_1}{R_3}\right)^2 - 32L_1 \sum_{n=1}^{n} C_{nDS}}$$

$$\tau_2 = \frac{T}{4} - \frac{L_1}{4R_3} - \frac{1}{4}\sqrt{\left(T - \frac{L_1}{R_3}\right)^2 - 32L_1 \sum_{n=1}^{n} C_{nDS}}$$

where n denotes the number of floating capacitances $C_{DS}$, $C_{nDs}$ denotes an n-th floating capacitance, a sign of a value in each radical sign is plus, and $\tau_1 < \tau_2$ is satisfied.

* * * * *